(12) United States Patent
Yamada et al.

(10) Patent No.: US 6,434,277 B1
(45) Date of Patent: Aug. 13, 2002

(54) IMAGE PROCESSING APPARATUS AND METHOD, AND MEDIUM THEREFOR

(75) Inventors: Rui Yamada; Mitsuharu Ohki, both of Tokyo; Takashi Totsuka, Chiba, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/346,006

(22) Filed: Jul. 1, 1999

(30) Foreign Application Priority Data

Jul. 13, 1998 (JP) ............................. P10-197390
Jun. 11, 1999 (JP) ............................. P11-164654

(51) Int. Cl.$^7$ ................................................ G06K 9/36
(52) U.S. Cl. ....................................... 382/285; 345/419
(58) Field of Search ............................... 382/285, 286; 345/419, 420–425, 630, 782; 364/725.01, 725.02

(56) References Cited

U.S. PATENT DOCUMENTS

| 5,887,082 A | 3/1999 | Mitsunaga et al. | 382/199 |
| 5,892,853 A | 4/1999 | Hirani et al. | 382/280 |
| 6,091,420 A | * 7/2000 | Horikawa et al. | 345/419 |

OTHER PUBLICATIONS

P. Debevec et al., "Modeling and Rendering Archtecture from Photographs: A Hybrid Geometry–and–Image–Based Approach," Computer Graphics Proceedings Annual Conference, Siggraph Aug. 4–9, 1996, pp. 11–20.

M. Gleischer, "Image Snapping," Computer Graphics Annual Proceedings Conference, Siggraph Aug. 6–11, 1995, pp. 183–190.

Y. Horry et al., "Tour Into the Picture: Using a Spidery Mesh Interface to Make Animation from a Single Image," Computer Graphics Annual Conference, Siggrah Aug. 3–8, 1997, pp. 225–232.

P. Hanrahan et al., "Direct Wysiwyg Painting and Texturing on 3D Shapes," Computer Graphics Annual Conference, Siggraph Aug. 6–10, 1990, pp. 215–223.

K. Fiskin et al., "A Family of New Algorithms for Soft Filling," Computer Graphics Annual Conference, Jul. 1984, vol. 18, No. 3, pp. 235–244.

O. Faugeras, "Three–Dimensional Computer Vision—A Geometric Viewpoint," The MIT Press, Copyright 1993, Chapter 6, "Stereo Vision," pp. 165–211.

J. Foley et al., "Computer Graphics Principles and Practice," Addison–Wesley Publishing Co., Copyright Jul. 1997, Chapter 2, "Programming in the Simple Raster Graphics Package (SRGP)," by A. Van Dam et al., pp. 25–64.

* cited by examiner

Primary Examiner—Yon J. Couso
(74) Attorney, Agent, or Firm—Bell, Boyd & Lloyd LLC

(57) ABSTRACT

An image processing apparatus and method generates, from a two-dimensional image, expanded images obtained by expanding, on a two-dimensional plane, a plurality of surfaces constituting a three-dimensional object displayed in the two-dimensional image. In the image processing apparatus and method, based on shape information of the shape of a surface among the surfaces constituting the three-dimensional object and on characteristic points in the two-dimensional image which are included in the surface, a transform expression is computed that transforms each of the surfaces constituting the three-dimensional object into one of the expanded images at the time of designation of the shape information and the characteristic points. Based on the transform expression, each of the surfaces constituting the three-dimensional object displayed in the two-dimensional image is transformed into one of the expanded images. By connecting the expanded images of the surfaces in accordance with connecting relationship among the surfaces, a connected image is generated.

36 Claims, 52 Drawing Sheets

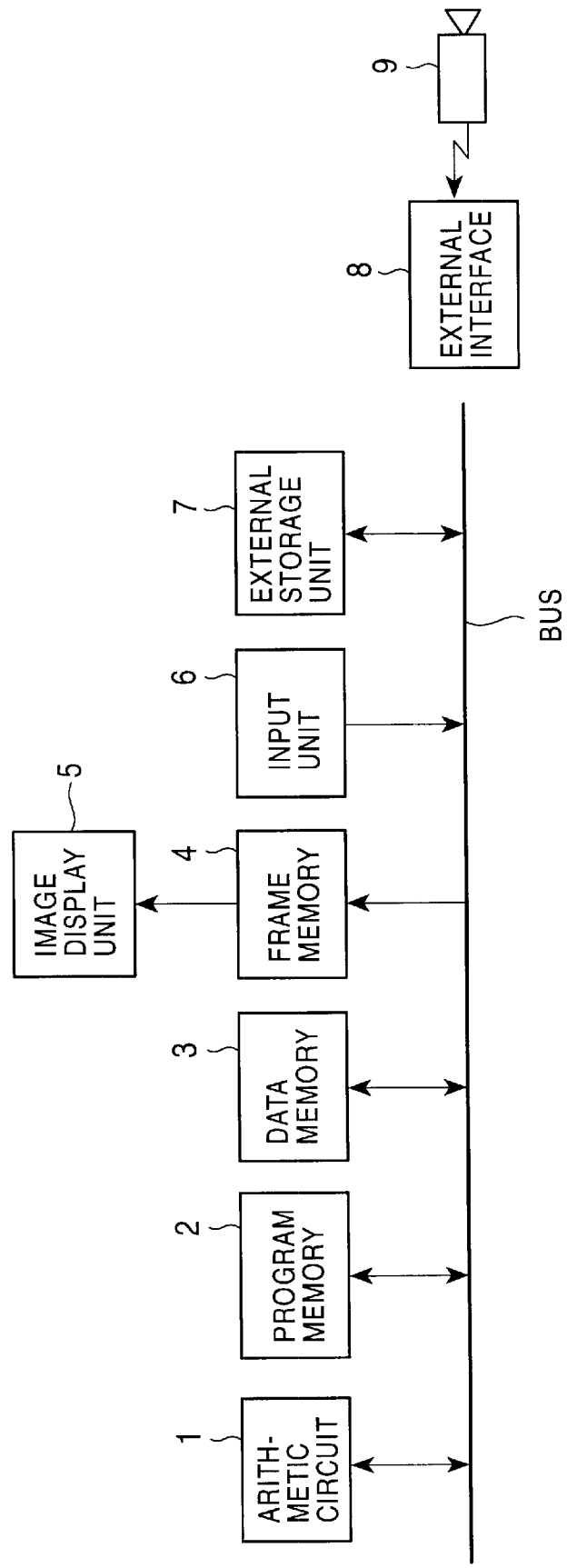

THREE-DIMENSIONAL OBJECT

CHARACTERISTIC POINT
PROJECTED IMAGE
IMAGE BUFFER

PASTE BUFFER
EXPANDED IMAGE $$D_1 = R\sin\frac{\lambda_1 + \lambda_2}{2}$$

$$D_2 = R\cos\frac{\lambda_1 + \lambda_2}{2} \tan\lambda_3$$

$$D_3 = \sqrt{D_1^2 - D_2^2}$$

$$= R\sqrt{\sin^2\frac{\lambda_1 + \lambda_2}{2} - \cos^2\frac{\lambda_1 + \lambda_2}{2}\tan^2\lambda_3}$$

$$\sin \frac{\mu}{2} = \sqrt{\sin^2 \frac{\lambda_1 + \lambda_2}{2} - \cos^2 \frac{\lambda_1 + \lambda_2}{2} \tan^2 \lambda_3}$$

$$= \sqrt{\sin^2 \frac{\lambda_1 + \lambda_2}{2} - \cos^2 \frac{\lambda_1 + \lambda_2}{2} \tan^2 \frac{\lambda_2 - \lambda_1}{2}}$$

THREE-DIMENSIONAL OBJECT (CONE)

CENTER

IMAGE BUFFER

PROJECTED IMAGE

REGION HAVING PIXELS 1.0
REGION HAVING PIXELS 0

ENTIRE ILLUMINATION IS APPLIED BECAUSE OF DIFFUSED REFLECTIVE ELEMENTS

ONLY PART IS BRIGHT AS A RESLUT OF NON-LINEAR TRANSFORMATION OF SPECULAR REFLECTIVE ELEMENTS

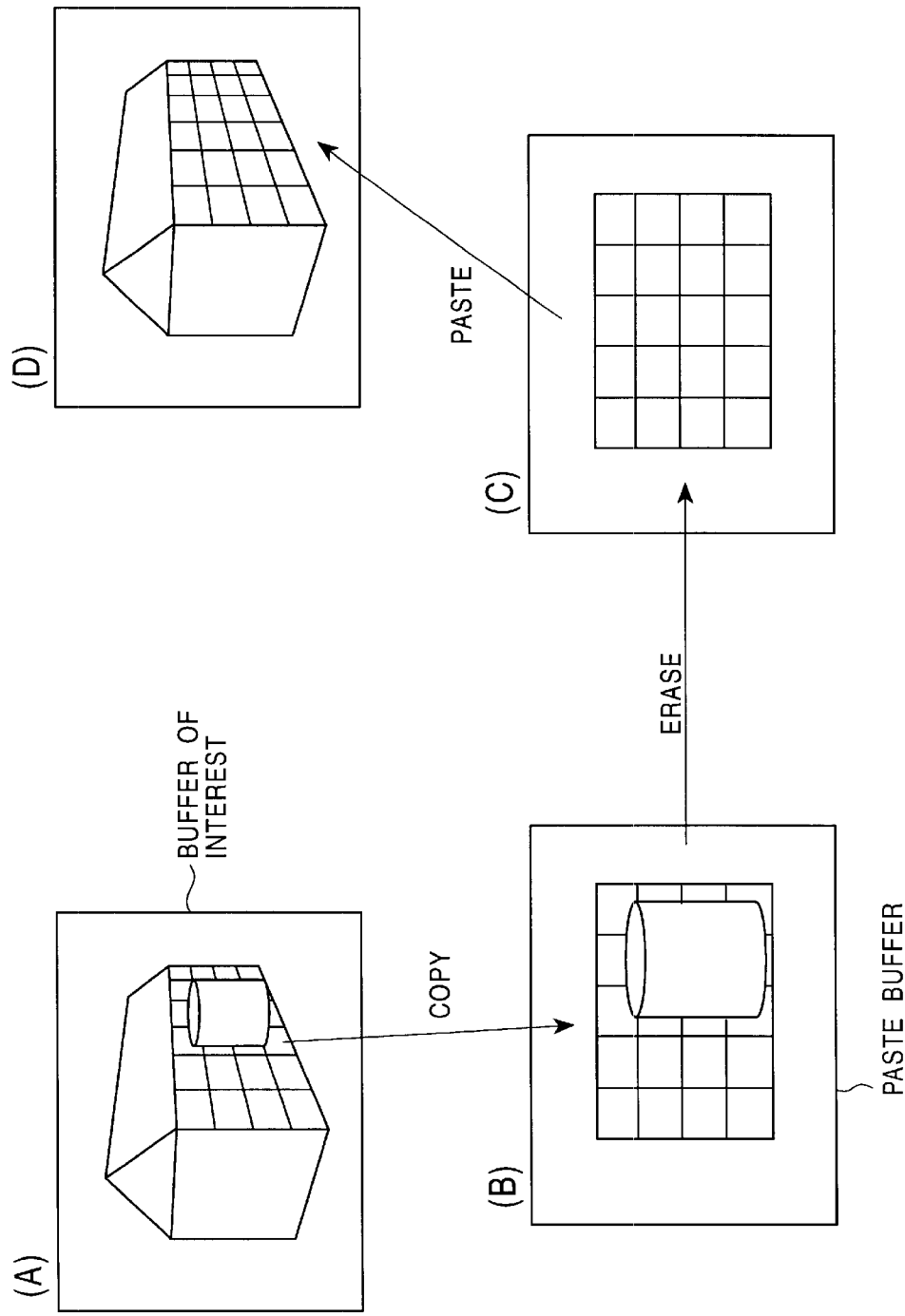

IMAGE PROCESSING APPARATUS AND METHOD, AND MEDIUM THEREFOR

BACKGROUND OF THE INVENTION

1. Field of the Invention

The present invention relates to image processing apparatuses and methods, and media therefor, and in particular, to an image processing apparatus and method that easily implements processing such as three-dimensional editing on a two-dimensionally displayed three-dimensional object, and a medium therefor.

2. Description of the Related Art

Various methods have been proposed that implement various processes on a two-dimensional image and extract information necessary for the processes from the two-dimensional image. Documents describing the methods include James D. Foley, Andries van Dam, Steven K. Feiner, and John F. Hughes, "Computer Graphics, principles and practice", ADDISON-WESLEY PUBLISHING COMPANY, 1996 (hereinafter referred to as "Document 1"), Paul E. Debevec, Camillo J. Taylor, and Jitendra Malik, "Modeling and Rendering Architecture from Photographs: A hybrid geometry-and-image-based approach", proceedings of SIGGRAPH 96, pp. 11–20 (hereinafter referred to as "Document 2"), Oliver Faugeras, "Three-dimensional computer version", The MIT press (hereinafter referred to as "Document 3"), Kenneth P. Fishin, and Brian A. Barsky, "Family of New Algorithms for Soft Filling", proceedings of SIGGRAPH 84, pp. 235–244 (hereinafter referred to as "Document 4"), Pat Hanrahan and Paul Haeberli, "Direct WYSIWYG Painting and Texuturing on 3D Shapes", proceedings of SIGGRAPH 90, pp. 215–233 (hereinafter referred to as "Document 5"), Youichi Horry, Ken-ichi Anjyo, and Kiyoshi Arai, "Tour Into the Picture: Using a Spidery Mesh Interface to Make Animation from a Single Image", proceedings of SIGGRAPH 97, pp. 225–232 (hereinafter referred to as "Document 6"), and Michael Gleicher, "Image Snapping", proceedings of SIGGRAPH 95, pp. 183–190 (hereinafter referred to as "Document 7").

In Document 1, image processing called "two-dimensional paint" is described in which a computer is used to perform processing in the same way as a designer or the like draws a picture on paper using a paintbrush or airbrushing (a technique that draws a picture by spraying paints on paper).

In this type of conventional two-dimensional paint, even when a three-dimensional object is displayed in an image, the image itself is treated on a two-dimensional plane. Accordingly, when characters are rendered irrespective of the direction of the three-dimensional object in a three-dimensional space which is displayed on the two-dimensional plane, or a figure is added, the image looks unnatural.

For example, in the case where a house-shaped three-dimensional object, as shown in FIG. 1A, is displayed, and characters are rendered on walls of the house without the direction of the characters, the characters do not look as if they are written on the walls, as shown in FIG. 1B. For adding a parallelepiped room to a wall of the house, in the case where a rectangle is rendered on the wall without the direction of the rectangle, the image looks unnatural, as shown in FIG. 1C. In the case where a cylinder is displayed in a two-dimensional image as shown in FIG. 2A, when characters are rendered on the side surface without ignoring the curvature of the side surface, the characters do not look as if they are written on the side surface, as shown in FIG. 2B.

Accordingly, in order that an image may not look unnatural in two-dimensional paint, it is required that a character or figure be rendered being transformed so as to match the direction of a three-dimensional object displayed in the two-dimensional image. Performing operations for the rendering requires a degree of experience.

Therefore, there is a method in which a user uses a ten-key pad or graphical user interface (GUI) to input an angle of inclination of the three-dimensional object displayed on the two-dimensional image so that a computer uses the input to transform a new character or figure to be rendered. In this method, the user must adjust the angle of inclination of the three-dimensional object to be input to the computer while viewing the rendered character or figure so that the rendered character or figure does not look unnatural. The adjustment also requires a degree of experience.

As described above, when the user instructs the rendering of a character or figure ignoring the direction of a three-dimensional object displayed on a two-dimensional image, the computer cannot display the character or figure as it looks natural, in other words, an image looking as if the character or figure was originally positioned cannot be obtained. This is due to lack of information on the position of the three-dimensional object displayed in the two-dimensional image and information (a position at which a landscape or the like was observed in the case where the two-dimensional image was obtained by performing image capture on a picture) on the position of image capture for the two-dimensional image.

Accordingly, there is a method that uses computer vision to find, from a two-dimensional image, the position of a three-dimensional object in a three-dimensional space displayed in the two-dimensional image, and the image capture position of the three-dimensional object.

In other words, in Document 2, a method is disclosed in which a three-dimensional shape such as a parallelepiped is correlated using a GUI with a structure in a plurality of photographs, and the size of the structure and the photographing position are found. In Document 3, other various methods for finding the position of a three-dimensional object and an image capture position on the object are disclosed.

In the above-described methods using the computer vision to compute a three-dimensional object position and an image capture position on the object, the principles of triangulation are used. This requires a plurality of images obtained by performing image capture on the same three-dimensional object from plurality of image capture positions. However, when two-dimensional paint is performed, the images are not always prepared, and when the two-dimensional images are photographs of a picture, the plurality of images is not used in general.

If the plurality of images obtained by performing image capture on the same three-dimensional object from the plurality of image capture positions can be prepared, the corresponding positions (e.g., vertices of the roof, etc., of a structure as a three-dimensional object) of the same three-dimensional object displayed on the images must be designated in order for the computer to compute the position of the three-dimensional object and the image capture position. The operation of designation for the images is complicated, and requires a time. In addition, in the case where based on the position (in the three-dimensional space) of the three-dimensional object displayed in the two-dimensional image and the image capture position, three-dimensionally natural rendering is performed, three-dimensional data, such as three-dimensional coordinates generated when the three-dimensional object is viewed from the image capture position, must be processed, which requires a great amount of operations for the processing.

In Document 4, a method for color processing for two-dimensional paint is disclosed.

In two-dimensional paint, the user uses a GUI to select a color for rendering and to perform rendering using the selected color. The color and brightness of a three-dimensional object displayed in the two-dimensional image vary depending on the positional relationship between the direction of the object surface and illumination. For example, painting an entire surface of the three-dimensional object in the same color (the same RGB levels) causes an unnatural rendering result. Accordingly, for obtaining a natural rendering result, a painting color must be gradationally changed considering the positional relationship between the direction of a surface to be painted and illumination. In particular, in the case where a surface to be painted is curved, pixel levels needs to be sequentially changed so that the rendering result is natural. Thus, a painting color must be selected for, for example, several pixels, which requires a great amount of operations.

Accordingly, in Document 4, a method called "tint fill" is disclosed in which in the case where a pixel color is a mixture of two colors and the two colors are known, either color can be changed into another color. The use of tint fill can efficiently cope with an area in which a foreground and a background are mixed, but cannot cope with object shading and light reflected by the object.

In Document 5, a method that transforms and pastes a character or handwritten figure input by operating a tablet or mouse along the surface of a three-dimensional object displayed in a two-dimensional image is disclosed.

Since the method disclosed in Document 5 uses three-dimensional information (e.g., the position of the three-dimensional object in a three-dimensional space, an image capture position, size, inclination, etc.) on the three-dimensional object displayed in the two-dimensional image, the method in Document 5 needs to recognize the three-dimensional information by using computer vision. However, when computer vision is used to recognize the three-dimensional information, a plurality of images are required as described above, and an amount of operations greatly increases.

Although the method in Document 5 can also use a three-dimensional model of a three-dimensional object generated in the computer, it must process three-dimensional data and requires a great amount of operations.

Regarding three-dimensional model generating, Document 2 discloses a technique that includes the steps of using computer vision technology to extract an outline of the shape of a three-dimensional object displayed in the two-dimensional image from the two-dimensional image, pasting a captured image onto the shape surface (performing texture mapping), and using these steps to generate a two-dimensional image viewed from a free viewpoint (captured from a free image capture position). Similar to the above-described cases, this technique requires a plurality of images because it uses computer vision technology to extract, from a two-dimensional image, an outline of the shape of a three-dimensional object displayed in the two-dimensional image.

In Document 6, a method is disclosed in which based on a single two-dimensional image, an image viewed from a viewpoint excluding the image capture position of the two-dimensional image is generated. This method only generates an image viewed from a viewpoint excluding the image capture position, and it is based on the assumption that a three-dimensional object displayed in a two-dimensional image or another adjacent object has a very simple shape of a plate. Accordingly, almost no serious problem occurs when an image viewed from another viewpoint is approximately generated. However, when a character or figure is added to the two-dimensional image, it is impossible to make the rendering result natural. For example, in the case where a cylinder is displayed in a two-dimensional image, a natural image formed by adding a character or figure on the side surface of the cylinder cannot be obtained.

In addition, it is required in many cases that when a two-dimensional image is processed, the user designates predetermined characteristic points (e.g., vertices) of a three-dimensional object in the two-dimensional image. The characteristic points are designated by operating a mouse or input pen, but it is difficult to accurately designate vertices of the three-dimensional object in the two-dimensional image. Accordingly, Document 7 discloses a method that includes the steps of extracting an edge (a portion whose brightness and color greatly change) in the two-dimensional image, and moving a cursor on the edge when the cursor is in the vicinity of the edge. Since all edges in the two-dimensional image are detected in the method in Document 7, sensitive response to noise or a texture in the two-dimensional image occurs, and the cursor may be moved to an unnecessary position.

Although many type of conventional image processing technology have been proposed as described above, a method particularly adapted for editing or processing on a two-dimensional image, such as three-dimensional addition and deletion of a character or figure, movement, transformation, color or pattern change, and illumination change, has not been proposed yet.

According to the above-described conventional methods, three-dimensional editing or processing a degree of experience of operation and a time, or a plurality of images in which the image of the same object is captured from different directions. An amount of computation extremely increases, and a cursor may be unnecessarily moved. In addition, in order to delete a three-dimensional object or the like in a two-dimensional image, it is required that in a region of deletion, the background of the two-dimensional image be reproduced. However, it is difficult for the above-described methods in Documents 1 to 7 to reproduce the background.

SUMMARY OF THE INVENTION

Accordingly, it is an object of the present invention to provide an image processing apparatus and method for easily implementing processing such as three-dimensional editing on a two-dimensional image, and a medium used for the image processing apparatus and method.

To this end, according to an aspect of the present invention, the foregoing object is achieved through provision of an image processing apparatus for generating, from a two-dimensional image, expanded images obtained by expanding, on a two-dimensional plane, a plurality of surfaces constituting a three-dimensional object displayed in the two-dimensional image. The image processing apparatus includes an operating unit for designating shape information on the shape of a surface among the surfaces constituting the three-dimensional object, and characteristic points in the two-dimensional image which are included in the surface, a computing unit for computing, based on the shape information and the characteristic points, a transform expression for transforming each surfaces constituting the three-dimensional object into each expanded image, a transforming unit for transforming, based on the transform expression, each of the surfaces constituting the three-dimensional object displayed in the two-dimensional image into one of the expanded images, and a connecting unit for generating a connected image by connecting the expanded images of the surfaces in accordance with connecting relationship among the surfaces.

According to another aspect of the present invention, the foregoing object is achieved through provision of an image processing method for generating, from a two-dimensional image, expanded images obtained by expanding, on a two-dimensional plane, a plurality of surfaces constituting a three-dimensional object displayed in the two-dimensional image. The image processing method includes a computing step for computing, based on shape information on the shape of a surface among the surfaces constituting the three-dimensional object and on characteristic points in the two-dimensional image which are included in the surface, a transform expression for transforming each of the surfaces constituting the three-dimensional object into each of the expanded images at the time of designation of the shape information and the characteristic points, a transforming step for transforming, based on the transform expression, each of the surfaces constituting the three-dimensional object displayed in the two-dimensional image into one of the expanded images, and a connecting step for generating a connected image by connecting the expanded images of the surfaces in accordance with connecting relationship among the surfaces.

According to a further aspect of the present invention, the foregoing object is achieved through provision of a computer-readable medium for causing a computer to execute an image-processing computer program for generating, from a two-dimensional image, expanded images obtained by expanding, on a two-dimensional plane, a plurality of surfaces constituting a three-dimensional object displayed in the two-dimensional image. The program includes a computing step for computing, based on shape information on the shape of a surface among the surfaces constituting the three-dimensional object and on characteristic points in the two-dimensional image which are included in the surface, a transform expression for transforming each of the surfaces constituting the three-dimensional object into one of the expanded images at the time of designation of the shape information and the characteristic points, a transforming step for transforming, based on the transform expression, each of the surfaces constituting the three-dimensional object displayed in the two-dimensional image into one of the expanded images, and a connecting step for generating a connected image by connecting the expanded images of the surfaces in accordance with connecting relationship among the surfaces.

According to a still further aspect of the present invention, the foregoing object is achieved through provision of an image processing apparatus for processing an image displaying a three-dimensional object. The image processing apparatus includes a first transforming unit for transforming each of projected images which is displayed in the image to be processed, the projected images obtained by projecting a plurality of surfaces constituting the three-dimensional object, into each of expanded images obtained by expanding the surfaces on a two-dimensional plane, a connecting unit for generating a connected image obtained by connecting the surfaces in accordance with connecting relationship among the surfaces, a processing unit for processing the connected image, a second transforming unit for transforming the expanded image of each surface constituting the processed connected image into the projected image of each surface, and a pasting unit for pasting one of the projected images on the image to be processed.

According to yet another aspect of the present invention, the foregoing object is achieved through provision of an image processing method of an image processing apparatus for processing an image displaying a three-dimensional object. The image processing method includes a first transforming step for transforming each of projected images which is displayed in the image to be processed, the projected images obtained by projecting a plurality of surfaces constituting the three-dimensional object, into each of expanded images obtained by expanding the surfaces on a two-dimensional plane, a connecting step for generating a connected image obtained by connecting the surfaces in accordance with connecting relationship among the surfaces, a processing step for processing the connected image, a second transforming step for transforming the expanded image of each surface constituting the processed connected image into the projected image of each surface, and a pasting step for pasting one of the projected images on the image to be processed.

According to a more aspect of the present invention, the foregoing object is achieved through provision of a computer-readable medium for causing a computer to execute an image-processing computer program for processing an image displaying a three-dimensional object. The program includes a first transforming step for transforming each of projected images which is displayed in the image to be processed, the projected images obtained by projecting a plurality of surfaces constituting the three-dimensional object, into each of expanded images obtained by expanding the surfaces on a two-dimensional plane, a connecting step for generating a connected image obtained by connecting the surfaces in accordance with connecting relationship among the surfaces, a processing step for processing the connected image, a second transforming step for transforming the expanded image of each surface constituting the processed connected image into the projected image of each surface, and a pasting step for pasting one of the projected images on the image to be processed.

According to the present invention, expanded images of a plurality of surfaces constituting a three-dimensional object in a two-dimensional image can be easily obtained.

According to the present invention, a plurality of surfaces of a three-dimensional object, displayed in an image, can be easily edited.

BRIEF DESCRIPTION OF THE DRAWINGS

FIG. 3 is a block diagram showing an image processing apparatus according to an embodiment of the present invention.

FIG. 39 consists of drawings (A), (B), (C), and (D) illustrating erasing.

DESCRIPTION OF THE PREFERRED EMBODIMENT

Figure 1A:
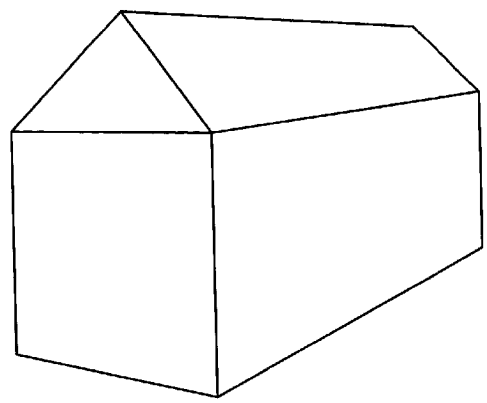
FIGS. 1A, 1B, and 1C are illustrations of rendering results using a conventional paint tool.
Figure 1B:
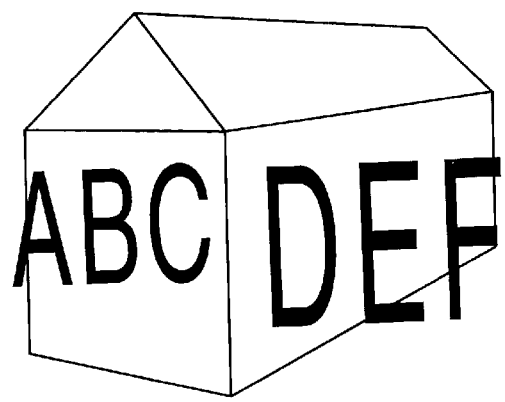
Figure 1C:
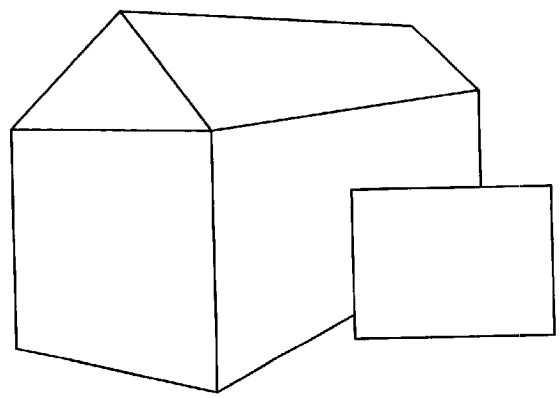
Figure 2A:
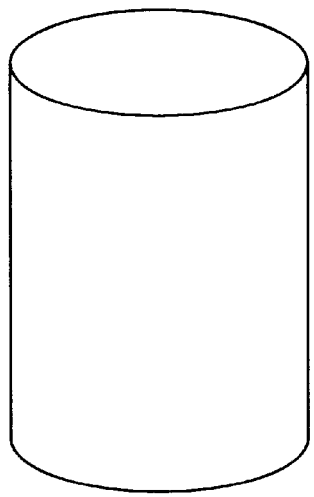
FIGS. 2A and 2B are illustrations of rendering results using a conventional paint tool.
Figure 2B:
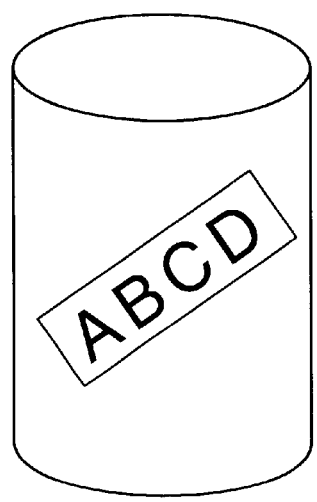

FIG. 3 shows an image processing apparatus according to an embodiment of the present invention. The image processing apparatus has a computer as a base, and can easily perform three-dimensional editing, etc., on a two-dimensional image.

An arithmetic circuit 1 consists of a central processing unit (CPU) or the like, and executes an application program stored in a program memory 2 under the control of an operating system (OS) loaded into the program memory 2, whereby performing various processes (described below) on a two-dimensional image. The program memory 2 consists of a random access memory (RAM), and temporarily stores the OS and the application program stored (recorded) in an external storage unit 7. A data memory 3 consists of a RAM, and temporarily stores data necessary for processing in the arithmetic circuit 1. A frame memory 4 consists of a RAM, and stores image data to be displayed on an image display unit 5. The image display unit 5 consists of, for example, a cathode-ray tube or liquid crystal display, and displays the image data stored in the frame memory 4. An input unit 6 consists of, for example, a combination of a mouse and a tablet, or a keyboard. The input unit 6 is operated to input a necessary command or data or to designate a predetermined position on the screen of the image display unit 5. The external storage unit 7 consists of, for example, a hard disk, a floppy disk, a compact disk ROM, or a magnetooptical disk, and stores the OS and the application program. The external storage unit 7 also stores data necessary for the operation of the arithmetic circuit and two-dimensional images (digital data) to be processed. An external interface 8 functions as an interface for receiving externally supplied data such as two-dimensional images captured by a camera 9 and data transmitted via a communication link (not shown).

The arithmetic circuit 1, the program memory 2, the data memory 3, the frame memory 4, the external storage unit 7, and the external interface 8 are connected by a bus, and programs and data are transmitted and received via the bus.

When main power is supplied to the image processing apparatus, the OS stored in the external storage unit 7 is read and loaded into the program memory 2, and it is executed by the arithmetic circuit 1. By operating the input unit 6 so that the application program is executed, the OS controls the arithmetic circuit 1 to read the application program from the external storage unit 7, and the read application program is executed after being loaded into the program memory 2. Thereby, for two-dimensional images that were captured by the camera 9 and stored in the external storage unit 7, various processes are described.

Figure 4:
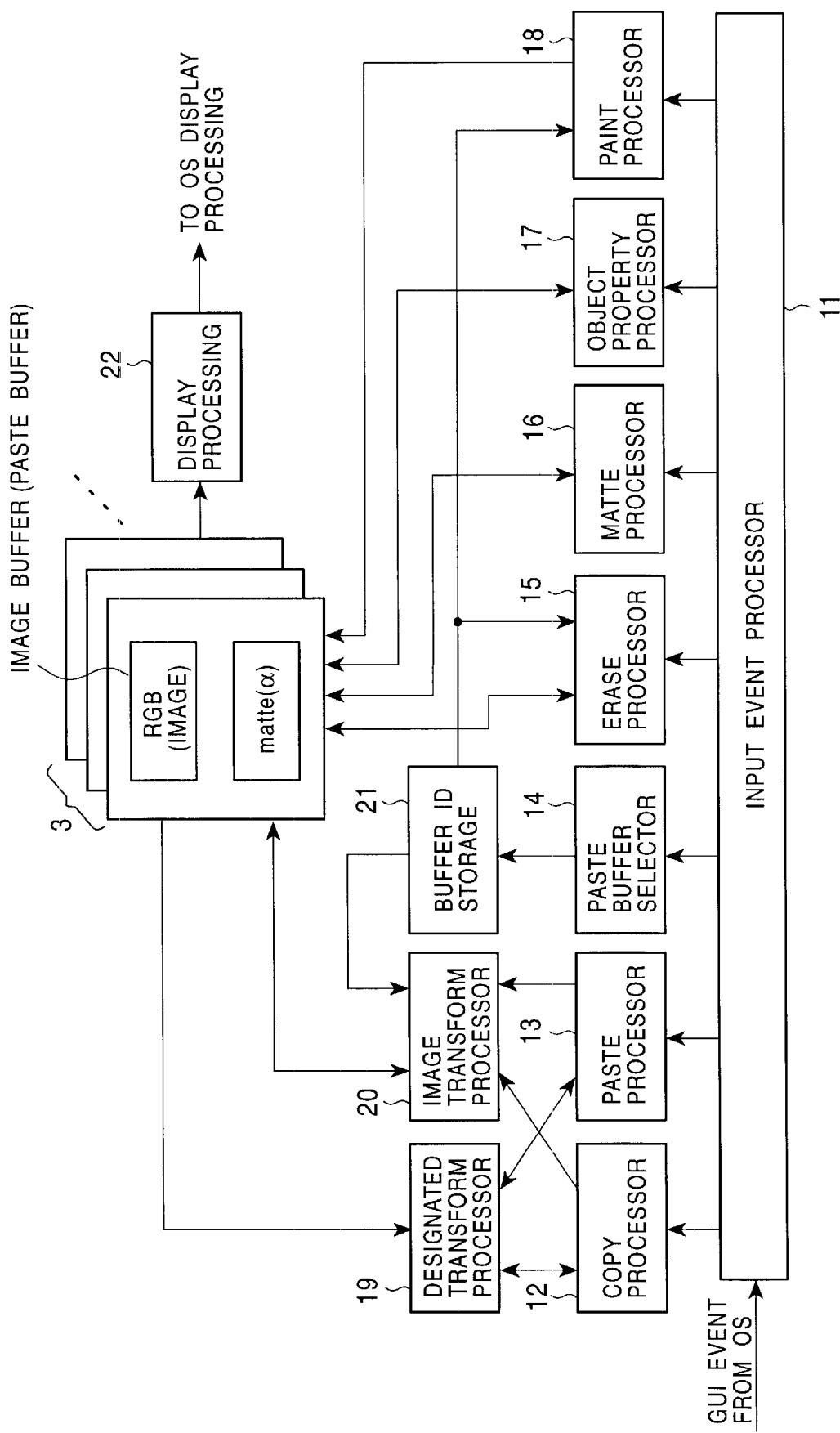
FIG. 4 is a block diagram showing the functions of the image processing apparatus shown in FIG. 3.

FIG. 4 shows the functions of the image processing apparatus (shown in FIG. 3) that are realized such that the arithmetic circuit 1 executes the application program.

A GUI event is supplied from the OS to an input event processor 11. The input event processor 11 analyzes the GUI event, and activates, in accordance with the analysis, a copy processor 12, a paste processor 13, a paste buffer selector 14, an erase processor 15, a matte processor 16, an object property processor 17, and a paint processor 18 so that processing is performed.

The types of the GUI event include, for example, a movement of a mouse cursor, mouse clicking (mouse button pressing and unpressing), selection from a menu on the GUI, and button operation. The GUI event is defined in a window system such as "X-Window".

The copy processor 12 performs a copy operation for storing an image in a paste buffer (described below). The paste processor 13 performs a paste operation for pasting the image stored in the paste buffer on a two-dimensional image stored in an image buffer (described below). A paste buffer selector 14 performs a paste buffer selecting operation for selecting, from the image buffer, a buffer used as the paste buffer, and storing its buffer identification (ID) in buffer ID storage 21.

In the data memory 3, regions in which image pixel levels are stored in units of screens are reserved as image buffers. The image buffers are provided with buffer IDs so that each image buffer is identified. Among the image buffers, an image buffer whose ID is stored in the buffer storage 21 is particularly called a "paste buffer". In each image buffer, the pixel levels (e.g., RGB values) of a two-dimensional image can be stored, and also a matte on an object displayed in the two-dimensional image can be stored. The matte is described below.

The erase processor 15 performs an erase operation for deleting part of an image stored in the paste buffer. The matte processor 16 performs for generating a matte for a three-dimensional object displayed in the two-dimensional image stored in the image buffer. The object property operator 17 performs object property processing for changing so-called "material properties" such as the color and material of the three-dimensional object displayed in the two-dimensional image stored in the image buffer, and illumination processing for changing illumination (changing the condition of illumination to the three-dimensional object in the two-dimensional image stored in the image buffer). The paint processor 18 performs a paint operation for painting two-dimensional paint on the image stored in the paste buffer.

A designated transform processor 19 corrects, in accordance with instructions from the copy processor 12 and the paste processor 13, the positions of characteristic points on the two-dimensional image stored in the image buffer, which are designated by the user by operating the input unit 6. The designated transform processor 19 sends the position-corrected characteristic points back to the copy processor 12 and the paste processor 13. An image transform processor 20 transforms, in accordance with instructions from the copy processor 12 and the paste processor 13, the image stored in the image buffer or the paste buffer. The buffer ID storage 21 stores the buffer ID of the image buffer selected as the paste buffer by the paste buffer selector. The buffer ID stored in the buffer ID storage 21 is supplied to the erase processor 15, the paint processor 18, and the image transform processor 20. Accordingly, the erase processor 15, the paint processor 18, and the image transform processor 20 recognize the image buffer as the paste buffer.

The display processor 22 performs processing necessary for displaying the two-dimensional image stored in the image buffer on the image display unit 5. Image data output from the display processor 22 are sent to the display processing by the OS, whereby the image data are written in the frame memory 4 so as to be displayed on the image display unit 5.

In FIG. 4, the blocks excluding the data memory 3 and the buffer ID storage 21 are realized such that the arithmetic circuit 1 executes the application program. Program components corresponding to the blocks are formed as modules.

Figure 5A:
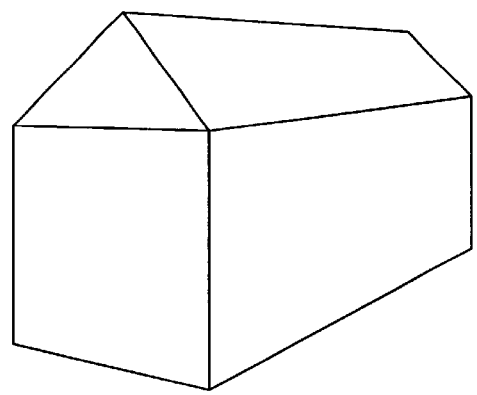
FIGS. 5A, 5B, and 5C are drawings showing the results of processing a two-dimensional image by the image processing apparatus shown in FIG. 4.
Figure 5B:
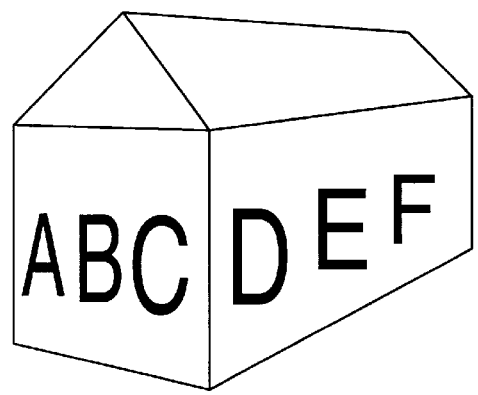
Figure 5C:
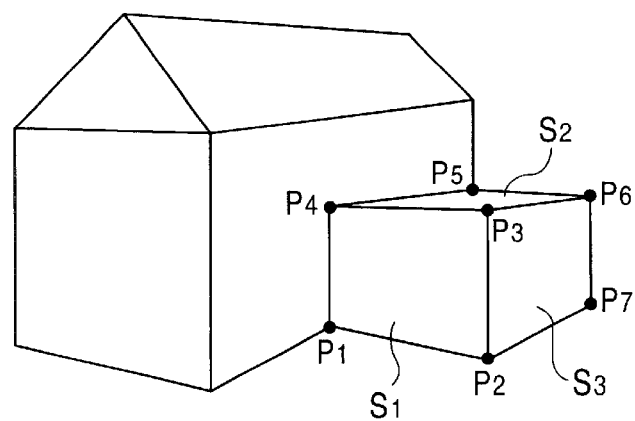
Figure 6A:
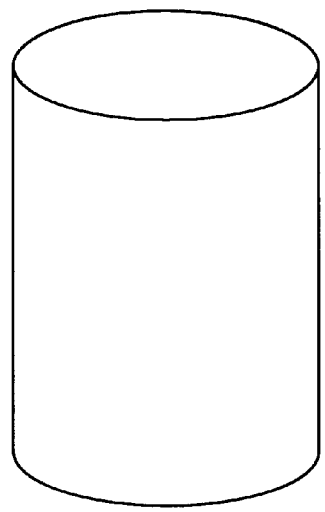
FIGS. 6A and 6B are drawings showing the results of processing a two-dimensional image by the image processing apparatus shown in FIG. 4.
Figure 6B:
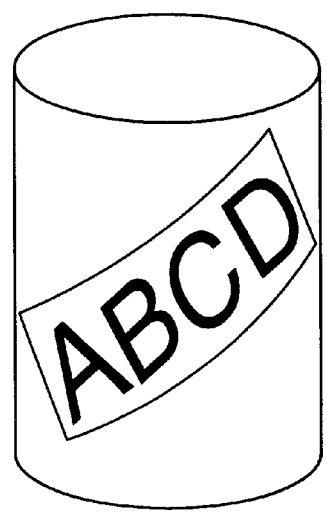

According to the above-described image processing apparatus, for example, in the case where a two-dimensional image on which a house-shaped three-dimensional object is displayed is stored in the image buffer as shown in FIG. 5A, when characters are written ignoring the direction of walls of the house, a two-dimensional image that looks as if the characters were written along the walls can be obtained as shown in FIG. 5B. When a rectangle is drawn ignoring the direction of the walls of the house, a two-dimensional image in which a parallelepiped room is added to the walls can be obtained as shown in FIG. 5C. In addition, in the case where a two-dimensional image on which a cylinder as shown in FIG. 6A is displayed is stored in the image buffer, even when characters are written ignoring the direction of the side surface of the cylinder, a two-dimensional image that looks as if the characters were written along the side surface can be obtained as shown in FIG. 6B.

In other words, when the image of a character-written three-dimensional object is not actually captured by the camera 9, by implementing three-dimensional operations on the two-dimensional image captured by the camera 9, a two-dimensional image that looks as if the image of the character-written three-dimensional object was actually captured can be easily obtained.

Processing by the image processing apparatus shown in FIG. 4 is described with reference to the flowchart shown in FIG. 7.

Figure 8:
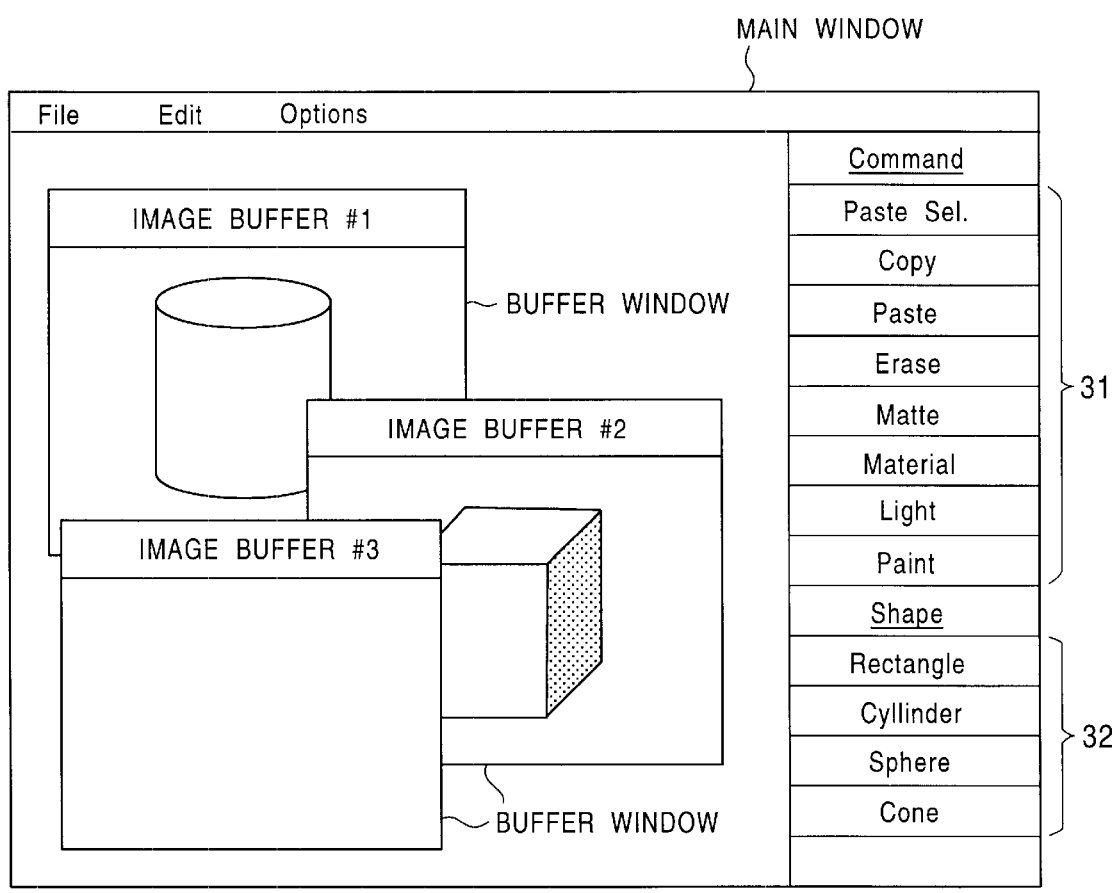
FIG. 8 is an illustration of a main window displayed when the image processing apparatus is activated.

When the application program is executed by the arithmetic circuit 1 (shown in FIG. 3), the image display unit 5 displays, for example, a main window as shown in FIG. 8. Command buttons 31 and Shape buttons 32 are displayed to the right of the main window, and three windows (hereinafter referred to as "buffer windows") displaying two-dimensional images stored in the image buffer are displayed to the left of the window.

Each Command button is operated when a command is input. In the main window shown in FIG. 8, the Command buttons 31 consist of a Paste Select button that is operated when a paste buffer selection is performed, a Copy button that is operated when copying is performed, a Paste button that is operated when pasting is performed, an Erase button that is operated when erasing is performed, a Matte button that is operated when a matte operation is performed, a Material button that is operated when object property processing is performed, a Light button that is operated when illumination changing is performed, and a Paint button that is operated when painting is performed.

Each Shape button 32 is operated when the shape (shape information) of the surface of a three-dimensional object is input. In the main window shown in FIG. 8, the Shape buttons 32 consist of a Rectangle button, a Cylinder button, a Sphere button, and a Cone button that designate a rectangle, a cylindrical side surface, a sphere, and a conical surface, respectively.

In the main window shown in FIG. 8, the three buffer windows respectively display contents stored in image buffers #1, #2, and #3 among the image buffers (where the suffix i of image buffer #i represents, for example, a buffer ID). When a plurality of buffer windows are displayed, among the plurality of buffer windows, a buffer window displaying the content of a buffer of interest (described below) is displayed as a foreground (set to be active).

The operation of the main window is basically unified into a user interface in which an image buffer for processing is selected and a type of processing is subsequently selected. Accordingly, the user initially operates the input unit 6 to click any one of the buffer windows displayed in the main window, whereby an image buffer for processing is selected.

Specifically, when the user clicks any one of the buffer windows, in step S1, the input event processor 11 selects, as a buffer of interest, an image buffer whose storage content is displayed on the buffer window.

After that, the user clicks any one of the Command buttons 31. At this time, in step S2, the input event processor 11 recognizes which of the Command buttons 11 is clicked. The input event processor 11 proceeds to step S3, and determines which type of processing (operation) is designated, based on the recognition. In step S3, when the input event processor 11 has determined that paste buffer selection has been designated, in other words, when the Paste Selection button among the Command buttons 31 has been operated (clicked), the input event processor 11 proceeds to step S4, and activates the paste buffer selector 14 to perform paste buffer selection. In other words, the paste buffer selector 14 overwrites the buffer ID storage 21 with the buffer ID of the buffer of interest. Thereby, the image buffer corresponding to the present buffer of interest is used as a paste buffer, and the input event processor 11 proceeds back to step S1.

If the input event processor 11 has determined in step S3 that either copying or pasting has been instructed, in other words, when the Copy button or the Paste button among the Command buttons 31 has been operated, the input event processor 11 proceeds to step S5 at the time of the operation of the Shape button. Copying is a process that consists of generating an expanded image formed by expanding, on a two-dimensional plane, planes constituting a three-dimensional object displayed in a two-dimensional image stored in the buffer of interest, and storing the expanded image in the paste buffer. Pasting is a process that consists of pasting the image on the two-dimensional plane, which is stored in the paste buffer, on the planes constituting the three-dimensional object so that a projected image on the screen is generated, and pasting the projected image on the two-dimensional image stored in the buffer of interest. In either process, the planes constituting the three-dimensional object are processed. Accordingly, when the user operates the Copy button or the Paste button, the user designates (inputs) shape information on the planes constituting the three-dimensional object by successively operating any one of the Shape buttons 32.

In step S5, based on the operation of any one of the Shape buttons 32, the shape (shape information) of the planes constituting the three-dimensional object, which are copied or pasted, is recognized. When characteristic points are input, the input event processor 11 proceeds to step S6. In other words, in copying, it is required that portions (planes) generating the expanded image be specified by designating some of the points constituting the planes of the three-dimensional object displayed in the two-dimensional image stored in the buffer of interest. In pasting, in order that the projected image of the image stored in the paste buffer may be pasted on the planes constituting the three-dimensional object displayed on, for example, the two-dimensional image stored in the buffer of interest, the projected image needs to be specified by designating some of the points constituting the projected image. Accordingly, the user operates the Copy button or the Paste button, and operates any one of the Shape buttons 32 to successively designate the shape of the three-dimensional object to be copied or pasted. After that, the user operates the input unit 6 to designate, as characteristic points, some of the points constituting the planes (to be processed) of the three-dimensional object in the two-dimensional image stored in the buffer of interest.

In step S6, the coordinates of the characteristic points designated as described above are recognized.

In the above-described case, the characteristic points are designated after designating the shape of the three-dimensional object. However, the shape of the three-dimensional object may be designated after designating the characteristic points. When copying is instructed, the copy processor 12 performs steps S5 and S6, and when pasting is instructed, the paste processor 13 performs steps S5 and S6.

In step S6, the copy processor 12 or the paste processor 13, which has recognized the characteristic points designated by the user, supplies the characteristic points to the designated transform processor 19. When the designated transform processor 19 receives the characteristic points, in step S7, it corrects their positions, and supplies the corrected points to the copy processor 12 or the paste processor 13, which supplied the characteristic points.

In step S8, the input event processor 11 determines whether either the Copy button or the Paste button has been operated. If the input event processor 11 has determined in step 8 that the Copy button has been operated, the copy processor 12 performs copying. At this time, the input event processor 11 proceeds from step S8 to S9, and the copy processor 12 computes a transform expression (hereinafter referred to as a "inverse transform expression") for transforming, based on the shape information and the characteristic points, the planes of the three-dimensional object in the two-dimensional image stored in the buffer of interest into an expanded image. The copy processor 12 supplies it to the image transform processor 20. In step S10, the image transform processor 20 transforms, based on the inverse transform expression, the planes (specified by the characteristic points) of the three-dimensional object in the two-dimensional image stored in the buffer of interest into an expanded image. In step S11, the image transform processor 20 copies (performs overwriting with) the expanded image in the image buffer whose buffer ID is stored in the buffer ID storage 21, that is, in the paste buffer. After that, the input event processor 11 returns to step S1.

Figure 9A:
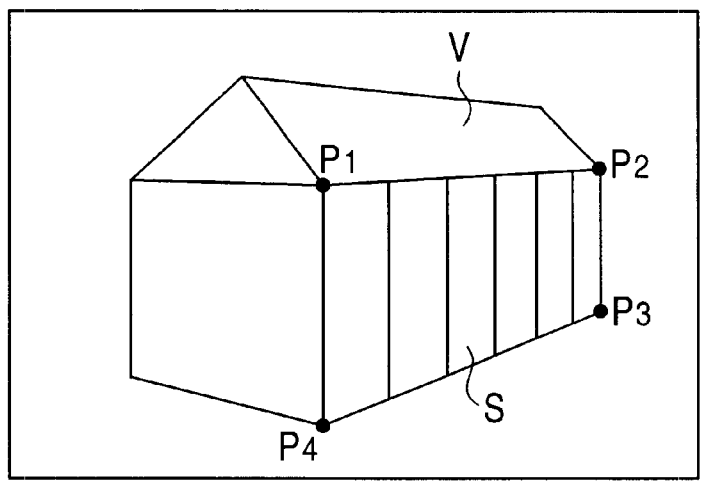
FIGS. 9A and 9B are drawings illustrating copying.
Figure 9B:
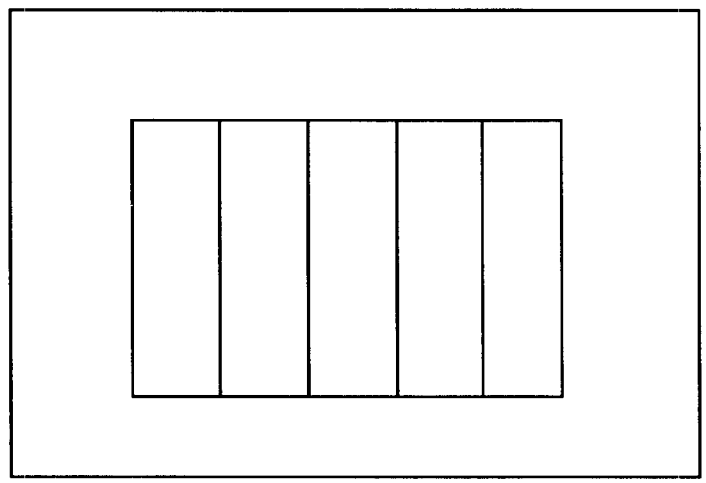

According to the above-described copying, when a two-dimensional image on which a house-shaped three-dimensional object V is displayed as shown in FIG. 9A is stored in the buffer of interest, by designating, as shape information, a rectangle that is the shape of a wall S with vertical lines, and designating, as characteristic points, four vertices $P_1$, $P_2$, $P_3$, and $P_4$ on the wall S, the two-dimensional image (expanded image) of the wall S with vertical lines, obtained by expanding the three-dimensional object V on the two-dimensional plane, is generated as shown in FIG. 9B and stored in the paste buffer.

Therefore, when the two-dimensional image (as shown in FIG. 9A) on which the three-dimensional object V is displayed is stored in the image buffer, in order that an expanded image of the wall S with vertical lines may be obtained, the user needs to perform the following operations. First, the user sets, as a buffer of interest, the image buffer storing the two-dimensional image on which the three-dimensional object V is displayed. Second, the user operates the Copy button instructing copying. Third, the user operates the Rectangle button designating the shape of the wall S. Fourth, the user designates, as characteristic points, four vertices $P_1$, $P_2$, $P_3$, and $P_4$ of the rectangle forming the wall S with vertical lines in the two-dimensional image.

In step S8, if the input event processor 11 has determined that the Paste button has been operated, the paste processor 13 performs pasting. In this case, the input event processor 11 proceeds from step S8 to S12, and the paste processor 13 computes a transform expression for transforming, based on the shape information and the characteristic points, the image on the two-dimensional plane stored in the paste buffer into a projected image. The paste processor 13 supplies it to the image transform processor 20. In step S13, the image transform processor 20 transforms, based on the transform expression, the image stored in the paste buffer into a projected image. In step S14, the image transform processor 20 pastes the projected image on the plane (specified by characteristic points) of the three-dimensional object displayed in the two-dimensional image stored in the buffer of interest. After that, the input event processor 11 returns to step S1.

According to the above-described pasting, when the image on the two-dimensional plane (shown in FIG. 10A) is stored in the paste buffer by the copying described with reference to FIGS. 9A and 9B, and the two-dimensional image on which the house-shaped three-dimensional object V is stored in the buffer of interest, by designating, as shape information, a rectangle that is the shape of an unfigured wall S', and designating, as characteristic points, four vertices $P_1'$, $P_2'$, $P_3'$, and $P_4'$ of the unfigured wall S', an expanded image of the wall S', formed in the case where the three-dimensional object V is projected on the screen when the image stored in the paste buffer is pasted on the wall S' of the three-dimensional object V, is generated and pasted on the wall S' specified by the characteristic points $P_1'$, $P_2'$, $P_3'$, and $P_4'$ of the three-dimensional object V displayed on the two-dimensional image stored in the buffer of interest.

Figure 10A:
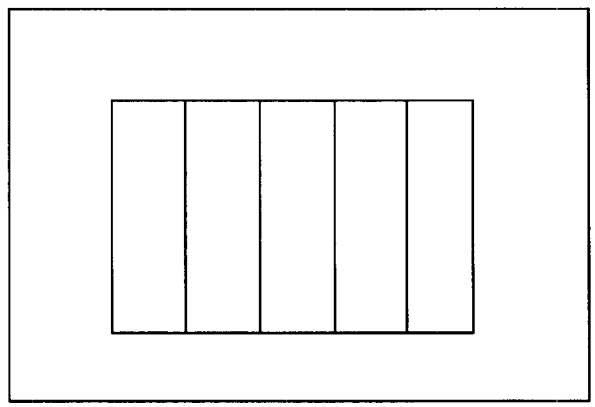
FIGS. 10A, 10B, and 10C are drawings illustrating pasting.

Therefore, when the image shown in FIG. 10A is stored in the paste buffer, and the two-dimensional image (shown in FIG. 10B) on which the house-shaped three-dimensional object V is displayed is stored, in order that a two-dimensional image in which the image stored in the paste buffer is pasted on the wall S' of the three-dimensional object V may be obtained, the user needs to perform the following operations. First, the user sets, as a buffer of interest, the image buffer storing the two-dimensional image on which the three-dimensional object V is displayed. Second, the user operates the Paste button for instructing pasting. Third, the user operates the Rectangle button for designating the shape of the wall S'. Fourth, the user designates, as characteristic points, four vertices $P_1$, $P_2$, $P_3$, and $P_4$ of the rectangle forming the wall S' in the two-dimensional image.

Figure 10B:
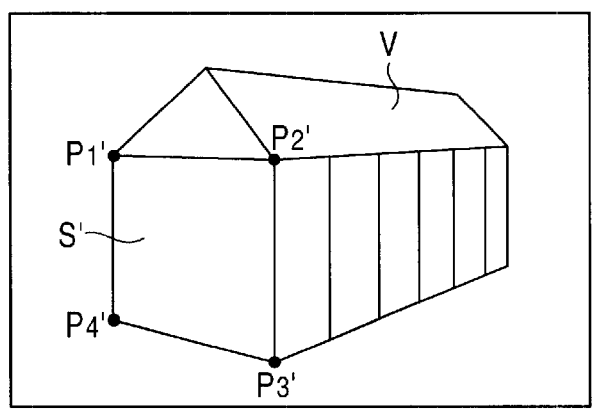
Figure 10C:
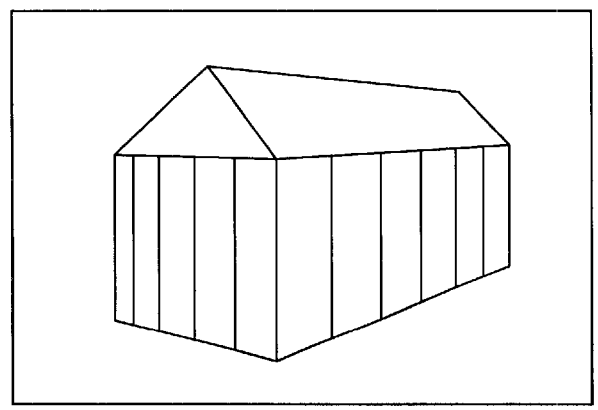

As is clear from the above-described descriptions, by performing the copying described with FIGS. 9A and 9B while using, as a buffer of interest, an image buffer storing a two-dimensional image on which the three-dimensional object V is displayed, and performing the pasting described with FIGS. 10A, 10B, and 10C, the texture of the wall S can be copied on another wall S'. In other words, the user can copy the texture of the wall S in the two-dimensional image on another wall S by only performing the above-described copying and pasting without paying attention to the directions of the walls S and S'.

In addition, by using conventional two-dimensional paint, or the like, to write the characters "ABC" or "DEF" in the paste buffer, similar to the writing of characters on a plane, and using pasting to paste the characters on the wall of the house shown in FIG. 5A, a natural two-dimensional image as shown in FIG. 5B can be obtained. In other words, it is not necessary to write the characters along the wall.

By performing copying so that an expanded image is stored in the paste buffer, or selecting, as the paste buffer, an image buffer storing a texture, and performing pasting three times after designating, as characteristic points, vertices $p_1$, $p_2$, $p_3$, and $p_4$ constituting the plane $S_1$ (shown in FIG. 5C), vertices $p_3$, $p_4$, $p_5$, and $p_6$ constituting the plane $S_2$ (shown in FIG. 5C), and vertices $p_2$, $p_3$, $p_6$, and $p_7$ constituting the plane $S_3$ (shown in FIG. 5C), a two-dimensional image in which a parallelepiped room is added to the wall of the house can be easily created (In this case, rectangles are designated for pieces of shape information of planes $S_1$, $S_2$, and $S_3$).

As is understood from FIGS. 5A to 5C, a three-dimensional object for pasting may be displayed or may not be displayed in the two-dimensional image stored in the buffer of interest. In other words, FIG. 5B shows that a three-dimensional object for pasting (three-dimensional object on which characters are pasted) is displayed on the original two-dimensional image (the two-dimensional image shown in FIG. 5A. FIG. 5C shows that a three-dimensional object (parallelepiped defined by the planes $S_1$, $S_2$, and $S_3$ shown in FIG. 5C) for pasting is not displayed on the original two-dimensional image. In the case where a three-dimensional object for pasting is not on the original two-dimensional image, correction of characteristic points designated by the user, which are points of the three-dimensional object, that is, step S7 shown in FIG. 7, is skipped. This is because user-designated characteristic points are corrected to be positioned on the contour line of the three-dimensional object in step 7 as described below, but when the three-dimensional object is not displayed on the original two-dimensional image, its contour line does not exist.

Figure 11:
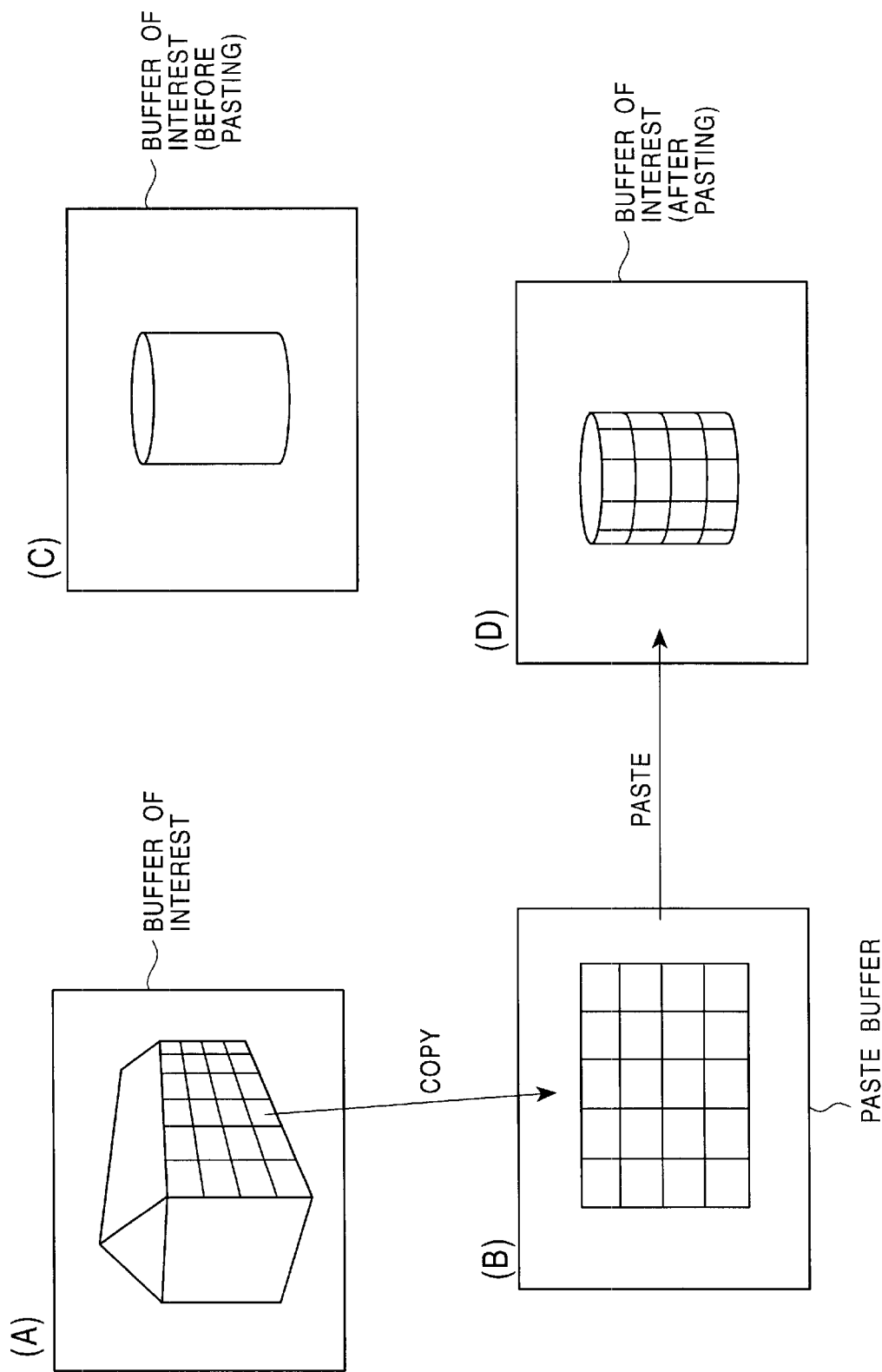
FIG. 11 consists of drawings (A), (B), (C), and (D) illustrating texture copying by using a combination of copying and pasting.

An expanded image obtained by copying based on a two-dimensional image may be pasted on a two-dimensional image excluding the original two-dimensional image. The plane of a three-dimensional object on which the expanded image is pasted may not have the same shape as the plane of the original three-dimensional object for generating the expanded image. For example, by performing copying on a latticed wall of a three-dimensional object displayed in a two-dimensional image as shown in FIG. 11A, storing the expanded image in the paste buffer as shown in FIG. 11B, and performing pasting on the side plane of a cylinder displayed in a two-dimensional image as shown in FIG. 11C, the latticed expanded image can be pasted along the side plane of the cylinder. In other words, the texture of a three-dimensional object can be pasted as the texture of another three-dimensional object.

In the paste buffer, not only images obtained by copying, but also arbitrary images can be stored. According to pasting, an arbitrary image can be pasted on a three-dimensional object displayed in a two-dimensional image (As described above, the three-dimensional object does not need to be displayed on the two-dimensional image).

According to copying and pasting, in addition to the above-described operations, various three-dimensional operations on a two-dimensional image can be performed. For example, in the case where the plane of a three-dimensional object displayed in the two-dimensional image is irregular, by storing an expanded image of the plane in the paste buffer, deleting the irregularity in the paste buffer, and using pasting to paste the irregularity-deleted image on the original three-dimensional object, a two-dimensional image on which the irregularity-deleted three-dimensional object is displayed can be obtained. In addition, for example, when copying and pasting on the same three-dimensional object is performed, by replacing characteristic points to be designated for pasting by characteristic points to be designated for pasting, movement, enlargement, reduction, and other non-linear transformation (e.g., transformation producing virtual effects of image capture using a lens having optical characteristics, such as a so-called "fish-eye lens", etc.) on a three-dimensional object can be performed.

Referring back to FIG. 7, if the input event processor 11 has determined in step S3 that the matte operation has been instructed, in other words, when among the Command buttons 31, the Matte button has been operated, the input event processor 11 proceeds to step S15, and activates the matte processor 16 to perform the matte operation. At this time, the mate processor 16 generates and stores, in the buffer of interest, the matte of the three-dimensional object displayed in the two-dimensional image stored in the buffer of interest, and returns to step S1. The details of the matte operation are described below.

If the input event processor 11 has determined in step S3 that object property processing or illumination change has been instructed, in other words, among the Command buttons 31, the Material button or the Light button has been operated, the input event processor 11 proceeds to step S16. In step S16, the input event processor 11 activates the object property processor 17 to perform the object property processing or illumination change (object property/illumination change processing), and returns to step S1. The details of the object property processing or illumination change are described below.

If the input event processor 11 has determined in step S3 that erasing has been instructed, in other words, when among the Command buttons 31, the Erase button has been operated, the input event processor 11 proceeds to step S17. In step 17, the input event processor 11 activates the erase processor 17 to perform erasing, and returns to step S1. The details of erasing are described below.

If the input event processor 11 has determined in step S3 that painting has been instructed, in other words, when among the Command buttons 31, the Paint button has been operated, the input event processor 11 proceeds to step S18. In step S18, the input event processor 11 activates the paint processor 18 to perform painting, and return to step S1. In painting, by using, for example, a paint tool performing two-dimensional paint similar to conventional one, part of an image stored in the paste buffer is erased or another image is added in accordance with user operations from the input unit 6.

As described above, in the case where the plane of a three-dimensional object displayed in the two-dimensional image is irregular, by storing an expanded image of the plane in the paste buffer, deleting the irregularity in the paste buffer, and using pasting to paste the irregularity-deleted image on the original three-dimensional object, a two-dimensional image on which the irregularity-deleted three-dimensional object is displayed can be obtained.

By performing copying on a two-dimensional image on which the three-dimensional object is displayed as shown in FIG. 5A, storing an expanded image of the walls in the paste buffer, using painting to write the characters "ABC" or "DEF" on the image stored in the paste buffer, and using pasting to paste the character-written image on the original walls, a natural two-dimensional image can be obtained as shown in FIG. 5B. In other words, two-dimensional paint enables facile three-dimensional rendering.

Figure 12:
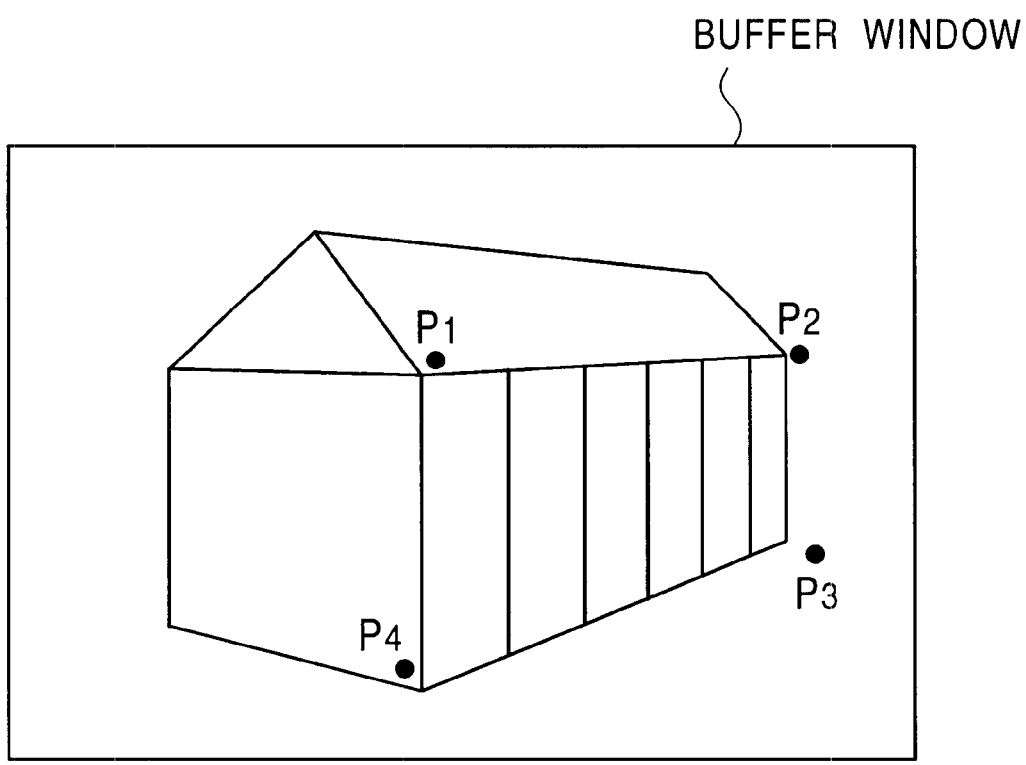
FIG. 12 is an illustration of characteristic points designated by a user.

When copying described with reference to FIGS. 9A and 9B, or pasting described with reference to FIGS. 10A to 10C, is performed, it is difficult for an operation-experienced user to accurately designate the positions of vertices $P_1$ to $P_4$ or vertices $P_1'$ to $P_4'$ as characteristic points. In other words, when copying described with reference to FIGS. 9A and 9B is performed, the user-designated characteristic points $P_1$ to $P_4$ shift from the positions of vertices to be essentially designated, as shown in FIG. 12. When the two-dimensional image defocuses or is blurred, it is impossible for even the experienced user to accurately designate, as characteristic points, the positions of vertices to be essentially designated.

Figure 7:
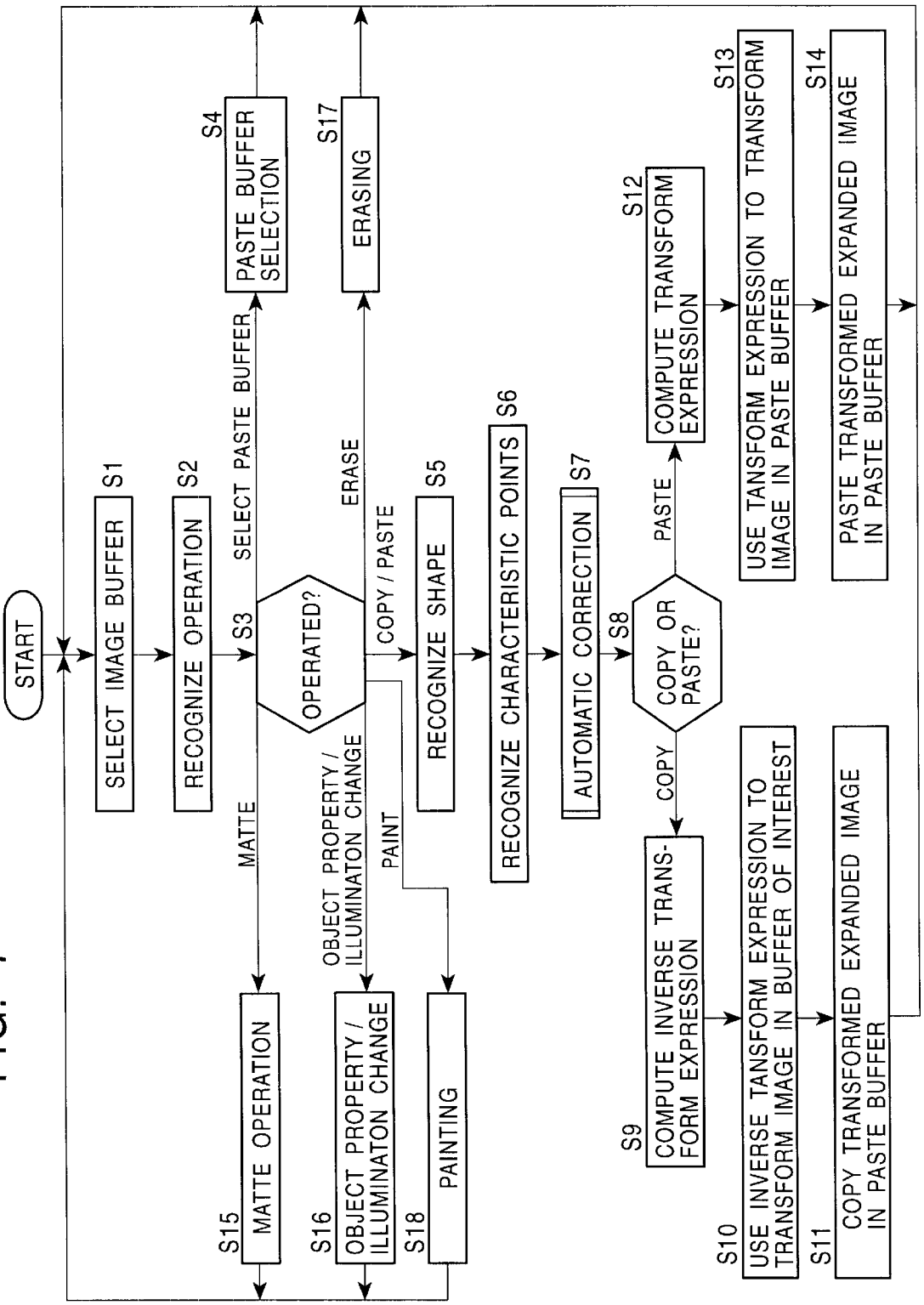
FIG. 7 is a flowchart illustrating a process performed by the image processing apparatus shown in FIG. 4.

Accordingly, in step S7 in FIG. 7, automatic correction is performed so that the positions of the characteristic points designated by the user are corrected to the positions to be essentially designated.

In other words, in step S7, the copy processor 12 or the paste processor 13 activates the designated transform processor 19 to supply shape information and characteristic points designated from the input unit 6 operated by the user.

When the designated transform processor 19 receives the shape information and the characteristic points, it performs the automatic correction for correcting the characteristic points.

The points to be designated are basically points on the contour line (borderline) of planes of a three-dimensional shape used for copying or pasting, as described below. Accordingly, the designated transform processor 19 extracts the contour line of the three-dimensional shape (plane) used for copying or pasting, and corrects the characteristic points so as to be positioned on the contour line.

Figure 13:
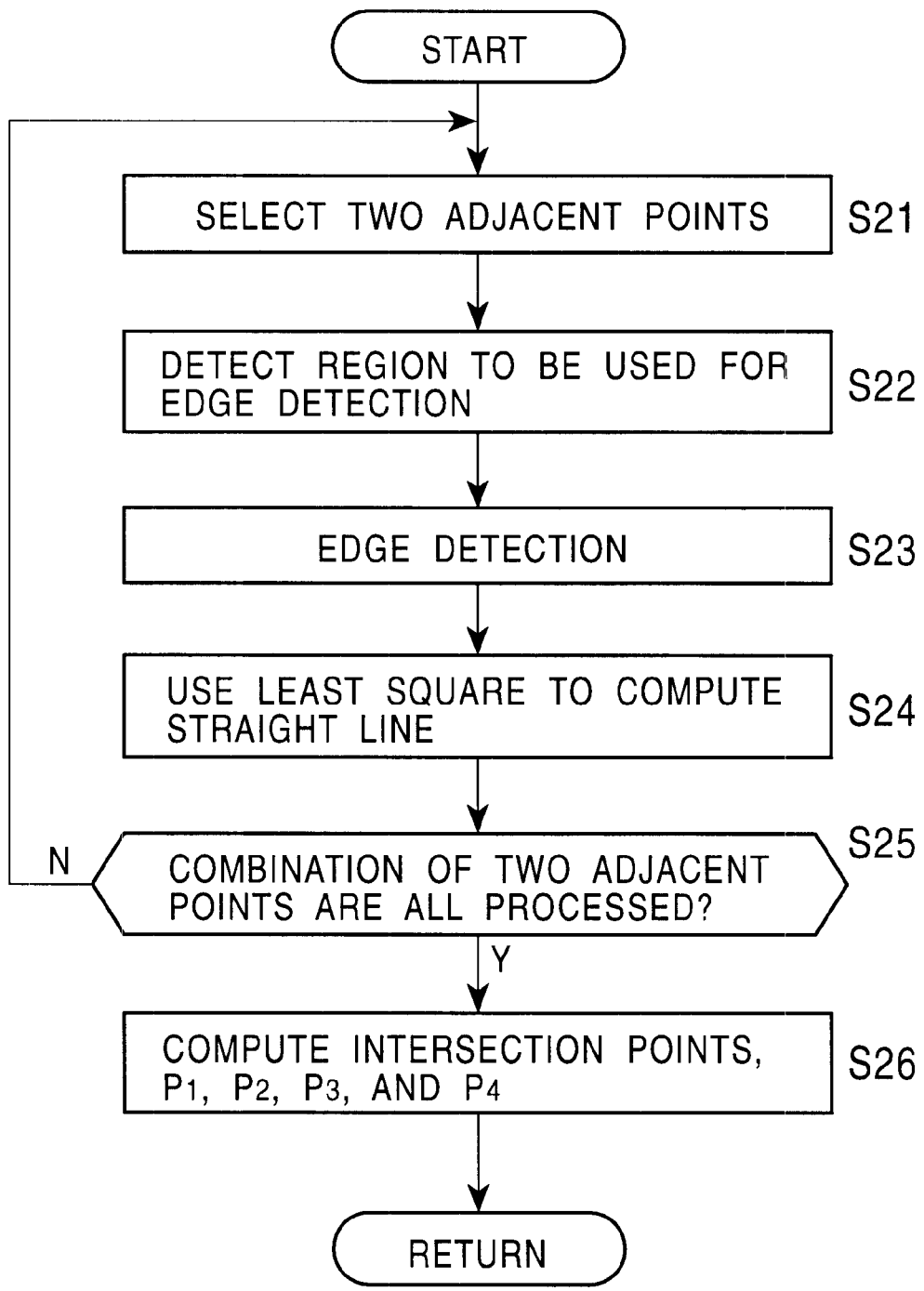
FIG. 13 is a flowchart illustrating the details of automatic correction in step S7 shown in FIG. 7.

FIG. 13 shows a flowchart describing automatic correction performed by the designated transform processor 19. To make description simpler, an example is given hereinafter wherein a plane of a three-dimensional object displayed on a two-dimensional image, which is used for the copying or pasting, is a quadrangle as shown in FIG. 12. Therefore, as illustrated in FIG. 12, four vertices of the quadrangle should be designated as characteristic points.

In the designated transform processor 19, firstly in step 21, a combination of two adjacent points is selected from characteristic points inputted (designated) by the user. Specifically, points that should be designated as characteristic points are, as described above, basically on a contour line of a plane of the three-dimensional object displayed on the two-dimensional image, which is used for the copying or pasting. Also it is determined in advance, according to a shape of the three-dimensional object, which points on the contour line the user should designate as characteristic points, as described in the following. Since two adjacent characteristic points on the contour line can be recognized from the characteristic points inputted by the user based on the shape information, the designated transform processor 19 selects one of the combinations of two characteristic points recognized in such a manner.

In step S22, a region to be used for edge detection, performed in step S23 described below, (hereinafter referred to as an edge candidate region) is detected. Specifically, in step S22, for example, a line segment connecting two characteristic points selected in step S21 (hereinafter referred to as selected characteristic points) is obtained, and pixels within a range of a predetermined distance (a distance of five-pixels, for example) from the line segment are detected. Such detected pixels form an edge candidate region.

Figure 14:
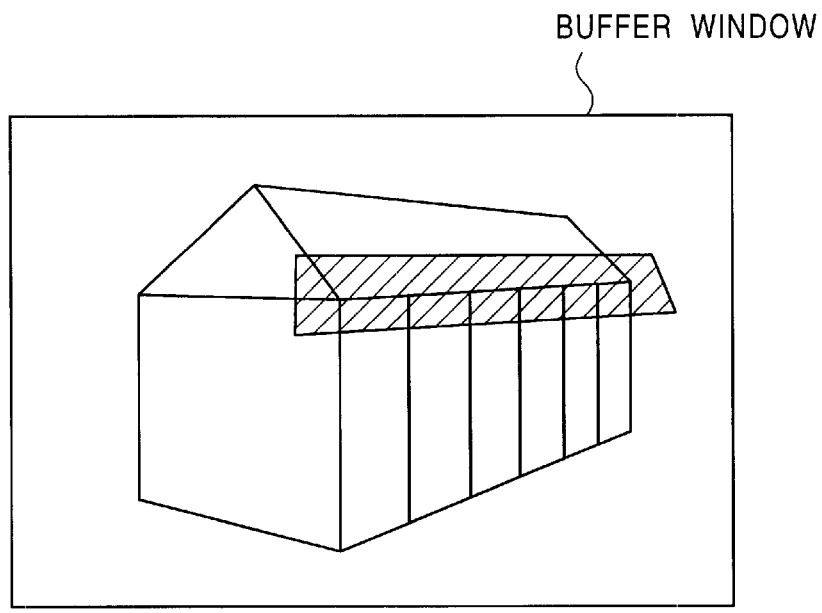
FIG. 14 is a drawing illustrating step S22 shown in FIG. 13.

Specifically, given that the characteristic points $P_1$ to $P_4$ are designated, for example, as shown in FIG. 12, when the characteristic points $P_1$ and $P_2$ are selected as the selected characteristic points, a shaded region shown in FIG. 14 is detected as the edge candidate region.

As well as allowing the user to input a desired distance by operating the input unit 6, it is possible to preset a distance range from the line segment connecting two selected characteristic points, wherein pixels are detected.

After the edge candidate region is detected, the process proceeds to step S23 wherein edge detection is performed using the edge candidate region.

Various types of conventional methods are proposed heretofore as edge detection methods, all of which are applicable here. In this embodiment, the following method, for example, is taken.

Specifically, pixels within the edge candidate region are filtered by an edge detection filter called a Sobel operator, and a gradient (gradient vector) in each pixel is obtained. It is conventionally known in the art to detect pixels having a greater gradient. In this embodiment, however, an inner product of a unit vector meeting at right angles with the line segment connecting the two selected characteristic points, namely, a normal vector, and a gradient in each pixel within the edge candidate region is computed, and a pixel having an inner product not smaller than a predetermined threshold level is detected as a pixel forming an edge (hereinafter referred to as an edge pixel).

As indicated in FIG. 12, the characteristic points are designated such that they do not exactly coincide with, but are in the vicinity of, the vertices of the quadrangle which form the plane of the three-dimensional object used for the copying or pasting. Therefore, the line segment connecting two selected characteristic points approximately coincides with a contour line of the quadrangle which forms the plane of the three-dimensional object used for the copying or pasting. As a result, an inner product of a normal vector and a gradient represents a gradient's component in the normal vector's direction, or in the direction approximately perpendicular to the contour line. Hence, edge detection using values of the inner products reduces adverse effects, compared with edge detection using values of gradients. In other words, it is possible to perform edge detection unaffected by noise or texture such as a moire pattern of a two-dimensional image.

After the edge pixels are detected, the process proceeds to step S24 wherein a straight line crossing the edge pixels is obtained, using, for example, the least squares method. Specifically, in step S24, a line minimizing the sum of the squares of the distances from the edge pixels detected in step S23 (hereinafter referred to as an edge straight line) is obtained.

In step S25, it is determined whether edge straight lines are obtained for all combinations of two adjacent characteristic points inputted by the user. If the result is negative, the process returns to step S21, and two adjacent characteristic points for which an edge straight line is not yet obtained are selected as selected characteristic points and a similar processing is repeated.

If it is determined that edge straight lines are obtained for all combinations of two adjacent points, i.e., edge straight lines are obtained respectively for a combination of characteristic points $P_1$ and $P_2$, a combination of $P_2$ and $P_3$, a combination of $P_3$ and $P_4$, and a combination of $P_4$ and $P_1$ as in FIG. 12, intersection points of four edge straight lines obtained for the four combinations are computed in step S26. Specifically, an intersection point of the edge straight line obtained for the combination of the characteristic points $P_4$ and $P_1$ and the edge straight line obtained for the combination of the characteristic points $P_1$ and $P_2$ (hereinafter referred to as a first intersection point), an intersection point of the edge straight line obtained for the combination of the characteristic points $P_1$ and $P_2$ and the edge straight line obtained for the combination of the characteristic points $P_2$ and $P_3$ (hereinafter referred to as a second intersection point), an intersection point of the edge straight line obtained for the combination of the characteristic points $P_2$ and $P_3$ and the edge straight line obtained for the combination of the characteristic points $P_3$ and $P_4$ (hereinafter referred to as a third intersection point), and an intersection point of the edge straight line obtained for the combination of the characteristic points $P_3$ and $P_4$ and the edge straight line obtained for the combination of the characteristic points $P_4$ and $P_1$ (hereinafter referred to as a fourth intersection point) are computed. Further in step S26, the characteristic point closest to each intersection point is corrected and adjusted to the intersection point, i.e. the characteristic points $P_1$ to $P_4$ are corrected to the positions of first to fourth intersection points, and the process returns.

The above described automatic correction enables the characteristic points $P_1$ to $P_4$ designated by the user to be moved to the vertices of the quadrangle, freeing the user from designating accurate positions of characteristic points. Specifically, the user should only designate points in the vicinity of the positions that should be designated as characteristic points.

In the process shown in FIG. 7, the automatic correction of characteristic points is set to operate every time. However it is possible to set the automatic correction such that it operates only when the user gives an instruction. Also it is possible to allow the user to further correct characteristic points after being corrected by the automatic correction.

Next, the automatic correction can be operated using the edge pixel detection method illustrated in FIG. 13, for example, as described below.

Figure 15:
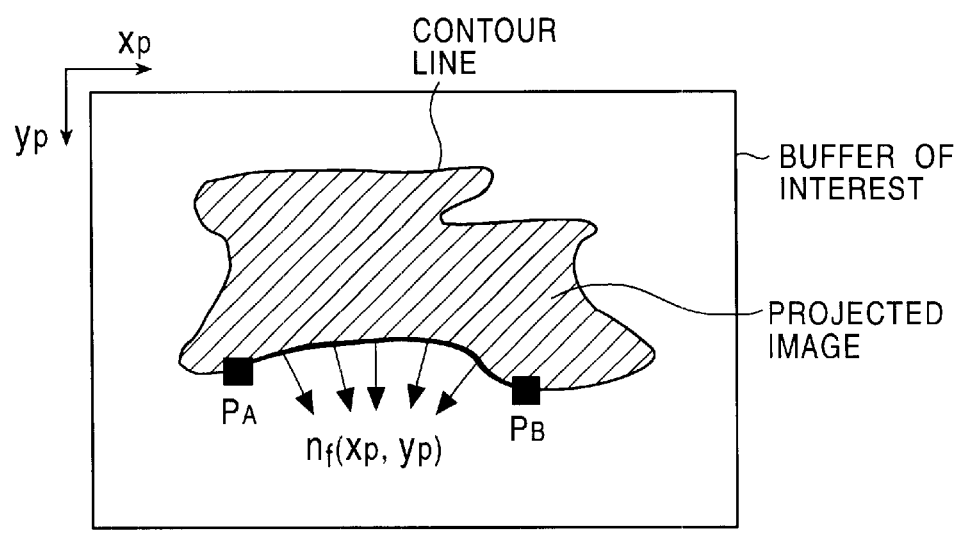
FIG. 15 is a drawing illustrating a method of extracting the contour line of three-dimensional object displayed in a two-dimensional image.

Specifically, it is assumed that a two-dimensional image, such as that shown in FIG. 15, is stored in a buffer of interest. A shaded part in FIG. 15 indicates a three-dimensional object displayed on a two-dimensional image (hereinafter referred to as a projected image hereinafter, since it is the three-dimensional object in three-dimensional space projected onto a screen).

In FIG. 15, points $P_A$ and $P_B$ of the two-dimensional image are designated as characteristic points of the projected image of the three-dimensional object. The points $P_A$ and $P_B$ are adjacent to each other on a contour line of the projected image of the three-dimensional object.

For the two-dimensional image stored in the buffer of interest, a two-dimensional coordinate system having a horizontal $x_p$ axis and a vertical $y_p$ axis is defined as shown in FIG. 15. The form of the three-dimensional object displayed on the two-dimensional image is recognizable from shape information. Once the shape of the three-dimensional object is recognized, a contour line between the characteristic points $P_A$ and $P_B$ of the projected image (since a contour line of the projected image basically forms a closed loop, there are two contour lines between the characteristic points $P_A$ and $P_B$; here, a contour line having no other characteristic point (indicated by a bold line in FIG. 15) is selected from the two contour lines (indicated by bold and thin lines in FIG. 15)) can generally be defined as a function f of variables $x_p$ and $y_p$, f=0, expressed with a plurality of parameters. (The function f has a different type (a package in the field of programming) according to the form of the three-dimensional object.)

Specifically, expressing the parameters by $C_1, C_2, \ldots, C_N$ (N is an integer not smaller than 1), a contour line between the characteristic points $P_A$ and $P_B$ is defined as:

$$f(x_P, y_P, C_1, C_2, \ldots, C_N)=0 \qquad (1)$$

In the meantime, pixels forming the true contour line generally have a component of the pixel level which suddenly varies in the direction perpendicular to the contour line. Hence, when the parameters $C_1, C_2, \ldots, C_N$ that maximize the component in the direction of the normal vector (perpendicular to the contour line) in the pixel, out of a differential value of the pixel level of pixels on the screen coordinate system expressed by the expression (1), are computed, a line defined by the expression (1) using the parameters represents the true contour line.

Then, energy $E_f$ of a line corresponding to the contour line between the characteristic points $P_A$ and $P_B$ defined by the expression (1) (as described above, there are two lines between the characteristic points $P_A$ and $P_B$ which correspond to the contour line of the projected image; here, it is the line having no other characteristic point) is defined as:

$$E_f = \frac{\sum_{\{(x_p, y_p)|f(x_p, y_p, P_1, \ldots, P_N)=0\}} |\nabla B(x_p, y_p) \cdot n_f(x_p, y_p)|}{K} \qquad (2)$$

In the expression (2), $\Sigma$ indicates summation for all pixels on the line expressed by the expression (1). Also $\nabla$ represents the nabla operator and $B(x_P, y_P)$ represents a pixel level of a pixel at a position $(x_P, y_P)$ on the screen coordinate system. A vector $n_f(x_P, y_P)$ represents a normal vector at a pixel at a position $(x_P, y_P)$ (a unit vector at a position $(x_P, y_P)$ of a vector (here, e.g., an outward vector in a region enclosed by the contour line) perpendicular to the line expressed by the expression (1)). Also $|x|$ represents a norm of a vector x and · represents an inner product. In addition, K represents the total of pixels on the line expressed by the expression (1).

$\nabla B(x_P, y_P)$ in the expression (2) represents a differential value of a pixel level of a pixel on the line expressed by the expression (1), namely, a gradient, which can be computed using the Sobel operator. Specifically, $\nabla B(x_P, y_P)$ can be computed using the following expression:

$$\nabla B(x_p, y_p)=(\Delta_x B(x_p, y_p), \Delta_y B(x_p, y_p))$$

$$\Delta_x B(x_p, y_p)=B(x_p+1, y_p-1)+2B(x_p+1, y_p)+B(x_p+1, y_p+1)-(B(x_p-1, y_p-1)+2B(x_p-1, y_p)+B(x_p-1, y_p+1))$$

$$\Delta_y B(x_p, y_p)=B(x_p-1, y_p+1)+2B(x_p, y_p+1)+B(x_p+1, y_p+1)-(B(x_p-1, y_p-1)+2B(x_p, y_p-1)+B(x_p+1, y_p-1)) \qquad (3)$$

In addition, a parameter $C_n$ (n=1, 2, ..., N) maximizing energy $E_f$ can be obtained as follows. Expressing the initial value of the parameter $C_n$ by $C_n'$, for example, the expression (2) is computed using the parameter $C_n$ being varied within a range of from $C_n'-\epsilon_n$ to $C_n'+\epsilon_n$ to obtain the parameter $C_n$ when the value is a maximum. ($\epsilon_n$ is a predetermined infinitesimal value.)

Specifically, given that the contour line between the characteristic points $P_A$ and $P_B$ is a line segment L, for example, the expression (2) can be expressed as:

$$E_f = \frac{\sum_{(x_p, y_p) \in L} |\nabla B(x_p, y_p) \cdot n_L|}{K} \quad (4)$$

Here, Σ represents, as described above, the line expressed by the expression (1), namely, summation of all pixels on the line segment L. Also a vector $n_L$ corresponds to the vector $n_f(x_p, y_p)$ in the expression (2), which is a normal vector of the line segment L. In the expression (4), K represents the total of pixels on the line segment L.

Meanwhile, if the contour line between the characteristic points $P_A$ and $P_B$ is a line segment, the expression (1) can be expressed using three parameters $C_1$, $C_2$, and $C_3$, for example, as:

$$f(x_P, y_P, C_1, C_2, C_3) = C_1 x_P + C_2 y_P + C_3 \quad (5)$$

Given that the coordinates of the characteristic points $P_A$ and $P_B$ are $(x_1, y_1)$ and $(x_2, y_2)$, respectively, the parameters $C_1$, $C_2$, and $C_3$ in the expression (5) can be expressed as:

$$C_1 = y_1 - y_2, \quad C_2 = -x_1 + x_2, \quad C_3 = x_1 y_2 - x_2 y_1 \quad (6)$$

Therefore in this case, the values expressed by the expression (6) are used as the initial values $C_1'$, $C_2'$, and $C_3'$ of the parameters $C_1$, $C_2$, and $C_3$ for computing energy $E_f$ expressed by the expression (4) while varying each value, and the parameters $C_1$, $C_2$, and $C_3$ that maximize the energy $E_f$ are obtained. The expression (5) using these parameters $C_1$, $C_2$, and $C_3$ represents the true contour line between the characteristic points $P_A$ and $P_B$. Thus, moving the characteristic points $P_A$ and $P_B$ onto the line expressed by the expression (5) means that they are moved onto the true contour line.

Provided that the contour line between the characteristic points $P_A$ and $P_B$ is a line segment, varying the parameters $C_1$, $C_2$, and $C_3$ corresponds to varying the coordinates of each characteristic point $P_A$ and $P_B$, being $(x_1, y_1)$ and $(x2, y2)$, respectively. Accordingly, the coordinates $x_1$, $y_1$, $x_2$, and $y_2$ are the parameters of the function f.

When the contour line between the characteristic points $P_A$ and $P_B$ is a line segment, the initial values are provided for three parameters of the function f in the expression (5) by the characteristic points $P_A$ and $P_B$. Meanwhile, when the contour line between the characteristic points $P_A$ and $P_B$ is a curve, the initial values are not necessarily provided for all the parameters of the function f. In the latter case, a predetermined value may be given as an initial value, or the user may input a desired initial value.

In the above description, only two adjacent characteristic points are used so that the description is simpler to understand. However, a problem such as in the following may occur in actual processing. Given that three characteristic points, namely, a characteristic point #1, a characteristic point #2 adjacent to #1, and a characteristic point #3 adjacent to #2, are designated on a contour line, when the above automatic correction first using the characteristic points #1 and #2, and then using the characteristic points #2 and #3 are processed, the position of the characteristic point #2 after being corrected by the automatic correction using the characteristic points #1 and #2, and the position of the characteristic point #2 after being corrected by the automatic correction using the characteristic points #2 and #3 may not meet each other.

Therefore in the actual processing, parameters of the expression (1) defining the contour line between the characteristic points #1 and #2 (hereinafter referred to as first parameters) and parameters of the expression (1) defining the contour line between the characteristic points #2 and #3 (hereinafter referred to as second parameters) may preferably be altered so that such a deviation of corrected positions of the characteristic point #2 does not occur. In this case, the first and second parameters are not independent; their relationship is restricted by a condition that the corrected positions of the characteristic point #2 do not deviate from each other. Consequently, the relationship between the first parameters maximizing the energy $E_f$ of the expression (2) using the characteristic points #1 and #2, and the second parameters maximizing the energy $E_f$ of the expression (2) using the characteristic points #2 and #3 may not satisfy the condition that the corrected positions of the characteristic point #2 do not deviate from each other. In such a case, the first and second parameters that maximize the sum of the energy $E_f$ of the expression (2) using the characteristic points #1 and #2, and the energy $E_f$ of the expression (2) using the characteristic points #2 and #3 can be obtained.

To make the description simpler, an example is considered in which the deviation of one characteristic point #2 occurs. However, such a deviation may occur in all the characteristic points on the same contour line. Thus, it is preferred to compute parameters of the expression (1) defining a contour line between a combination of adjacent points for all the combinations using the above method. Specifically, it is preferred to compute the total energies $E_f$ of combinations of adjacent characteristic points and obtain parameters that maximize the total.

Figure 16:
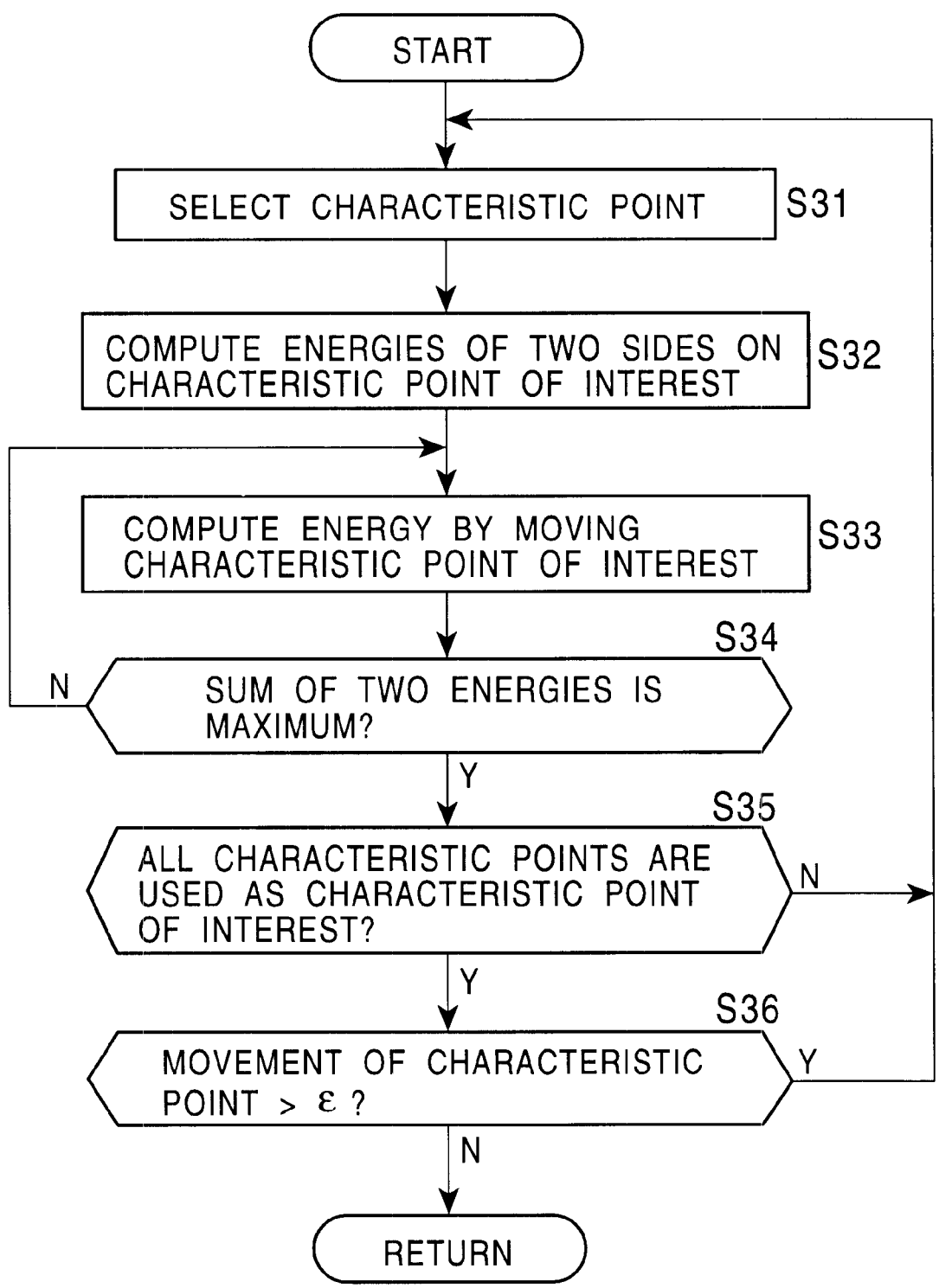
FIG. 16 is a flowchart illustrating the details of step S7 shown in FIG. 7.
Figure 17:
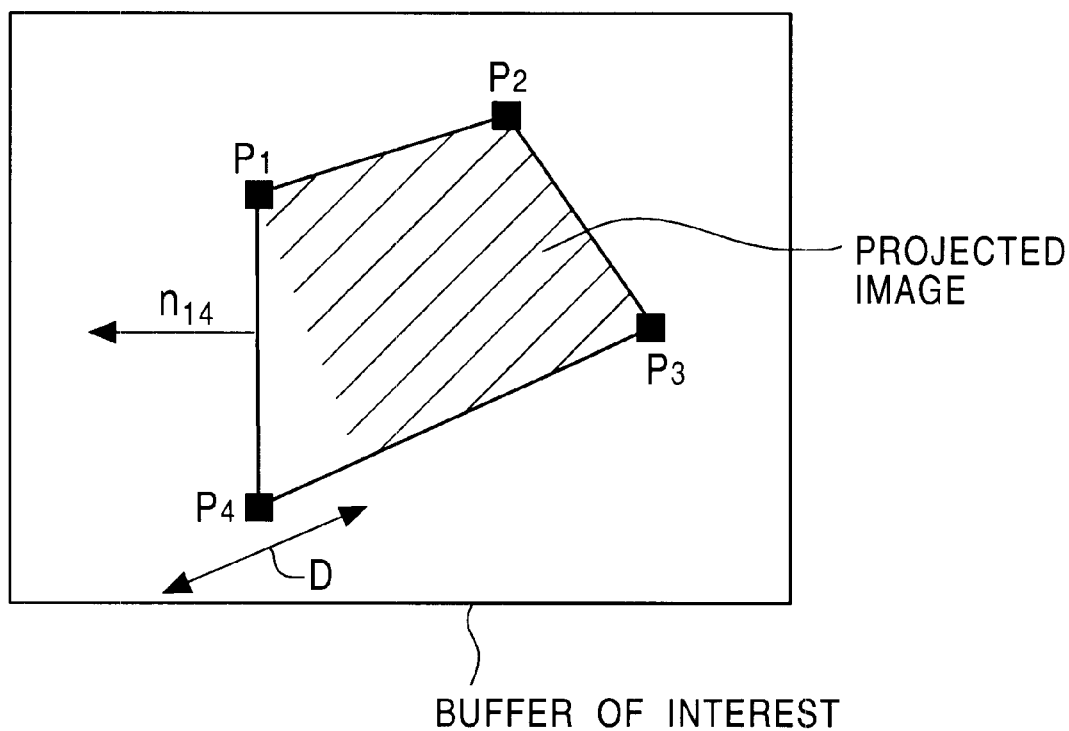
FIG. 17 is a drawing illustrating correction of characteristic points.

Now referring to a flowchart in FIG. 16 and to FIG. 17, the above automatic correction processed in step S7 in FIG. 7 is described.

To make the description simpler, it is assumed that a projected image is a quadrangle and four vertices of the quadrangle are designated as characteristic points $P_1$ to $P_4$.

Also in this case, energy $E_f$ expressed by the expression (4) is computed by varying three parameters $C_1$, $C_2$, and $C_3$ in the expression (5), i.e. x-coordinates $x_1$ and $x_2$ and y-coordinates $y_1$ and $Y_2$ of two characteristic points in the expression (6), and $x_1$, $x_2$, $y_1$, and $y_2$ maximizing the energy $E_f$ are obtained. Since such computation is quite complex, a simplified method is used here to reduce the computational complexity.

Specifically at first in step S31, one of four characteristic points $P_1$ to $P_4$ is selected as a characteristic point of interest. In step S32, energies $E_f$ of two sides of the quadrangle crossing the characteristic point of interest (connecting the characteristic point of interest and other characteristic points) are computed. For example, given that the points $P_1$ to $P_4$ are designated as characteristic points of a shaded projected image, as in FIG. 17, and the characteristic point $P_4$ is selected as a characteristic point of interest, energies $E_f$ of sides $P_4 P_1$ and $P_3 P_4$, which cross the characteristic point of interest $P_4$, among four sides of a quadrangle $P_1 P_2 P_3 P_4$, are obtained in step S32.

In step S33, one of the two sides, for which the energies $E_f$ are computed in step S32, having a greater energy $E_f$ is selected as a line closer to a contour line of the projected image. The characteristic point of interest is shifted along a straight line extending that selected side (occasionally referred also as an edge straight line). Then energies $E_f$ of two sides formed by the shifted characteristic point of interest and two characteristic points adjacent to the shifted characteristic point of interest are computed. Specifically, given that the characteristic point $P_4$ is selected as the characteristic point of interest, as in FIG. 17, when energy $E_f$ of the side $P_3 P_4$ is greater than energy $E_f$ of the side $P_4 P_1$, the characteristic point of interest $P_4$ is shifted along the straight line $P_3P_4$ as represented by an arrow D in the drawing. Then energy $E_f$ of the side $P_3P_4$ formed by the shifted characteristic point of interest $P_4$ and one characteristic point $P_3$ adjacent to $P_4$, and energy $E_f$ of the side $P_4P_1$ formed by the shifted characteristic point of interest $P_4$ and the other characteristic point $P_1$ adjacent to $P_4$ are computed.

After that, it is determined in step S34 whether the sum of the energies of two sides computed in step S33 is a maximum. If the result is negative, the process returns to step S33 and the characteristic point of interest is shifted again along the edge straight line, and a similar processing is repeated.

On the other hand, when it is determined that the sum of the energies of the two sides computed in step S33 is a maximum, or as described above, when, by shifting the characteristic point $P_4$ along the straight line $P_3P_4$, a normal vector $n_{14}$ of the side $P_4P_1$ approximately meets at right angles with a side connecting two vertices that should originally be designated by the characteristic points $P_1$ and $P_4$, the process proceeds to step S35. In step S35 it is determined whether all characteristic points $P_1$ to $P_4$ have been used as characteristic points of interest. If the result is negative, the process returns to step S31 and the characteristic point that has not yet been used as a characteristic point of interest is selected as a characteristic point of interest, and step S32 and those that follow are repeated.

If it is determined in step S35 that all characteristic points $P_1$ to $P_4$ have been used as characteristic points of interest, the process proceeds to step S36. In step S36, it is determined whether movements of the characteristic points $P_1$ to $P_4$ in the processing of the previous step S33 exceed a predetermined threshold level $\epsilon$. If the result is affirmative, the process returns to step S31 and repeats similar processing. Specifically, each of the characteristic points $P_1$ to $P_4$ is sequentially selected as the characteristic point of interest, of which position is shifted so that the sum of energies of the two sides formed by each characteristic point is a maximum.

In the meantime, when it is determined in step S36 that the movements of the characteristic points $P_1$ to $P_4$ in step S33 do not exceed the predetermined threshold level $\epsilon$, or as described above, when there is almost no movement of the characteristic points $P_1$ to $P_4$ in the processing of the previous step S33, the process returns.

Next in the copy processor 12 or paste processor 13 shown in FIG. 4, the corrected characteristic points and shape information are used to compute the inverse transform expression or transform expression, as described below.

Figure 18A:
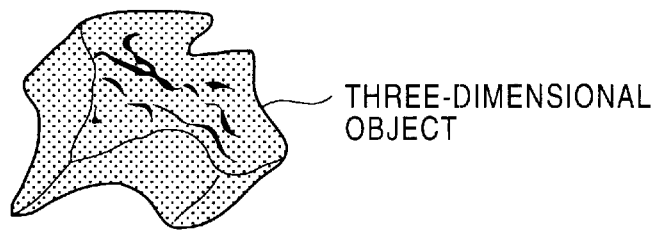
FIGS. 18A, 18B, and 18C are drawings illustrating computation of an inverse transform expression and a right transform expression.
Figure 18B:
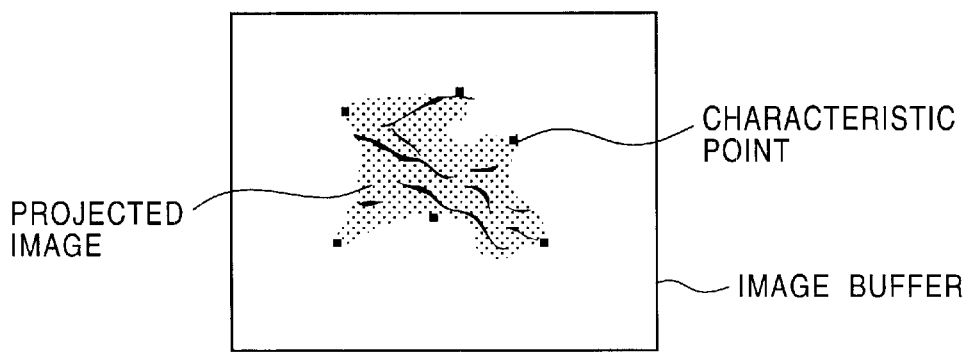

For example, when the camera 9 (FIG. 3) captures the image of a three-dimensional object in three-dimensional space shown in FIG. 18A, a two-dimensional image outputted by the camera 9 displays a projected image (projected picture), as shown in FIG. 18B, which is the three-dimensional object being projected onto a screen. Therefore, a two-dimensional image on which such a projected image is displayed is stored in an image buffer (except for a paste buffer).

Figure 18C:
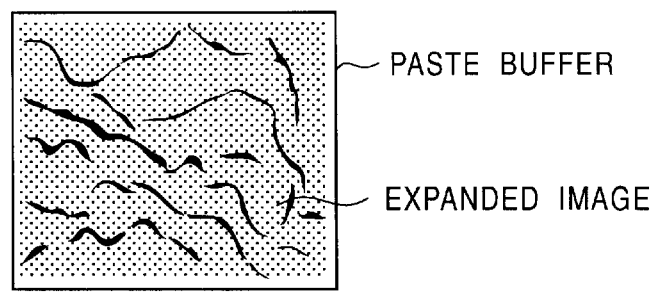

Meanwhile, an expanded image, which is the surface of the three-dimensional object in the three-dimensional space (FIG. 18A) expanded onto a two-dimensional plane, is stored in the paste buffer, as shown in FIG. 18C. Specifically, if the surface of the three-dimensional object is, for example, a plane, a two-dimensional image seeing the plane from the front is stored in the paste buffer. If a plane of the three-dimensional object is a side surface of a cylinder, a two-dimensional image which is the side surface expanded onto a two-dimensional plane as a rectangular shape is stored in the paste buffer. Also if a plane of the three-dimensional object is a sphere, a two-dimensional image which is the sphere expanded onto a two-dimensional plane, using a method such as equidistant cylindrical projection used in cartography or the like, is stored in the paste buffer. If a plane of the three-dimensional object is a three-dimensional curved surface, such as Bezier curved surface expressed by two parameters s and t, a two-dimensional image which is the curved surface expanded onto a two-dimensional plane, using the parameter s and t as a horizontal axis and vertical axis, is stored in the paste buffer. In addition, for example, if the three-dimensional object is a body of revolution, a two-dimensional image which is the body of revolution expanded onto a two-dimensional plane, using the circumference direction or rotation axis as a horizontal axis or vertical axis, is stored in the paste buffer.

In the copying, as shown in FIG. 18B, by designating a few characteristic points on the projected image of (the plane of) the three-dimensional object displayed on the two-dimensional image stored in the buffer of interest (indicated by ■ in FIG. 18B), and shape information of (the plane of) the three-dimensional object, the inverse transform expression is computed. Using the inverse transform expression, the expanded image shown in FIG. 18C is generated from the projected image shown in FIG. 18B, which is stored in the paste buffer. In the pasting, as shown in FIG. 18B, by designating a few characteristic points on a region on which the projected image of (the plane of) the three-dimensional object is pasted (indicated by ■ in FIG. 18B), and shape information (of the plane) of the three-dimensional object, the transform expression is computed. Using the transform expression, the projected image shown in FIG. 18B is generated from the image (expanded image) shown in FIG. 18C, which is pasted on the image buffer.

Therefore, inter-relationship among the three-dimensional object in three-dimensional space, its projected image, and its expanded image becomes important in computing the inverse transform expression and transform expression.

Figure 19:
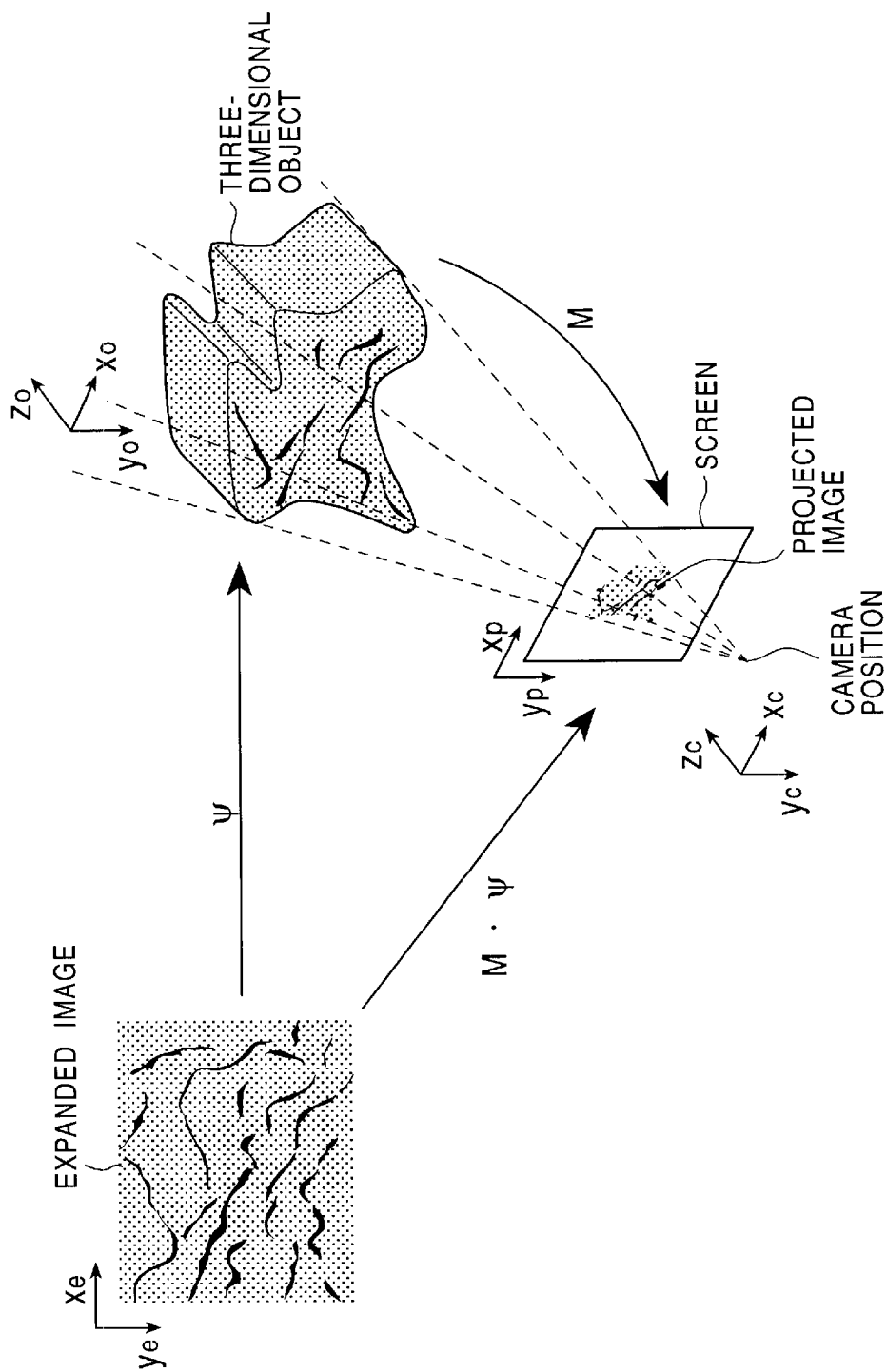
FIG. 19 is a drawing showing the relationship among a three-dimensional object in a three-dimensional space, an expanded image, and a projected image.

Now referring to FIG. 19, a two-dimensional coordinate system for the expanded image, a three-dimensional coordinate system for the three-dimensional object, and a two-dimensional coordinate system for the projected image are considered. The x and y coordinates in the two-dimensional coordinate system for the expanded image are expressed by $x_e$ and $y_e$; the x, y, and z coordinates in the three-dimensional coordinate system for the three-dimensional object are expressed by $x_o$, $y_o$, and $z_o$; and the x and y coordinates in the two-dimensional coordinate system for the projected image are expressed by $x_p$ and $y_p$. Also the pixel level of the projected image at the point $(x_p, y_p)$ is expressed by $B(x_p, y_p)$, and the pixel level of the expanded image at the point $(x_e, y_e)$ is expressed by $C(x_e, Y_e)$. Finally the mapping, wherein the expanded image is pasted onto the surface of the three-dimensional object, is expressed by $\psi$, and the mapping, wherein the three-dimensional object is transformed into the projected image, is expressed by M.

Here, the two-dimensional coordinate system for the expanded image, the three-dimensional coordinate system for the three-dimensional object, and the two-dimensional coordinate system for the projected image can be selected in an arbitrary manner. Specifically, the three-dimensional coordinate system for the three-dimensional object, for example, is selected suitably for expressing the three-dimensional object. Taking a concrete example, when the three-dimensional object is a cylinder, let the origin (0, 0) be the center of a circle of either of two base surfaces, and a rotation axis (a straight line connecting the centers of circles of two base surfaces) be coincident with the $y_o$ axis. When the three-dimensional object is a rectangle, for example, let the origin (0, 0, 0) be the lower left vertex of four vertices of the rectangle, and a horizontal axis or vertical axis be coincident with either the $x_o$ axis or $y_o$ axis.

The point $(x_o, y_o, z_o)$ on the three-dimensional object has a one-to-one correspondence to the point $(x_e, y_e)$ on the expanded image. The relationship between them, namely, the mapping $\psi$ (or $\psi^{-1}$), is obtainable by geometric computation. Accordingly, when the relationship between the point $(x_o, y_o, z_o)$ on the three-dimensional object and the point $(x_e, y_e)$ on the expanded image, namely, the mapping M (or $M^{-1}$), is given, the mapping M which transforms the point $(x_e, Y_e)$ on the expanded image into the point $(x_p, y_p)$ can be computed.

Nevertheless, when only the three-dimensional object and the projected image are considered, the mapping M cannot be computed unless it is known which point $(x_o, y_o, z_o)$ on the three-dimensional object is projected onto which point $(x_e, y_e)$ on the projected image. Computing from the projected image on which point $(x_e, y_e)$ the point $(x_o, y_o, z_o)$ on the three-dimensional object is projected basically needs preparation of a plurality of two-dimensional images for using a triangulation principle, as described above. Also expressing a three-dimensional model of the three-dimensional object requires a memory for storing three-dimensional data as temporary data, which sees the point $(x_o, y_o, z_o)$ on the three-dimensional object from a viewpoint (the origin of camera's coordinates as described below), and computation for working with such three-dimensional data.

Therefore, the mapping $\psi$ is obtained here based on the shape information inputted by the user, and the mapping M is obtained based on the characteristic points inputted by the user. Also the relationship between the expanded image and the projected image, namely, the mapping $M\psi$ which transforms the expanded image into the projected image, is obtained. The mapping $M\psi$ is a transform expression, and the mapping which performs the inverse of the transformation corresponding to the mapping $M\psi$, i.e., $(M\psi)^{-1}$, is an inverse transform expression. Hence, the inverse transform expression is obtainable by computing the inverse matrix of the mapping $M\psi$, using, for example, the Gaussian elimination method.

Since the inverse transform expression $(M\psi)^{-1}$ is easily obtained once the transform expression $M\psi$ is computed, the computation of the transform expression is described hereunder.

As described above, the point $(x_o, y_o, z_o)$ on the three-dimensional object has a one-to-one correspondence to the point $(x_e, y_e)$ on the expanded image. Accordingly, the point $(x_o, y_o, z_o)$ is expressed in an expression (7) using the mapping $\psi$ and the point $(x_e, y_e)$ as:

$$\begin{pmatrix} x_0 \\ y_0 \\ z_0 \end{pmatrix} = \psi(x_e, y_e) = \begin{pmatrix} \psi_1(x_e, y_e) \\ \psi_2(x_e, y_e) \\ \psi_3(x_e, y_e) \end{pmatrix} \quad (7)$$

When the camera 9 captures the image of the three-dimensional object in the three-dimensional space to output the projected image, three-dimensional coordinates for expressing the position of the camera 9 $(x_c, y_c, z_c)$ (hereinafter referred to as camera's coordinates) may be given. The camera's coordinates $(x_c, y_c, z_c)$ of the point $(x_o, y_o, z_o)$ are expressed in the following expression using nine elements $r_{11}$, $r_{12}$, $r_{13}$, $r_{21}$, $r_{22}$, $r_{23}$, $r_{31}$, $r_{32}$, and $r_{33}$ for representing a rotation in the three-dimensional space, and three elements $t_1$, $t_2$, and $t_3$ for representing a translation as:

$$\begin{pmatrix} x_c \\ y_c \\ z_c \end{pmatrix} = \begin{pmatrix} r_{11} & r_{12} & r_{13} \\ r_{21} & r_{22} & r_{23} \\ r_{31} & r_{32} & r_{33} \end{pmatrix} \begin{pmatrix} x_0 \\ y_0 \\ z_0 \end{pmatrix} + \begin{pmatrix} t_1 \\ t_2 \\ t_3 \end{pmatrix} \quad (8)$$

The point $(x_p, y_p)$ on the projected image is the point $(x_c, y_c, z_c)$ on the three-dimensional object in the camera's coordinates projected onto the screen. The transformation is perspective transformation (projection transformation) as described in Document 1. Therefore it can be expressed by a rational formula, wherein both denominator and numerator are a linear expression of one of the x-coordinate, y-coordinate, and z-coordinate (a linear term and constant term of one of x, y, and z). Specifically, letting w be an arbitrary number expressing a homogeneous coordinate, the point $(x_p, y_p)$ of the projected image on the screen is expressed in an expression (9) using the homogeneous coordinate as:

$$\begin{pmatrix} wx_p \\ wy_p \\ w \end{pmatrix} = \begin{pmatrix} f_h & 0 & 0 \\ 0 & f_v & 0 \\ 0 & 0 & 1 \end{pmatrix} \begin{pmatrix} x_c \\ y_c \\ z_c \end{pmatrix} \quad (9)$$

Let f be a focal distance of the camera 9, and h and v be a horizontal length and vertical length, respectively, of one pixel of the screen in the camera's coordinate system. Then, $f_h$ and $f_v$ in the expression (9) represent fxh and fxv, respectively.

It is clear from the expression (9) that the value in which the x-coordinate $wx_p$ or y-coordinate $wy_p$ of the homogeneous coordinate divided by the z-coordinate w is the x-coordinate $x_p$ or y-coordinate $y_p$ of the projected image.

From the expressions (7) to (9), an expression (10) is derived as:

$$\begin{pmatrix} wx_p \\ wy_p \\ w \end{pmatrix} = M \begin{pmatrix} \psi_1(x_e, y_e) \\ \psi_2(x_e, y_e) \\ \psi_3(x_e, y_e) \\ 1 \end{pmatrix} = M\psi(x_e, y_e)$$

In the expression (10), as is evident from FIG. 19, M is a matrix which transforms $\psi(x_e, y_e)$, i.e., $(x_o, y_o, z_o)$ into $(x_p, y_p)$, which can be expressed in the following expression as:

$$M = \begin{pmatrix} m_{11} & m_{12} & m_{13} & m_{14} \\ m_{21} & m_{22} & m_{23} & m_{24} \\ m_{31} & m_{32} & m_{33} & 1 \end{pmatrix} \quad (11)$$

$$= \begin{pmatrix} r_{11}f_h/t_3 & r_{12}f_h/t_3 & r_{13}f_h/t_3 & t_1f_h/t_3 \\ r_{21}f_v/t_3 & r_{22}f_v/t_3 & r_{23}f_v/t_3 & t_2f_v/t_3 \\ r_{31}/t_3 & r_{32}/t_3 & r_{33}/t_3 & 1 \end{pmatrix}$$

$\psi(\psi_1, \psi_2, \psi_3)$ in the expression (10) is obtainable by geometric computation based on the shape information inputted by the ;user. The matrix M in the expression (10) is also computable based on the characteristic points inputted by the user. The matrix M generally has $m_{11}$, $m_{12}$, $m_{13}$, $m_{14}$, $m_{21}$, $m_{22}$, $m_{23}$, $m_{24}$, $m_{31}$, $m_{32}$, and $m_{33}$ as unknowns, as shown in the expression (11). Accordingly, when a total of six points on the projected image, i.e., five points with 2-degrees of freedom and a point with 1-degree of freedom, are designated as characteristic points, $m_{11}$ to $m_{14}$, $m_{21}$ to $m_{24}$, and $m_{31}$ to $m_{33}$ are computable. When more than six points are designated, eleven elements of $m_{11}$ to $m_{14}$, $m_{21}$ to $m_{24}$, and $m_{31}$ to $m_{33}$ can be computed using, for example, the least squares method.

As described above, the matrix M is computed here based on the characteristic points inputted by the user. Therefore it is not necessary to work with the three-dimensional data of the three-dimensional object in the camera's coordinates, nor computation using the three-dimensional data. It is also unnecessary to use a plurality of two-dimensional images of the same three-dimensional object shot from a plurality of positions. The matrix M is computable using a two-dimensional image of the three-dimensional object shot from one position. As a result, the mapping $M\psi$ (and $(M\psi)^{-1}$) can be obtained without computation using the three-dimensional data in the camera's coordinates, and without using a plurality of two-dimensional images.

Next, computation of $\psi$ and M for three-dimensional objects having primitive shapes is described below.

If the three-dimensional object is, for example, a rectangular parallelepiped, $\psi$ in the expression (7), that is, the relationship between a point $(x_0, y_0, z_0)$ on a plane (rectangle) of the rectangular parallelepiped in three-dimensional space and a point $(x_e, y_e)$ of an expanded image can be given, for example, as follows.

$$\begin{pmatrix} x_0 \\ y_0 \\ z_0 \end{pmatrix} = \begin{pmatrix} \psi_1(x_e, y_e) \\ \psi_2(x_e, y_e) \\ \psi_3(x_e, y_e) \end{pmatrix} = \begin{pmatrix} x_e \\ y_e \\ 0 \end{pmatrix} \quad (12)$$

where, as the two dimensional coordinates of a projected image (hereinafter referred to as "screen coordinates"), the coordinates of a plane with $z_0=0$ in the three-dimensional coordinate system on the three-dimensional object (hereinafter referred to as "three-dimensional coordinates"), where each x coordinate of the screen coordinates is equal to each x coordinate of the three-dimensional coordinates, and each y coordinate of the screen coordinates is equal to each y coordinate of the three-dimensional coordinates $(x_e=x_0, y_e=y_0)$, that is, the coordinates of the x-y plane in the three-dimensional coordinates are used. Further, as a three-dimensional coordinate system, the coordinates, where one of the vertices of a plane of the rectangular parallelepiped corresponds to the origin and the plane is included in the x-y plane, are used.

Since $z_0=0$ by the expression (12), the need for the elements $m_{13}$, $m_{23}$, $m_{33}$ of the third row of the matrix M of the expression (11) is eliminated. In this case, the expression (10) can be given as follows:

$$\begin{pmatrix} wx_p \\ wy_p \\ w \end{pmatrix} = M \begin{pmatrix} x_e \\ y_e \\ 0 \\ 1 \end{pmatrix} = \begin{pmatrix} m_{11} & m_{12} & m_{14} \\ m_{21} & m_{22} & m_{24} \\ m_{31} & m_{32} & 1 \end{pmatrix} \begin{pmatrix} x_e \\ y_e \\ 1 \end{pmatrix} \quad (13)$$

Therefore, since the number of the elements of the matrix M to be computed is the eight elements $m_{11}$, $m_{12}$, $m_{14}$, $m_{21}$, $m_{22}$, $m_{24}$, $m_{31}$, and $m_{32}$, these eight elements can be found by designating, as characteristic points, four points on the projected image corresponding to four points on the expanded image (given the information of eight coordinates in total, that is, $t_p$ and $y_p$ of four characteristic points).

Figure 20A:
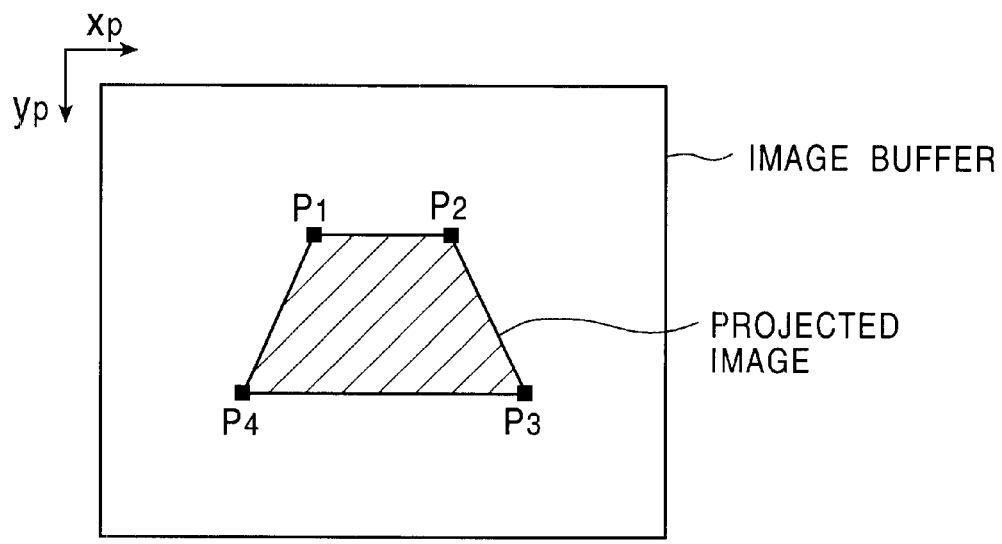
FIGS. 20A and 20B are drawings illustrating computation of an inverse transform expression and a right transform expression in the case where a three-dimensional object is a parallelepiped.
Figure 20B:
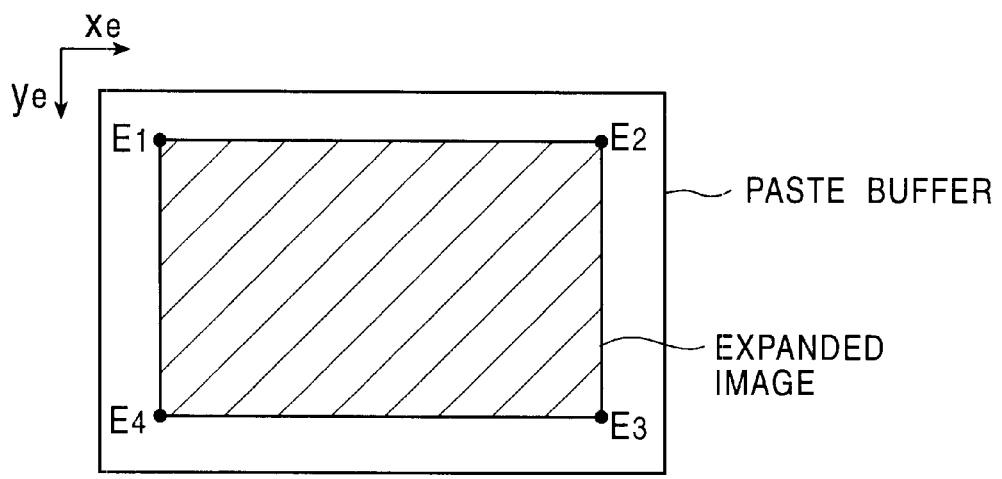

When the three-dimensional object is a rectangular parallelepiped, the projected image of the plane (rectangle) is a quadrangle such as shown in FIG. 20A. Here, suppose that the four vertices of the projected image of the quadrangle are designated as characteristic points by a user. Let the vertices of the projected image of the quadrangle be vertices $P_1$, $P_2$, $P_3$, and $P_4$ clockwise from the top-left vertex, such as shown in FIG. 20A, while letting the vertices of a rectangular expanded image stored in a paste buffer be vertices $E_1$, $E_2$, $E_3$ and $E_4$ clockwise from the top-left vertex, such as shown in FIG. 20B so that $P_1$, $P_2$, $P_3$, and $P_4$ correspond to $E_1$, $E_2$, $E_3$ and $E_4$, respectively.

Moreover, let the coordinates of points $E_1$, $E_2$, $E_3$ and $E_4$ of the two dimensional coordinates of the expanded image (hereinafter referred to as "paste-buffer coordinates") be $(0, 0)$, $(L_W, 0)$, $(L_W, L_H)$, and $(0, L_H)$, respectively, where $L_W$ indicates the width of the rectangular expanded image and $L_H$ indicates the height of the rectangular expanded image. The user can input any desired values to those lengths as far as the memory sizes of the paste buffer can hold. Other than the user setting the desired values of $L_W$ and $L_H$, it is also possible that the size of the expanded image is set to a predetermined proportion, for example, 80 percent, of the size (area) of the paste buffer.

By letting the screen coordinates of the points $P_1$, $P_2$, $P_3$, and $P_4$, as characteristic points designated by the user, be $(X_{p1}, Y_{p1})$, $(X_{p2}, Y_{p2})$, $(X_{p3}, Y_{p3})$, and $(X_{p4}, Y_{p4})$, respectively, the next expression (14) is obtained from the expression (10).

$$\begin{pmatrix} w_1 x_{p1} & w_2 x_{p2} & w_3 x_{p3} & w_4 x_{p4} \\ w_1 y_{p1} & w_2 y_{p2} & w_3 y_{p3} & w_4 y_{p4} \\ w_1 & w_2 & w_3 & w_4 \end{pmatrix} = M \begin{pmatrix} 0 & L_W & L_W & 0 \\ 0 & 0 & L_H & L_H \\ 1 & 1 & 1 & 1 \end{pmatrix} \quad (14)$$

where $w_1$, $w_2$, $w_3$, and $w_4$ of the expression (14) are arbitrary numbers indicating homogeneous coordinates.

The matrix M of the expression (14) leads the eight elements $m_{11}$, $m_{12}$, $m_{14}$, $m_{21}$, $m_{22}$, $m_{24}$, $m_{31}$, and $m_{32}$ of the expression (13) to be unknowns. Since eight expressions can be derived based on the expression (14), the eight unknowns $m_{11}$, $m_{12}$, $m_{14}$, $m_{21}$, $m_{22}$, $m_{24}$, $m_{31}$, and $m_{32}$, that is, the matrix M, can be solved. Incidentally the characteristic points designated by the user and automatically corrected as described above are basically used as the characteristic points for solving the matrix M.

When the three-dimensional object is a rectangular parallelepiped and then either a copying or a pasting is performed on the plane (rectangle), $\psi$ is computed by the expression (12), along with M by the expression (14). The mapping $M\psi$ is directly used as a right transform expression in case of the pasting. For the copying, the mapping obtained by computing the inverse matrix of the mapping $M\psi$ is used as an inverse transform expression. Irrespective of the case where the three-dimensional object is a rectangular parallelepiped, the expression used in the pasting is called the "right transform expression" because the mapping $M\psi$ is directly used, while the expression used in the copying is called the "inverse transform expression" because the inverse mapping of the mapping $M\psi$ is used.

When the copying is performed, in the image transform processor 20, the pixels within the region of the quadrangle $P_1 P_2 P_3 P_4$ as the projected image in the buffer of interest, as shown in FIG. 20A, are written into, in accordance with the inverse transform expression $(M\psi)^{-1}$, the corresponding positions of the quadrangle in the rectangle $E_1 E_2 E_3 E_4$ of the paste buffer, as shown in FIG. 20B.

If one pixel in the buffer of interest corresponds to a plurality of pixels in the paste buffer, the level of the one pixel may be written into all the pixels in the paste buffer. Interpolated values obtained by performing interpolation on the pixels in the buffer of interest may be written into the paste buffer. For example, if a pixel A of the buffer of interest corresponds to two adjacent pixels $a_1$ and $a_2$ of the paste buffer, the level of the pixel A may be written into the pixel $a_1$, and the mean value of the levels of the pixel A and its adjacent pixel in the buffer of interest may be written into the pixel $a_2$.

On the contrary, if a plurality of pixels of the buffer of interest correspond to a single pixel of the paste buffer, for example, the level of any one of the pixels may be written into the paste buffer, or weighted addition value obtained by filtering the pixels may be written into the paste buffer.

The writing of the pixel levels into the paste buffer may be performed by computing the location of a pixel of the paste buffer transformed from a pixel of the projected image in the buffer of interest in accordance with the inverse transform $(M\psi)^{-1}$ as described above, or computing the location of a pixel (of the projected image) transforming into a pixel of the expanded image.

When the pasting is performed, in the image transform processor 20, the pixels within the region of the rectangle $E_1E_2E_3E_4$ as the expanded image (shown in FIG. 20B) in the paste buffer are written into, in accordance with the right transform expression $M\psi$, the corresponding positions in the quadrangle $P_1P_2P_3P_4$ of the projected image (shown in FIG. 20A, in the buffer of interest, whereby the projected image is pasted onto the two dimensional image stored in the buffer of interest.

If one pixel in the paste buffer corresponds to a plurality of pixels in the buffer of interest, the level of one pixel may be written into all the pixels in the buffer of interest, similarly to the copying as described above. Also, interpolated data obtained by performing interpolation on a plurality of pixels in the paste buffer may be written into the plurality of pixels in the buffer of interest.

On the contrary, if a plurality of pixels in the paste buffer corresponds to a single pixel in the buffer of interest, for example, the level of any one of the pixels may be written into the buffer of interest, or weighted addition value obtained by filtering the plurality of pixels may be written into the buffer of interest.

The writing of pixel levels into the buffer of interest may be performed by computing the location of a pixel in the buffer of interest transformed from a pixel of the projected image in the paste buffer in accordance with the right transform $M\psi$ as described above, or computing the location of a pixel (of the expanded image) transforming into each pixel of the projected image.

Next, if the three-dimensional object is, for example, a cylinder, when the copying for creating and storing an expanded image of its side into the paste buffer, or the pasting for pasting the image stored in the paste buffer onto its side is performed, the inverse transform expression or the right transform expression is respectively computed as follows.

Figure 21A:
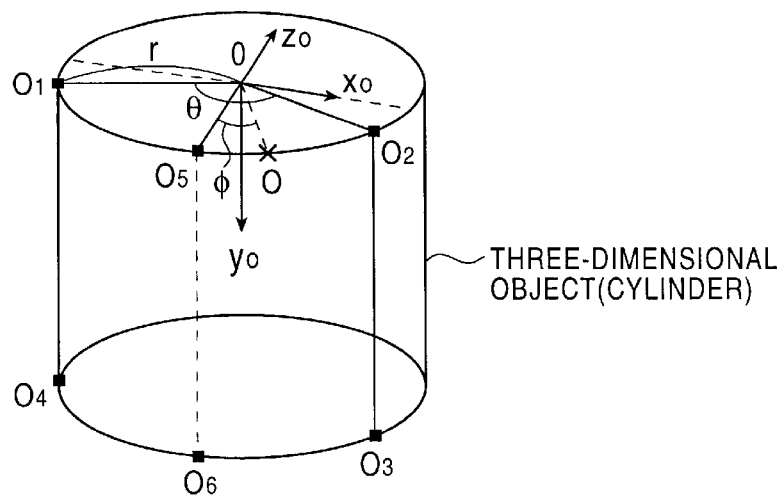
FIGS. 21A, 21B, and 21C are drawings illustrating computation of an inverse transform expression and a right transform expression in the case where a three-dimensional object is a cylinder.

A three-dimensional coordinate system for representing the location of the cylinder in a three-dimensional space is assumed as shown in FIG. 21A. In the three-dimensional coordinate system, the center of either base (circle), for example, the upper base is used as the origin (0, 0, 0), and the direction from the upper base to the lower base and the direction from $O_5$ (described below) to the center of the upper base are respectively used as the $y_0$ axis and the $z_0$ axis. A direction in which a right hand screw advances when being turned from the $y_0$ axis to the $z_0$ axis is used as the $x_0$ axis.

It is assumed that a projected image, obtained by capturing the image of the cylinder in FIG. 21A from an upper front position with respect to a point $O_5$, is displayed in the two dimensional image in the buffer of interest. The projected image of the cylinder is displayed as, for example, the shaded part in FIG. 21B.

Figure 21B:
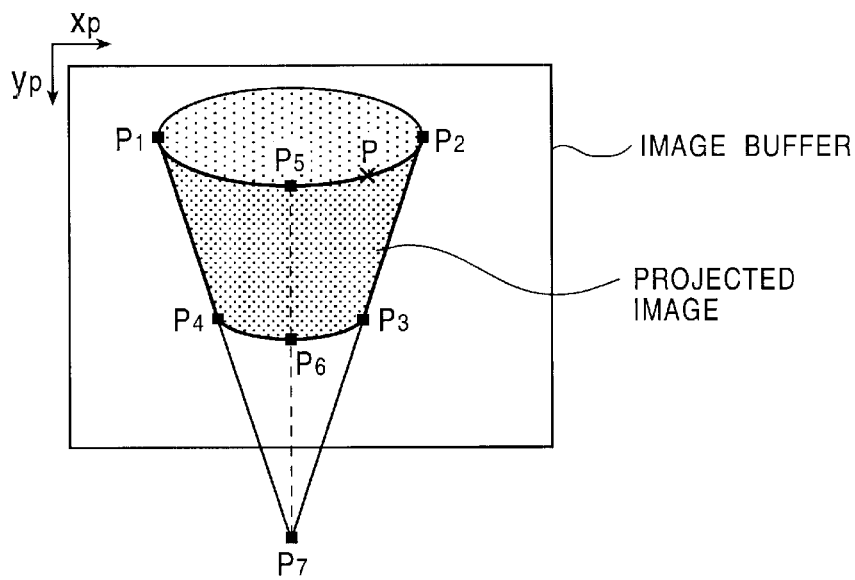

In FIG. 21B, points $P_1$ and $P_2$ or points $P_3$ and $P_4$ indicate the endpoints of the intersections (which are shown as the bold lines in FIG. 21B) where the side of the cylinder on the projected image intersects its upper base or its lower base. Specifically, the point $P_1$ indicates an intersecting point where the left of a contour line of the side of the cylinder in the projected image intersects its upper base. The point $P_2$ indicates an intersecting point where the right of the contour line of the projected image intersects the upper base. The point $P_3$ indicates an intersecting point where the right of the contour line of the projected image intersects the lower base. The point $P_4$ indicates an intersecting point where the left of the contour line of the projected image intersects the lower base.

Points $O_1$, $O_2$, $O_3$, and $O_4$ in FIG. 21A correspond to points $P_1$, $P_2$, $P_3$, and $P_4$ in FIG. 21B, respectively.

The point $O_5$ in FIG. 21A bisects an arc $O_1O_2$ (viewed as a projected image) where the point $O_5$ corresponds to the point $P_5$ in FIG. 21B. Also, a point $O_6$ in FIG. 21A bisects an arc $O_3O_4$ (viewed as a projected image). The point $O_6$ corresponds to the point $P_6$ in FIG. 21B.

As described above, since the z axis is directed from the point $O_5$ to the center of the upper base, and it also goes through the origin at the center of the upper base, the point $O_5$ is included in the $y_0$-$z_0$ plane with $x_0$=0. Therefore the point $O_6$ is included in the $y_0$-$z_0$ plane as well.

In FIG. 21B, a point $P_7$ is a vanishing point on the cylinder, which is a point where lines $P_1P_4$ and $P_2P_3$ meet. Thus, the point $P_6$ is on a straight line between points $P_5$ and $P_7$. Accordingly, the point $P_6$ has one degree of freedom of the point $P_6$ in the direction of a line $P_5P_7$.

An angle $\theta$ (radian) in FIG. 21A is formed between the point $O_1$ as the center (the origin of the three-dimensional coordinates) of the upper base and the point $O_2$ (thus, the angle $\theta$ is also formed between the point $O_3$ as the center of the lower base and the point $O_4$). Here, let "r" be the radius of the base of the cylinder. If the expanded image corresponding to the projected image of the side of the cylinder is stored in the paste buffer, the relationship between the radius r and the angle $\theta$ is given as the following expression (assuming that the circumferential direction of the base of the cylinder corresponds to the horizontal direction of the expanded image for example).

$$r = L_w/\theta \tag{15}$$

where $L_w$ indicates the width (horizontal length) of the expanded image as described above.

Let the angle $\phi$ be as follows $$\phi = \theta(x_e - L_w/2)/L_w \tag{16}$$

where $x_e$ indicates an x coordinate (horizontal coordinate) of the paste buffer coordinate system. It is hereinafter assumed that the top-left vertex of a rectangular expanded image is used as the origin of the coordinates, and the direction from the top to the base, and the direction from the left to the right are respectively used as the $x_e$ axis and the $y_e$ axis.

If the angle $\phi$ is expressed as the expression (16) regarding the cylinder, $\psi$ of the expression (7), that is, the relationship between the point $(x_0, y_0, z_0)$ of its side of three-dimensional space and the point $(x_e, y_e)$ of the expanded image is expressed by the following expression, based on consideration of the expanded image of the cylinder in FIG. 21A.

$$\begin{pmatrix} x_0 \\ y_0 \\ z_0 \end{pmatrix} = \begin{pmatrix} \psi_1(x_e, y_e) \\ \psi_2(x_e, y_e) \\ \psi_3(x_e, y_e) \end{pmatrix} = \begin{pmatrix} r\sin\phi \\ y_e \\ -r\cos\phi \end{pmatrix} \quad (17)$$

Unlike the case described with reference to FIGS. 20A and 20B, there is no unnecessary element of the matrix M. Thus, eleven elements $m_{11}$ to $m_{14}$, $m_{21}$ to $m_{24}$, and $m_{31}$ to $m_{33}$ in the expression (11) must be found. The eleven elements can be computed as described above by designating, as characteristic points, a total of six points (of the projected image) consisting for five predetermined points and a point having one degree of freedom.

Figure 21C:
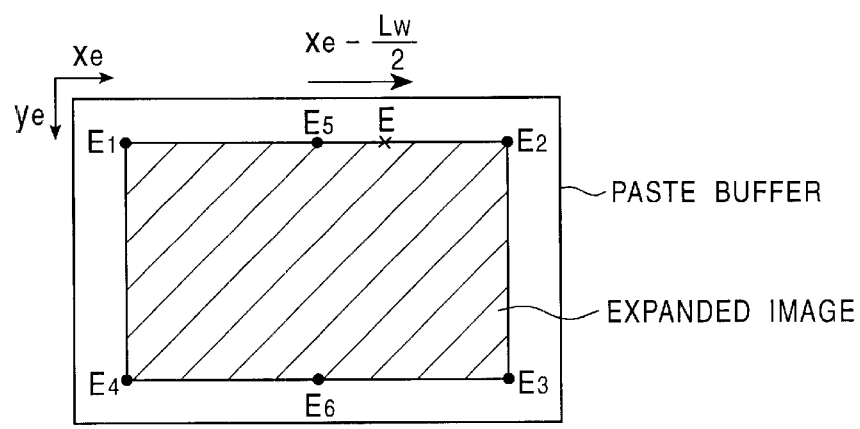

Accordingly, it is assumed that the user designates as characteristic points six points $P_1$ to $P_6$ shown in FIG. 21B. Then, let the vertices of a rectangular expanded image stored in a paste-buffer be vertices $E_1$, $E_2$, $E_3$, and $E_4$, clockwise from the top-left vertex, as shown in FIG. 21C, and let the midpoints of lines $E_1E_2$ and $E_3E_4$ be points $E_5$ and $E_6$ so that the points $P_1$, $P_2$, $P_3$, $P_4$, $P_5$, and $P_6$ correspond to the points $E_1$, $E_2$, $E_3$, $E_4$, $E_5$, and $E_6$, respectively.

In addition, let the coordinates of the points $E_1$, $E_2$, $E_3$, $E_4$, $E_5$, and $E_6$ (in the paste buffer coordinate system) be $(0, 0)$, $(L_W, 0)$, $(L_W, L_H)$, $(0, L_H)$, $(L_W/2, 0)$ and $(L_W/2, L_H)$, respectively.

By establishing and solving expressions for the eleven elements $m_{11}$ to $m_{14}$, $m_{21}$ to $m_{24}$ and $m_{31}$ to $m_{33}$ in accordance with the expression (10) using the relationships described above, these eleven elements, that is, the matrix M can be found.

In this case, the characteristic points $P_1$ through $P_6$ for computing the matrix M are automatically corrected. Either characteristic point $P_5$ or $P_6$ is further automatically corrected so as to be positioned on a straight line between the other auto-corrected characteristic point and the vanishing point $P_7$. For example, among the characteristic points $P_5$ and $P_6$, one point $P_6$ is automatically corrected, and is further automatically corrected so as to be positioned on the same straight line between the other automatically corrected characteristic point $P_5$ and the vanishing point $P_7$. This is because the characteristic point $P_6$ is one degree of freedom, as described above.

If the height of the cylinder in FIG. 21A is equal to the height $L_H$ Of the expanded image in FIG. 21C, the coordinates of the points $O_1$, $O_2$, $O_3$, $O_4$, $O_5$ and $O_6$ are $(-r \sin(\theta/2), 0, -r \cos(\theta/2))$, $(r \sin(\theta/2), 0, -r \cos(\theta/2))$, $(r \sin(\theta/2), L_H, -r \cos(\theta/2))$, $(-r \sin(\theta/2), L_H, -r \cos(\theta/2))$, $(0, 0, -r)$ and $(0, L_H, -r)$, respectively.

Figure 22:
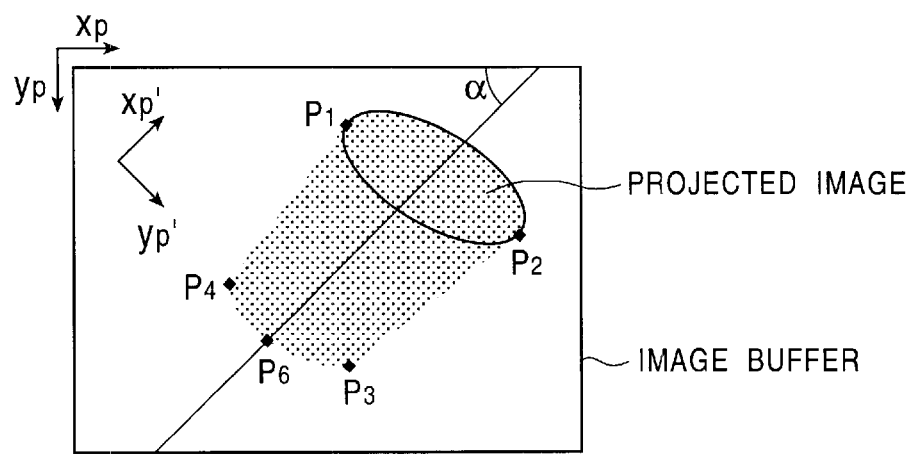
FIG. 22 is a drawing illustrating computation of an inverse transform expression and a right transform expression in the case where a three-dimensional object is a cylinder.

The matrix M found regarding the cylinder, as described above, is a function of the angle $\theta$ in FIG. 21A. Thus, the angle $\theta$ must be found. The two dimensional image displays the projected image of the cylinder in which the straight line connecting the characteristic point $P_5$ and the vanishing point $P_7$ in parallel to the axis $y_p$ in FIG. 21B, but in general, the projected image of the cylinder is likely to be formed as shown in FIG. 22 so that the straight line connecting the characteristic point $P_5$ and the vanishing point $P_7$ is inclined with the axis $y_p$.

Accordingly, when an angle $\alpha$ is formed between the straight line connecting the characteristic point $P_5$ and the vanishing point $P_7$ and the axis $x_p$, a method for finding the angle is described below.

From consideration of the $x_p'$ axis and the $y_p'$ axis obtained by counterclockwise rotating the $x_p$ axis and the $y_p$ axis of the screen coordinate system by the angle $\alpha$, the relationship between these axes and the projected image of the cylinder corresponds to that shown in FIG. 21B. Hence, by assuming a coordinate system defined by the $x_p'$ axis and the $y_p'$ axis obtained by counterclockwise rotating the xp axis and they yp axis by the angle $\alpha$, the angle $\theta$ is found.

In this case, the relationship between the point $(x_p, y_p)$ and the point $(x_p', y_p')$ can be expressed by the following expression, using homogeneous coordinates.

$$\begin{pmatrix} wx_p' \\ wy_p' \\ w \end{pmatrix} = \begin{pmatrix} \cos\alpha & -\sin\alpha & 0 \\ \sin\alpha & \cos\alpha & 0 \\ 0 & 0 & 1 \end{pmatrix} \begin{pmatrix} wx_p \\ wy_p \\ w \end{pmatrix} \quad (18)$$

The matrix M' be defined by, for example, the following expression.

$$M' = \begin{pmatrix} \cos\alpha & -\sin\alpha & 0 \\ \sin\alpha & \cos\alpha & 0 \\ 0 & 0 & 1 \end{pmatrix} M = \begin{pmatrix} m_{11}' & m_{12}' & m_{13}' & m_{14}' \\ m_{21}' & m_{22}' & m_{23}' & m_{24}' \\ m_{31}' & m_{32}' & m_{33}' & 1 \end{pmatrix} \quad (19)$$

where the matrix M of the expression (19) is given in the expression (11).

Based on the expression (10), and the expressions (15) to (19), the next expressions (20) are derived.

$x_p' = (m_{11}'r \sin\phi + m_{12}'y_e - m_{13}'r \cos\phi + m_{14}')/(m_{31}'r \sin\phi + m_{32}'y_e - m_{33}'r \cos\phi + 1)$ $y_p' = (m_{21}'r \sin\phi + m_{22}'y_e - m_{23}'r \cos\phi + m_{24}')/(m_{31}'r \sin\phi + m_{32}'y_e - m_{33}'r \cos\phi + 1)$ (20)

In other words, regarding the cylinder shown in FIG. 21A as the three-dimensional object, let a point O be on an arc $O_1O_5O_2$ displayed as the projected image, then the point O is projected onto a point P on an arc $P_1P_5P_2$ on the projected image in FIG. 21B. If the point P corresponds to the point E in the paste buffer coordinate system as shown in FIG. 21C, the x coordinate corresponding to the point E can be expressed as $x_e - L_w/2$ with respect to $E_5$ as a reference.

The points $E_5$ and E in the paste buffer coordinate system in FIG. 21C correspond to the points $O_5$ and O of the cylinder in the three-dimensional space in FIG. 21A. Thus, the $x_e$ coordinate $x_e - L_w/2$ (with respect to the position as a reference for the point E) corresponds to the position of the point O on the circumference of the upper base of the cylinder in FIG. 21A.

That is, $\phi$ defined in the expression (16) above indicates the angle formed by the point $O_5$, the origin and the point O, and $x_p'$ and $y_p'$ of the expression (20) indicate the coordinates of the point P corresponding to the point O in the projected image.

Figure 23:
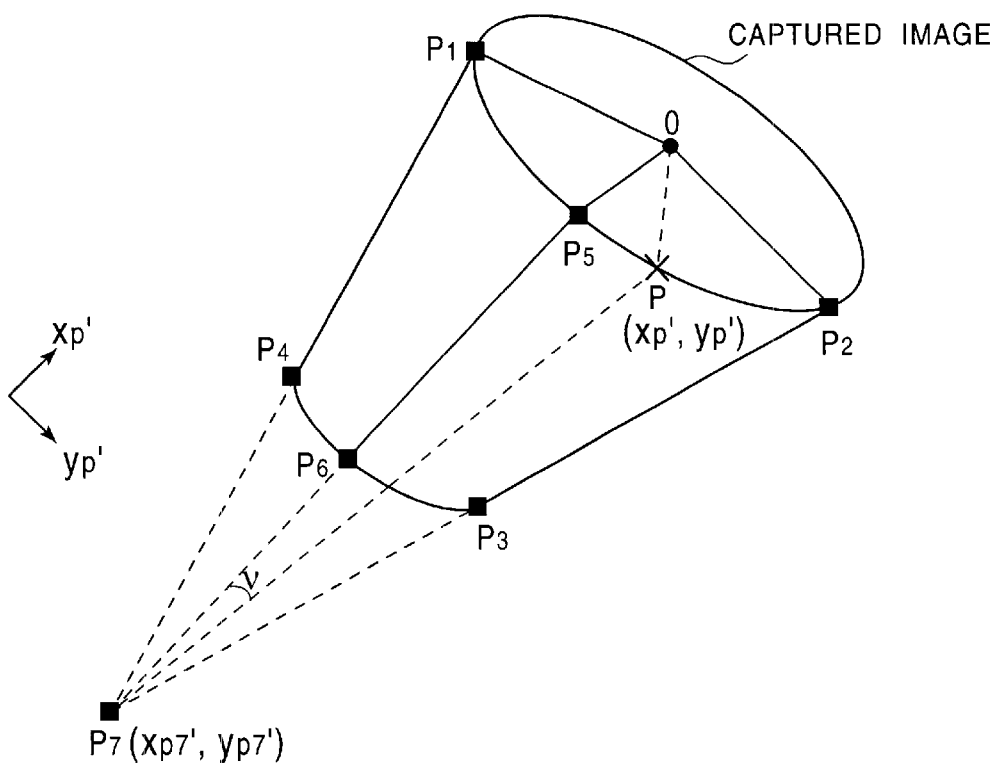
FIG. 23 is a drawing illustrating angle v.

Moving the point O with respect to $O_5$ as a reference along the circumference of the upper base of the cylinder, that is, varying the value of the angle $\phi$ from $0$ radian causes the point P corresponding to the position O in the projected image to move along an arc $P_5P_2$ or an arc $P_5P_1$ with respect to the point $P_5$ as a reference. An angle formed by the point P, the vanishing point $P_7$, and the point $P_5$ is represented by v as shown in FIG. 23.

The coordinates of the point P are given by $(x_p', y_p')$, found by the expression (20). Therefore, the angle v can be found by the following expression when the coordinates of the point $P_7$ are represented as $(x_{p7}', y_{p7}')$ as shown in FIG. 23.

$$v = \tan^{-1}(|y_p' - y_{p7}'|/|x_p' - x_{p7}'|) \quad (21)$$

The angle v is a function of the angle $\phi$ because as the point P moves, that is, the angle $\phi$ varies, the angle v varies.

In FIG. 23, assuming that the direction of right-handed rotation with respect to the line $P_5P_7$ as a reference line is the positive direction of the angle ν, the angle ν is maximum when the point P corresponds to the point $P_2$, while the angle ν is minimum when the point P corresponds to the point $P_1$.

The point P corresponds to either the point $P_1$ or $P_2$ when the expression $|\phi|=\theta/2$ holds (the point P corresponds to the point $P_1$ when $\phi=-\theta/2$, while the point P corresponds to the point $P_2$ when $\phi=\theta/2$). Thus, the angle ν takes its extremes when the expression $|\phi|=\theta/2$ holds.

Accordingly, let a value obtained by partially differentiating the angle ν of the expression (21) using $\phi$, be 0, as follows:

$$\frac{\partial v}{\partial \phi} = 0 \tag{22}$$

The expression (22) holds when $|\phi|=\theta/2$ where θ is the angle to be found $(=2\phi)$ (an angle formed by the point $O_1$, the center of the upper base of the cylinder, and the point $O_2$ where the points $P_1$ and $P_2$ correspond to the points $O_1$ and $O_2$ in FIG. 21).

Since the left-hand side of the expression (22), obtained by partially differentiating ν of the expression (22) using $\phi$, is a function which has two variables $\phi$ and θ, computation of $\phi$ and θ satisfying the expression (22) becomes complicated. Therefore, the angle θ satisfying the expression (22) is found by using approximate calculation.

Figure 24:
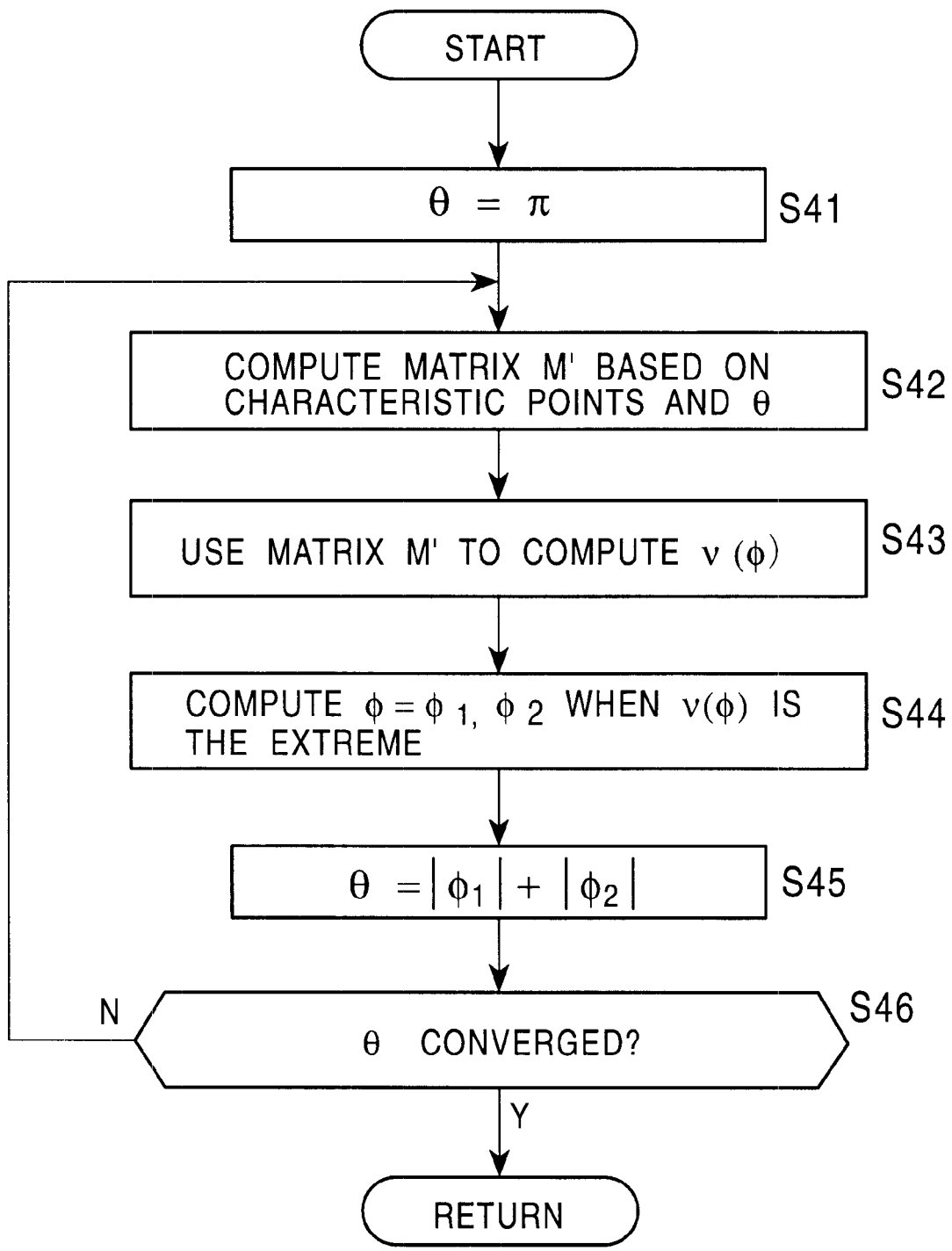
FIG. 24 is a flowchart illustrating computation of angle θ in the computation illustrated in FIG. 21.

FIG. 24 shows a flowchart illustrating a process for finding the value of θ satisfying the expression (22) by performing approximate calculation (hereinafter referred to as the "θ computation process"). The θ computation process is performed, for example, by the copy processor 12 in the copying, or by the paste processor 13 in the pasting.

In the θ computation process, the θ is set to π (radian) in step S41. In step S42, the matrix M' satisfying the expression (22) is found based on the angle θ and the characteristic points. In step S43, ν of the expression (21) is found based on the matrix M' obtained in step S42. In step S44, $\phi$ obtained when ν is an extreme value, that is, $\phi$ satisfying the expression (22) is found. The process then proceeds to step S45.

Two values of $\phi$ satisfying the expression (21) are found, and the two values are represented as $\phi_1$ and $\phi_2$. In step S45, θ is newly set to $|\phi_1|+|\phi_2|$, and the process proceeds to step S46. In step S46, the process determines whether the angle θ has converged, in other words, the process determines whether the absolute value of the difference between the new θ and the previous θ is not more than a predetermined threshold value. If the process has determined in step S46 that the angle θ has not converges, which means that the absolute value of the difference between the new θ and the previous θ is more than the predetermined threshold value. The process returns to step S42 from which the angle θ is used to repeatedly perform the steps subsequent to step S42.

If the process has determined in step S46 that the angle θ has converged, which means that the absolute value of the difference between the new θ and the previous θ is not more than the predetermined threshold value, the new θ is determined as the value to be found, whereby the θ computation process is completed.

It has been described using taking an example that there is the vanishing point $P_7$ of the projected image in the cylinder (shown in FIGS. 21B and 23 ). If there is no vanishing point of the projected image, which means that lines $P_1P_4$ and $P_2P_3$ are parallel in the projected image, $y_p'$ of the expression (20) takes its extreme values when the expression $|\phi|=\theta/2$ holds. Let the value of the partial differential of $y_p'$ of the expression (20) using $\phi$ be 0, as shown in the expression (23). By performing the θ computation process in FIG. 24, based on the expressions (20) and (23) instead of the expressions (21) and (22) as described above, the computation of the values of θ when $y_p'$ takes its extreme value can be obtained.

$$\frac{\partial y_p'}{\partial \phi} = 0 \tag{23}$$

Next, if the three-dimensional object is, for example, a sphere, when the copying for creating and storing an expanded image of the sphere into the paste buffer, or the pasting for pasting the image stored in the paste buffer onto the sphere, is performed, the inverse transform expression or the right transform expression is computed respectively as described below. Here, the expanded image of the sphere is created by, for example, the equidistant cylindrical projection.

Figure 25A:
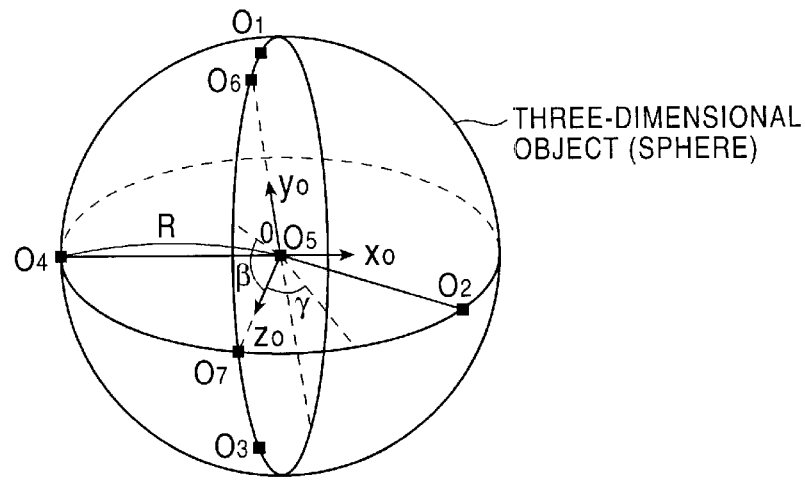
FIGS. 25A, 25B, and 25C are drawing illustrating computation of an inverse transform expression and a right transform expression in the case where a three-dimensional object is a sphere.

In this case, assuming that there is a three-dimensional coordinate system for representing the location of the sphere in the three-dimensional space as shown in FIG. 25A, where the center of the sphere is the origin (0, 0, 0) and the $x_0$ axis, the $y_0$ axis, and the $z_0$ axis are located so as to be perpendicular to one another (the $x_0$ axis is a direction in which a right hand screw advances when being turned from the $y_0$ axis to the $z_0$ axis.

Hereinafter, an intersecting point (on the positive side of the $y_0$ coordinate) where the sphere and the $y_0$ axis intersect is referred to as the "north pole", while an intersection (circle) where the sphere and the $x_0$-$z_0$ plane with $y_0=0$ intersect is referred to as the "equator".

Figure 25B:
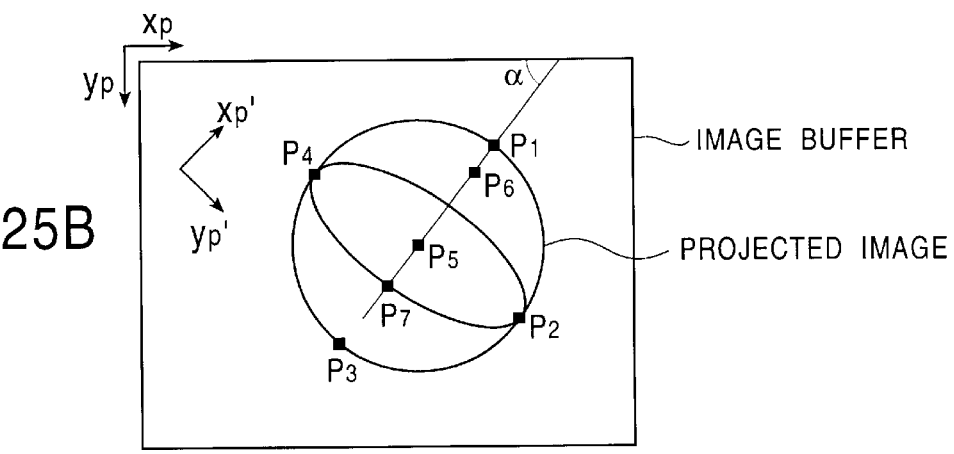

For example, a projected image obtained by capturing the image of the sphere in FIG. 25A from a predetermined position is displayed in the two dimensional image stored in the buffer of interest, as shown in FIG. 25B, where the straight line $P_5P_6$ connecting the points $P_5$ and $P_6$ (described below) is inclined at the angle a with respect to the $x_p$ axis.

Points $P_1$ and $P_3$ in FIG. 25B indicate two endpoints of the intersection (circle) of the sphere and the $y_0$-$z_0$ plane (with $x_0=0$) displayed in the projected image, where the point $P_1$ indicates the endpoint on the same side of the north pole while the point $P_3$ indicates the other endpoint at the opposite side of the north pole with respect to the $x_0$-$z_0$ plane as the standard. Points $P_2$ and $P_4$ indicate the two endpoints of the equator as the intersection of the sphere and the $x_0$-$z_0$ plane displayed in the projected image where the point $P_2$ indicates the endpoint at the positive side of the $x_0$ coordinate while the point $P_4$ indicates the other endpoint at the negative side of the $x_0$ coordinate.

Points $O_1$, $O_2$, $O_3$, and $O_4$ in FIG. 25A correspond to points $P_1$, $P_2$, $P_3$, and $P_4$ in FIG. 25B, respectively.

Points $O_5$, $O_6$ and $O_7$ in FIG. 25A indicate the center of the sphere, the north pole, and the bisecting point of an arc $O_2O_4$ (viewed as a projected image) along the equator, respectively, where points $P_5$, $P_6$ and $P_7$ in FIG. 25B correspond to points $O_5$, $O_6$ and $O_7$, respectively.

For example, if the expanded image of the entire sphere in FIG. 25A is stored in the paste buffer in accordance with the equidistant cylindrical projection, the radius R of the sphere can be given by the following expression where the equator corresponds to the horizontal direction of the expanded image.

$$R=Lw/(2\pi) \tag{24}$$

Regarding the sphere, ψ in the expression (7), by considering the expanded image of the sphere in FIG. 25A in accordance with the equidistant cylindrical projection, the relationship between a point ($x_0$, $y_0$, $z_0$) of the sphere in three-dimensional space and a point ($x_e$, $y_e$) of the expanded image can be given as follows:

$$\begin{pmatrix} x_o \\ y_o \\ z_o \end{pmatrix} = \begin{pmatrix} \psi_1(x_e, y_e) \\ \psi_2(x_e, y_e) \\ \psi_3(x_e, y_e) \end{pmatrix} = \begin{pmatrix} R\sin(\pi y_e/L_H)\cos(2\pi x_e/L_w) \\ R\cos(\pi y_e/L_H) \\ R\sin(\pi y_e/L_H)\sin(2\pi x_e/L_w) \end{pmatrix} \quad (25)$$

Also, there is no unnecessary element of the matrix M in this case. Thus, the eleven elements $m_{11}$, to $m_{14}$, $m_{21}$ to $m_{24}$, and $m_{31}$ to $m_{33}$, described in the expression (11), must be found.

At this time, for example, $P_1$ to $P_7$ in FIG. 25B are designated as characteristic points. Initially, for example, points $P_2$, $P_4$, $P_5$ and $P_6$ having two degrees of freedom are designated as characteristic points. Points $P_1$, $P_3$, and $P_7$ are designated so as to be on the straight line $P_5P_6$ connecting the point $P_5$ and the point $P_6$. Hence, since points $P_1$, $P_3$ and $P_7$ are on the straight line $P_5P_6$, they have one degree of freedom.

Since points $P_2$, $P_4$, $P_5$ and $P_6$ have two degrees of freedom, while points $P_1$, $P_3$ and $P_7$ have one degree of freedom, finding the values of these seven points $P_1$ to $P_7$ enables the eleven elements $m_{11}$, to $m_{14}$, $m_{21}$ to $m_{24}$, and $m_{31}$ to $m_{33}$ to be found.

Figure 25C:
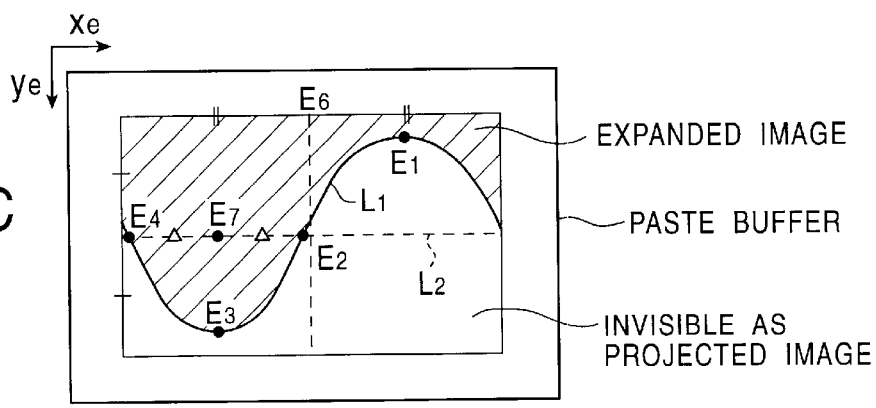

The entire sphere in FIG. 25A, in accordance with the equidistant cylindrical projection, is stored in the paste buffer, and its expanded image is shown in FIG. 25C.

The region with the diagonal lines in FIG. 25C indicates the expanded image of the projected image in FIG. 25B, while the region without the diagonal lines indicates the expanded image of the sphere which is not displayed in the projected image in FIG. 25B. Thus, regarding the sphere in FIG. 25A, a curved line $L_1$ corresponds to the boundary between the visible part and the invisible part of the sphere in the projected image in FIG. 25B. A line $L_2$ bisecting the vertical direction of the rectangular expanded image corresponds to the equator.

Points $E_1$, $E_2$, $E_3$ and $E_4$ on the curved line $L_1$ correspond to characteristic points $P_1$, $P_2$, $P_3$ and $P_4$ of the projected image in FIG. 25B, respectively. The $y_e$ coordinate of the point $E_1$ on the curved line $L_1$ takes the minimum value while the $y_e$ coordinate of the point $E_3$ on the curved line $L_1$ takes the maximum value. Points $E_2$ and $E_4$ indicate two intersecting points of the curved line $L_1$ and the line $L_2$ corresponding to the equator, where the $x_e$ coordinate of the point $E_2$ is greater than that of the point $E_4$.

A line $E_6$ connecting the origin (0, 0) and a point ($L_w$, 0) in the paste buffer coordinate system in FIG. 25C corresponds to the point $P_6$ in FIG. 25B. A point $E_7$ in FIG. 25C bisecting a line $E_2E_4$ corresponds to a point $P_7$ in FIG. 25B.

Figure 26A:
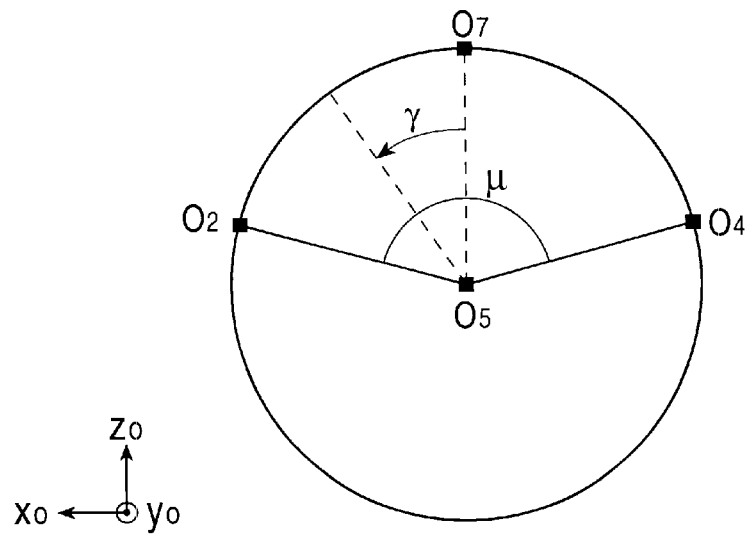
FIGS. 26A and 26B are drawings illustrating computation of an inverse transform expression and a right transform expression in the case where a three-dimensional object is a sphere.
Figure 26B:
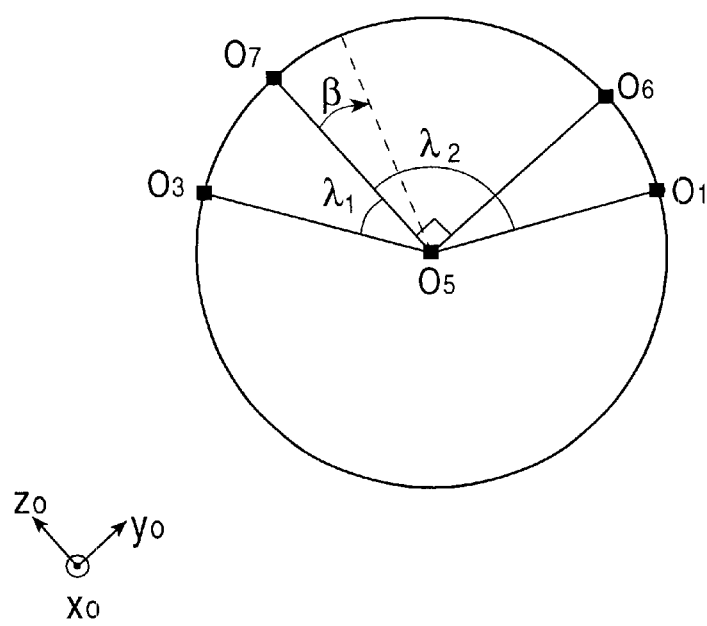

Next, let predetermined angles of the sphere in FIG. 25A be $\mu$, $\lambda_1$, and $\lambda_2$, as shown in FIG. 26. In other words, let the angle $\angle O_2O_5O_4$ formed between the two endpoints $P_1$ and $P_2$ and the origin of the sphere $O_5$ be $\mu$ as shown in FIG. 26(A), where points $P_1$ and $P_2$ are the endpoints of the intersection, that is, the circumference (or the equator), which the sphere and the $x_0$-$z_0$ plane intersect as displayed in the projected image. Let the endpoints of the intersection, that is, the circumference, of the sphere and the $y_0$-$z_0$ plane, as displayed in the projected image, be points $O_1$ and $O_3$ where the endpoint $O_1$ is on the same side of the north pole while the endpoint $O_3$ is on the other side of the north pole. Then let angle $\angle O_3O_5O_7$ formed by points $O_3$, $O_7$, and $O_5$, and angle $\angle O_1O_5O_7$ formed by point $O_1$, $O_7$ and $O_5$, be $\lambda_1$ and $\lambda_2$, respectively, as show in FIG. 26(B). Here the angle $\lambda_1+\lambda_2$ indicates the angle $\angle O_1O_5O_3$ formed by points $O_1$, $O_3$, and the center of the sphere $O_5$.

The coordinates of points $O_1$, $O_2$, $O_3$, $O_4$, $O_5$, $O_6$, and $O_7$ in FIG. 25A are (0, R $\sin\lambda_2$, R $\cos\lambda_2$), (R $\sin(\mu/2)$, 0, R $\cos(\mu/2)$), (0, $-R \sin\lambda_1$, R $\cos\lambda_1$), ($-R \sin(\mu/2)$, 0, R $\cos(\mu/2)$), (0, 0, 0), (0, R, 0) and (0, 0, R), respectively.

The matrix M to be found regarding the sphere is a function of the angles $\mu$, $\lambda_1$ and $\lambda_2$ in FIG. 26. Thus, the values of these angles must be found. Also, in FIG. 25B, the values of these angles must be found, while considering the fact that a line $P_5P_6$ between the point $P_5$ corresponding to the center of the sphere and the point $P_6$ corresponding to the north pole, and the $x_p$ axis form the angle α in FIG. 25B.

Then the values of angles $\mu$, $\lambda_1$ and $\lambda_2$ are obtained by considering the $x_p'$ axis and the $y_p'$ axis formed by counter-clockwise rotating the xp axis and yp axis by the angle α.

Also, in this case, the relationship between the points ($x_p$, $y_p$) and ($x_p'$, $y_p'$) can be given by the expression (18) by using homogeneous coordinates.

In FIG. 25A, let the coordinates of the intersection (circle) of the sphere and the $y_0$-$z_0$ plane with $x_0$=0 be (0, R $\sin\beta$, R $\cos\beta$), and let the coordinates of the intersection (the points on the equator) of the sphere and the $x_0$-$z_0$ plane with $y_0$=0 be (R $\sin\gamma$, 0, R $\cos\gamma$). Let $x_p'$ and $y_p'$ coordinates obtained by projecting of the point (0, R $\sin\beta$, R $\cos\beta$) onto the screen coordinate system be $x_{P1}$ and $y_{p1}$. Let the $x_p'$ and $y_p'$ coordinates obtained by projecting the point (R $\sin\gamma$, 0, R $\cos\gamma$) onto the screen coordinate system be $x_{P2}$ and $y_{p2}$. The coordinates $x_{P1}$ and $y_{p2}$ can be given by the expressions (26) and (27), respectively, using the elements of the matrix M' defined in the expression (19).

$$x_{p1}=(m_{12}'R \sin \beta+m_{13}'R \cos \beta+m_{14}')/(m_{32}'R \sin \beta+m_{33}'R \cos \beta) \quad (26)$$

$$y_{p2}=(m_{21}'R \sin \gamma+m_{22}'R \cos \gamma+m_{24}')/(m_{31}'R \sin \gamma+m_{33}'R \cos \gamma) \quad (27)$$

Regarding the sphere in FIG. 25A, $x_{P1}$ of the expression (26) takes an extreme when the expression $\beta=-\lambda_1$ or $\beta=\lambda_2$ holds, while $y_{P2}$ of the expression (27) takes an extreme when the expression $\gamma=\mu/2$ or $\gamma=-\mu/2$ holds. Let each value obtained by partially differentiating $x_{P1}$ of the expression (26) and $y_{P2}$ of the expression (27) using β and γ, respectively be 0 as follows:

$$\frac{\partial x_{p1}}{\partial \beta} = 0 \quad (28)$$

$$\frac{\partial y_{p2}}{\partial \gamma} = 0 \quad (29)$$

The expression (28) holds when $\beta=-\lambda_1$ or $\beta=\lambda_2$, in which $\lambda_1$ and $\lambda_2$ are values to be solved, while the expression (29) holds when $\gamma=\mu/2$ or $\gamma=-\mu/2$, in which $\mu$ is a value to be solved.

Since the elements of the matrix M' are functions of $\mu$, $\lambda_1$ and $\lambda_2$, a value obtained by partially differentiating $x_{p1}$ of the expression (28) using β becomes a function with four variables $\mu$, $\lambda_1$, $\lambda_2$ and β, and a value obtained by partially differentiating $y_{p2}$ of the expression (29) with respect to γ becomes a function with four variables $\mu$, $\lambda_1$, $\lambda_2$ and γ. Hence, computing the values of $\mu$, $\lambda_1$ and $\lambda_2$ which satisfy the expressions (28) and (29) becomes complicated. However, it becomes comparatively easier to obtain the values of $\mu$, $\lambda_1$ and $\lambda_2$ by using an approximate calculation in the same manner as the θ computation process as described above, where the values of $\mu$, $\lambda_1$ and $\lambda_2$ are initialized with predetermined values and then the elements of the matrix M' are computed thereby computing the values of β and γ with the values of the elements, which leads the values of $\mu$, $\lambda_1$ and $\lambda_2$ to be updated.

This example uses the equidistant cylindrical projection for creating the expanded image of the sphere. However, a technique of creating the expanded image of the sphere is not limited to the above-described example. That is, it is also possible to create the expanded image of the sphere by using Mercator's projection or Lambert conformal projection.

Regarding the sphere, the expanded image of the entire sphere is stored in the paste buffer as shown in FIG. 25C. Since the projected image corresponds only to the region with the diagonal lines in FIG. 25C, the region with the diagonal lines in FIG. 25C is displayed in the two dimensional image when the projected image transformed from the expanded image is pasted onto the two dimensional image stored in the buffer of interest. Since the whole image stored in the paste buffer is not displayed as the projected image in the two dimensional image, while considering above, two-dimensional paint operations, such as rendering a character and the like, must be performed over the expanded image pasted on the sphere. If the characters are pasted onto the projected image of the sphere in FIG. 25B, the pasting must be performed by rendering the characters in the region with the diagonal lines in FIG. 25C. If some of the characters are rendered outside the region, those characters are not pasted on the projected image in FIG. 25B.

Next, when the three-dimensional object is a sphere, $\mu$, $\lambda_1$, and $\lambda_2$ in FIG. 26 are respectively obtainable in a similar manner to the θ calculation, as described using. 24. The angle $\mu$ can be obtained by the following relationship after obtaining $\lambda_1$ and $\lambda_2$.

Figure 27:
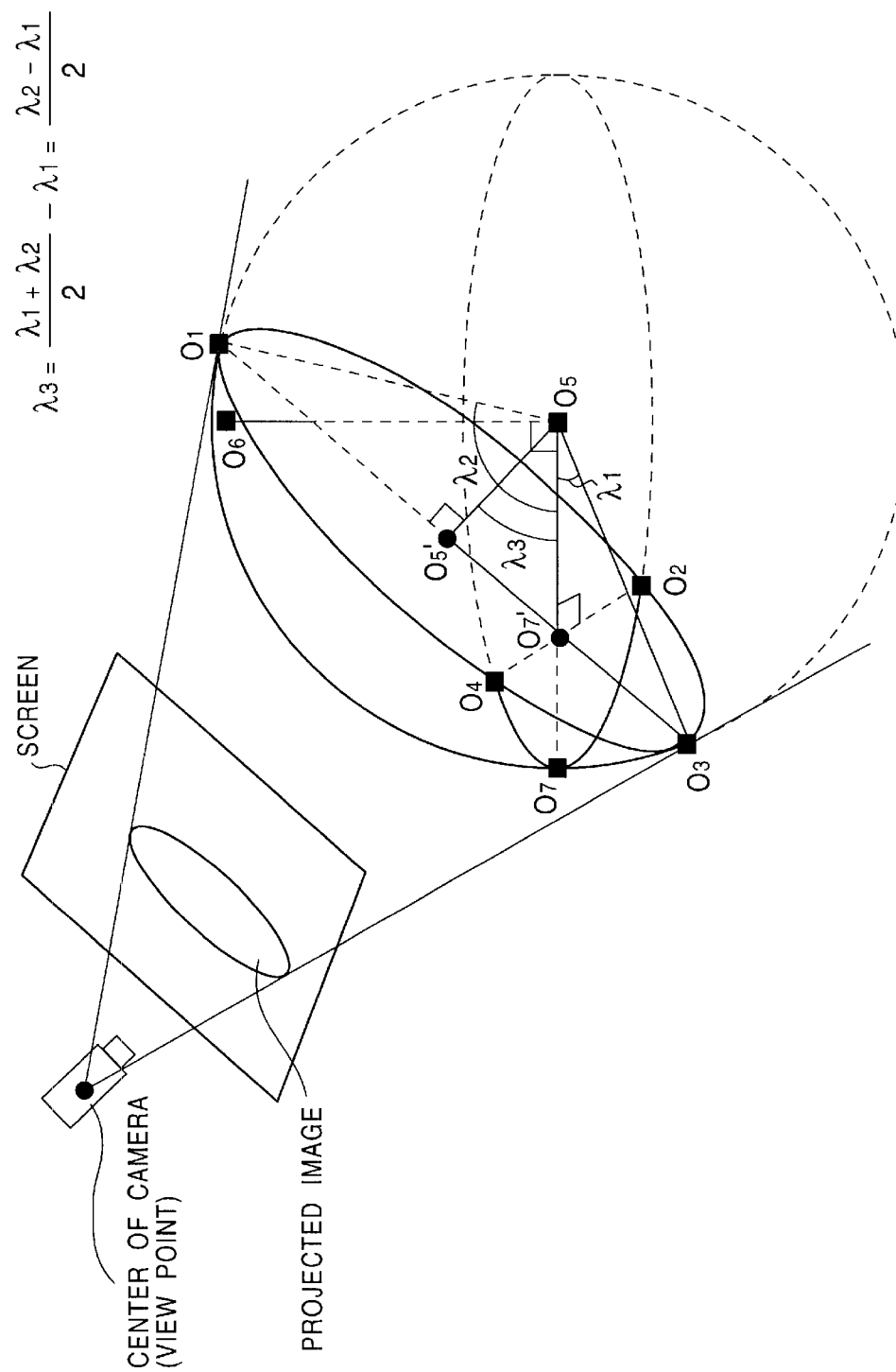
FIG. 27 is a drawing illustrating computation of $\mu$ from $\lambda_1$ and $\lambda_2$ shown in FIGS. 26A and 26B.

That is, suppose there are points $O_5'$ and $O_7'$, as shown in FIG. 27, besides the points $O_1$ through $O_7$ shown in FIG. 25A. The point $O_5'$ is an intersection of a line segment $O_1O_3$ and a perpendicular line extended from the point $O_5$ to the line segment $O_1O_3$, and the point $O_7'$ is an intersection of a line segment $O_2O_4$ and a line segment $O_5O_7$.

When $\angle O_5'O_5O_7'$ is symbolized by $\lambda_3$, $\lambda_3$ is given as the following expression by employing $\lambda_1$, or $\angle O_1O_5O_7$, and $\lambda_2$, or $\angle O_1O_5O_7$ as shown in FIG. 26B.

$$\lambda_3 = (\lambda_1 + \lambda_2)/2 - \lambda_1 \qquad (30)$$
$$= (\lambda_2 - \lambda_1)/2$$

Figure 28:
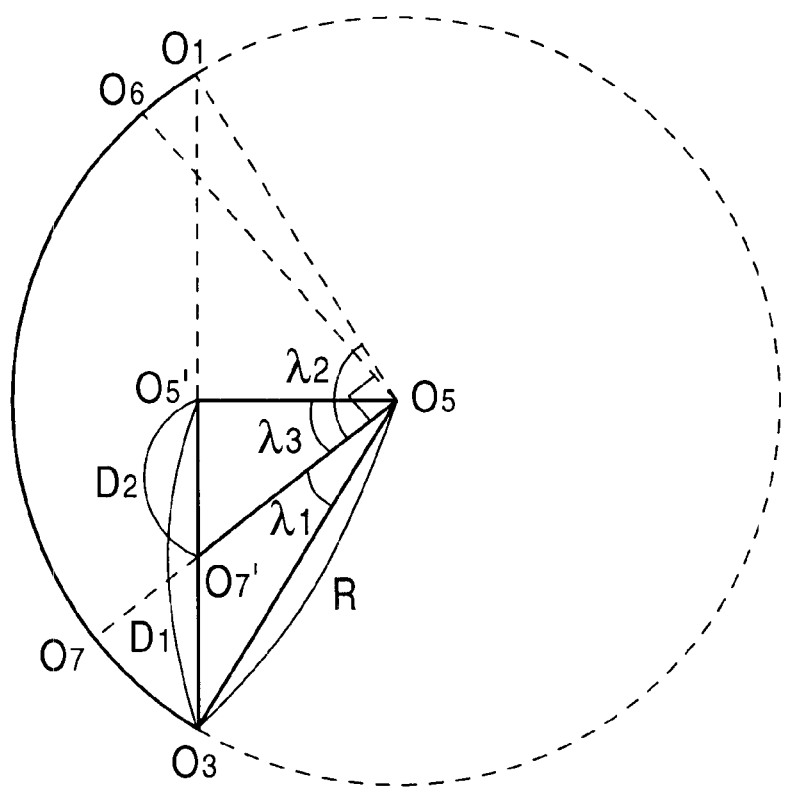
FIG. 28 is a drawing illustrating computation of $\mu$ from $\lambda_1$ and $\lambda_2$ shown in FIGS. 26A and 26B.

The intersectional plane of the sphere in FIG. 27 and the plane $O_1O_6O_7O_3$ ($y_0z_0$ plane) forms a circle, as shown in FIG. 28, with a center at $O_5$ and with an equal radius to the sphere in FIG. 27. In FIG. 28, $D_1$ is given by the following expression, when the length of line segment $O_3O_5'$ is $D_1$, $$D_1 = R\sin(\lambda_1 + \lambda_2)/2) \qquad (31)$$

where R represents a radius of the sphere in three-dimensional space as shown in the expression (24).

Moreover, in FIG. 28, $D_2$ is also given by the following expression, when the length of the line segment $O_5'O_7'$ is $D_2$.

$$D_2 = R\cos((\lambda_1 + \lambda_2)/2)\tan\lambda_3 \qquad (32)$$

Figure 29:
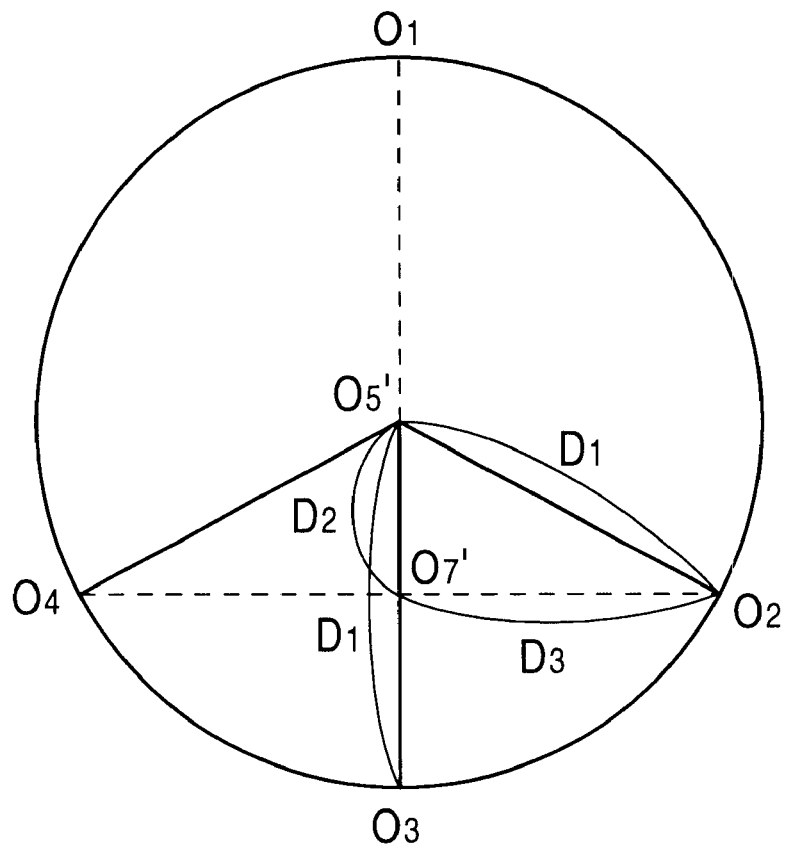
FIG. 29 is a drawing illustrating computation of $\mu$ from $\lambda_1$ and $\lambda_2$ shown in FIGS. 26A and 26B.

The intersectional plane of the plane of the points $O_1$, $O_2$, $O_3$, and $O_4$, and the sphere in FIG. 27 forms a circle with a center at $O_5'$ and with a radius of the line segment $O_3O_5'$, in which the line segments $O_5'O_3$ and $O_5'O_2$ are equal to each other since they are the radius of the circle with the center at $O_5'$. Accordingly, the length of the line segment $O_5'O_2$ is equal to the length of line segment $O_5'O_3$, or $D_1$ given by the expression (31). Thus, in FIG. 29, $D_3$ can be obtained from the Pythagorean proposition, where the length of the line segment $O_2O_7'$ is $D_3$.

$$D_3 = \sqrt{(D_1^2 - D_2^2)} \qquad (33)$$
$$= R\sqrt{(\sin^2((\lambda_1 + \lambda_2)/2) - \cos^2((\lambda_1 + \lambda_2)/2)\tan^2\lambda_3)}$$

Figure 30:
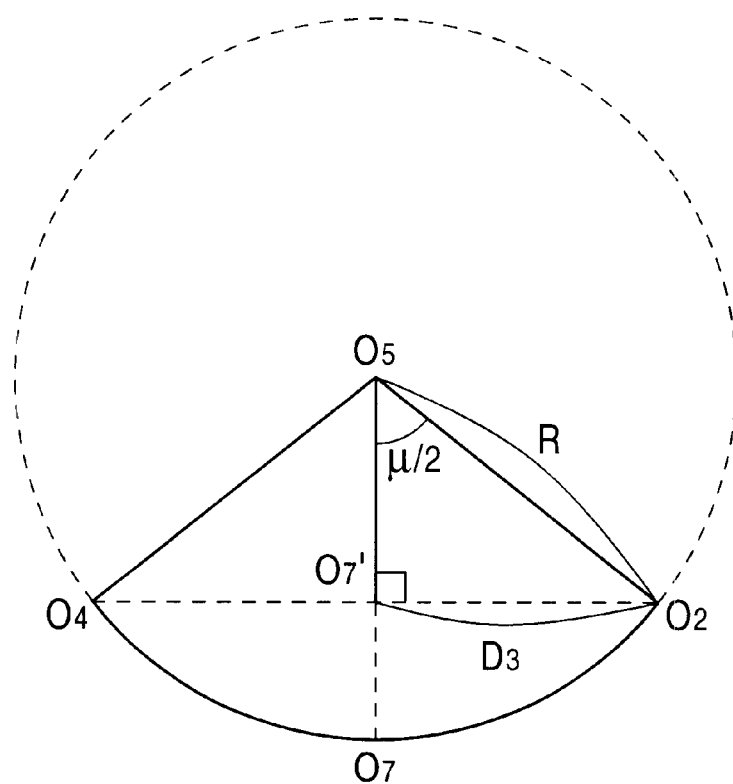
FIG. 30 is a drawing illustrating computation of $\lambda$ from $\lambda_1$ and $\lambda_2$ shown in FIGS. 26A and 26B.

Further, the intersectional plane of the sphere in FIG. 27 and the plane of the points $O_5$, $O_2$, $O_7$, and $O_4$ forms the circle with a center at $O_5$ and with a radius R as shown in FIG. 30, similarly to FIG. 26A. Since sine of angle $\mu/2$ is obtained from FIG. 30 by computing $D_3/R$, the following expression holds for $\mu$, $\lambda_1$ and $\lambda_2$.

$$\sin(\mu/2) = D_3/R \qquad (34)$$
$$= \sqrt{(\sin^2((\lambda_1 + \lambda_2)/2) - \cos^2((\lambda_1 + \lambda_2)/2)\tan^2\lambda_3)}$$
$$= \sqrt{(\sin^2((\lambda_1 + \lambda_2)/2) - \cos^2((\lambda_1 + \lambda_2)/2)\tan^2((\lambda_2 - \lambda_1)/2))}$$

As described above, $\lambda_1$ and $\lambda_2$ are obtained in a similar manner to the θ calculation described using. 24, and $\mu$ is obtainable by substituting $\lambda_1$ and $\lambda_2$ into the expression (34).

In the θ calculation, steps from S42 through S45 are necessarily repeated until θ converges. Thus, it is not required to repeat steps when $\mu$ is obtained from $\lambda_1$ and $\lambda_2$. Hence, $\mu$ is calculated faster and with less operations.

In the case that the three-dimensional object is, for example, a cone, when copying for storing a generated expanded side image of the cone in the paste buffer, or pasting an image stored in the paste buffer to the side of the cone, inverse transformation or transformation is computed in the following manner.

Figure 31A:
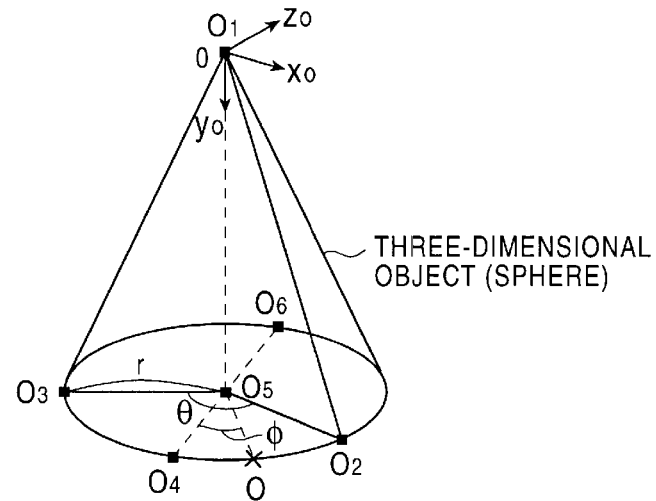
FIGS. 31A, 31B, and 31C are drawings illustrating computation of an inverse transform expression and a right transform expression in the case where a three-dimensional object is a cone.

Namely, in this case, as shown in FIG. 31A, suppose that three-dimensional coordinates in three-dimensional space indicate the position of the cone. In these coordinates, suppose a $y_0$ axis from a vertex designated as the origin (0, 0, 0), which corresponds to the center of the fan formed by expanding the side of the cone, is directed to the center of the base surface $O_5$, and further suppose a $z_0$ axis from a below mentioned point $O_4$ is directed to the center of the base surface $O_5$, where a $x_0$ axis coincides with the direction of a right-hand screw when the right-hand screw is twisted from the $y_0$ axis to the $z_0$ axis.

Figure 31B:
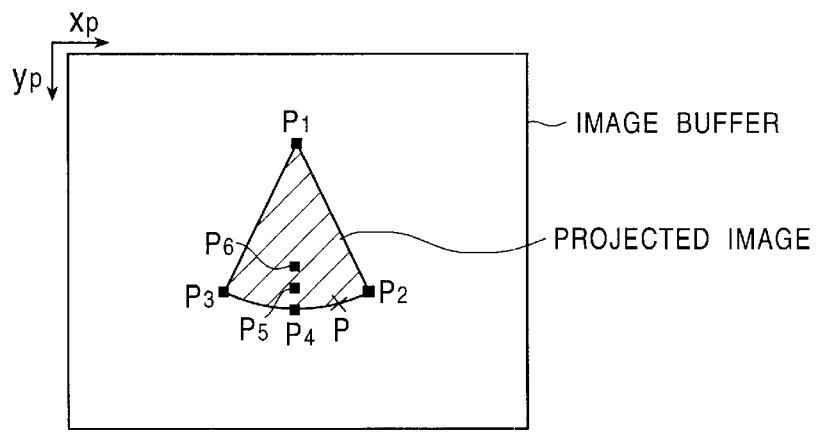

When, for example, the projected image of the cone in FIG. 31A, whose image was captured from a relatively higher position, is displayed in the two-dimensional image of the buffer of interest, the projected image of the cone appears as an shaded image in FIG. 31B.

In FIG. 31B, points $P_1$ and $P_5$ correspond to the points $O_1$ and $O_5$ in FIG. 31A, respectively. Moreover, the points $P_2$ and $P_3$ are end points of the intersectional line of the projected image of the side of the cone (the projected image formed when only the side plane is projected) and the projected image of the base of the cone (the projected image formed when only the base surface is projected). The right and left ends of the intersectional line are designated as the points $P_2$ and $P_3$, respectively. The points $P_2$ and $P_3$ correspond to the points $O_2$ and $O_3$ in FIG. 31A, respectively.

In FIG. 31A, points $O_4$ and $O_6$ are the points bisect the front and the back of the base circle, between the points $O_2$ and $O_3$, and correspond to the points $P_4$ and $P_6$ in FIG. 31B, respectively.

Here, as described above, the $z_0$ axis is directed from the point $O_4$ to the center of the base circle, or point $O_5$, and the point $O_5$ is on the $y_0$ axis. Further, as described, the points $O_4$, $O_5$, and $O_6$ are on the same straight line, hence, these points from $O_4$ to $O_6$ are all on the $y_0z_0$ plane (the plane at $x_0=0$). In consequence, in FIG. 31B, the points $P_4$, $P_5$, and $P_6$, respectively corresponding to the points $O_4$, $O_5$ and $O_6$, are also on the same straight line. That is, when two of the points from $P_4$ to $P_6$ are designated, for example the points $P_4$ and $P_6$, the remaining point, the point $P_5$, is necessarily on the straight line $P_4P_6$. That means one degree of freedom.

In the case where the expanded image corresponding to the projected image of the side of the cone is stored in the paste buffer, the relationship between the angle $\theta$ in FIG. 31A representing $\angle O_2O_5O_3$, and the radius of the base of the cone designated as r, is given by the expression (15), similarly to the case for the cylinder described using. 21, where, for example, the direction of the base circle of the cone coincides with the lateral direction of the expanded image.

Further, in the case when the angle $\phi$ is given by the expression (16), in a similar manner as the cylinder described using. 21, $\psi$ of the expression (7) on the side of the cone, or the relationship of the point on the side of the cone between $(x_0, y_0, z_0)$ in three-dimension space, and $(x_e, y_e)$ on the expanded image, is represented by the following expression through taking account of the expanded image of the cone in FIG. 31A.

$$\begin{pmatrix} x_o \\ y_o \\ z_o \end{pmatrix} = \begin{pmatrix} \psi_1(x_e, y_e) \\ \psi_2(x_e, y_e) \\ \psi_3(x_e, y_e) \end{pmatrix} = \begin{pmatrix} \frac{y_e}{L_H} r \sin\phi \\ y_e \\ -\frac{y_e}{L_H} r \cos\phi \end{pmatrix} \quad (35)$$

In this case, the eleven elements $m_{11}$ to $m_{14}$, $m_{21}$ to $m_{24}$ and $m_{31}$ to $m_{33}$ of the matrix, as described by the expression (11), which are necessarily obtained, can be calculated in the above-described manner by designating a total of six points on the projected image, composed of five points having two degrees of freedom and one point having one degree of freedom.

At this point, the user is requested to designate six characteristic points, for example, the point $P_1$ through the point $P_6$ in FIG. 31B. Namely, five points having two degrees of freedom, for example, the point $P_1$ through the point $P_4$ and the point $P_6$, are designated, and one point having one degree of freedom, for example, the point $P_5$, is designated. When the points $P_4$ and $P_6$ are designated, the point $P_5$ is on the straight line $P_4P_6$ as described, so that the point $P_5$ has one degree of freedom.

Figure 31C:
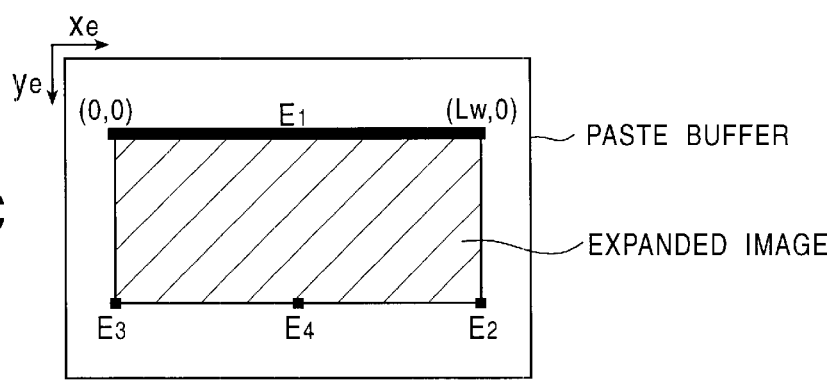

Further, as shown in FIG. 31C, in the paste buffer coordinate system of the expanded image stored as a rectangle in the paste buffer, the line segment from an origin $(0,0)$ to point $(L_w, 0)$, coordinates $(L_w, L_H)$, $(0, L_H)$ and $(L_w/2, L_H)$ are designated as $E_1$, $E_2$, $E_3$, and $E_4$, respectively, where $P_1$ corresponds to $E_1$, $P_2$ to $E_2$, $P_3$ to $E_3$, and $P_4$ to $E_4$.

According to the expression (10) in conjunction with the above relationship, the eleven elements $m_{11}$ to $m_{14}$, $m_{21}$ to $m_{24}$, and $m_{31}$ to $m_{33}$, that is, matrix M, are given by solving expressions for the eleven elements $m_{11}$ to $m_{14}$, $m_{21}$ to $m_{24}$ and $m_{31}$ to $m_{33}$.

In the example in FIG. 31C, a rectangle is used as the expanded image of the side of the cone, other expanded images of the cone also may be employed, for example, such as a fan shape which is merely an expanded image of the side of the cone in FIG. 31A.

In the case of using the fan as the expanded image of the side of the cone, it is required to render characters along the circle of the expanded image of the fan when characters are to be pasted in parallel with the base surface on the projected image of the side of the cone. On the contrary, in the case of using the rectangle as the expanded image of the side of the cone as shown in FIG. 31C, rendering characters in the expanded image in parallel with the $x_e$ axis and pasting, enables characters to be pasted in parallel with the base surface on the projected image of the side of the cone.

Figure 32:
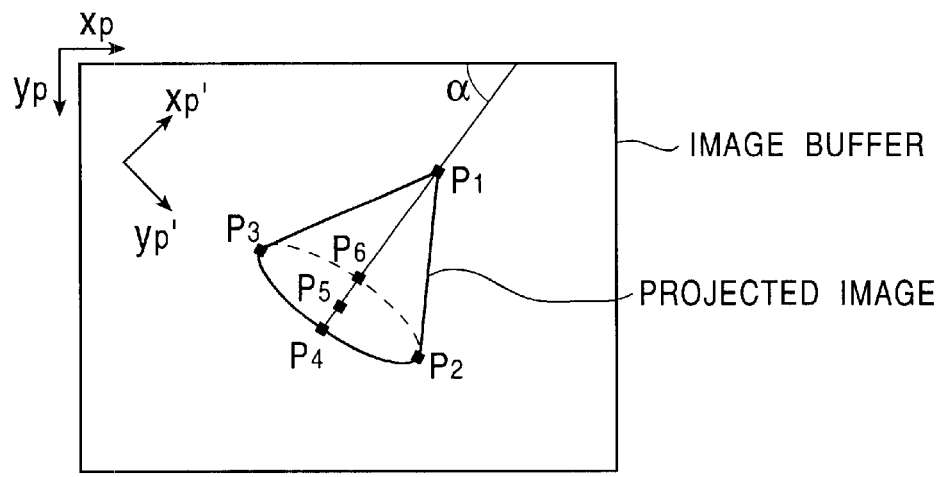
FIG. 32 is a drawing illustrating computation of an inverse transform expression and a right transform expression in the case where a three-dimensional object is a cone.

When the height of the cone in FIG. 31A is equal to the longitudinal length $L_H$ of the expanded image in FIG. 31C, coordinates of points $O_1$, $O_2$, $O_3$, $O_4$, $O_5$, and $O_6$ are (0, 0, 0), (r sin($\theta$/2), $L_H$, $-$r cos($\theta$/2)), ($-$r sin($\theta$/2), $L_H$, $-$r cos($\theta$/2)), (0, $L_H$, $-$r), (0, $L_H$, 0) and (0, $L_H$, r), respectively. Matrix M for the cone obtained as described above is a function of the angle $\theta$ similar to the case of cylinder described using. 21, hence this angle $\theta$ needs to be calculated. The projected image of the cone in FIG. 31B is displayed on two-dimensional image in a manner that the straight line between the characteristic points $P_4$ and $P_5$ is in parallel with the $y_p$ axis, however it is generally common, for example as shown in FIG. 32, that the straight line between the characteristic points $P_4$ and $P_5$ on the projected image of the cone are inclining about the $y_p$ axis.

The method for computing $\theta$ is described, where the angle made by the straight line between the characteristic points $P_4$ and $P_5$, and the $x_p$ axis is $\alpha$.

When $y_0=y_e=L_H$ in the expression (35), the expression (35) is equal to the expression (17) representing $\psi$ on the cylinder. Accordingly, in this case $x_p$ and $y_p$ on the cone are equal to $x_p$ and $y_p$ on the cylinder, respectively. When the angle formed by the straight line between two characteristic points $P_4$ and $P_5$, and the $x_p$ axis is $\alpha$, as described, in the coordinate system defined by the axes of $x_p'$ and $y_p'$, where the $x_p'$ and $y_p'$ axes obtained by rotating counterclockwise the $x_p$ and $y_p$ axes by $\alpha$, the point P on the projected image (in FIG. 31), corresponding to the point O on the circle of the base of the cone, is represented similarly to the case of the cylinder.

Figure 33:
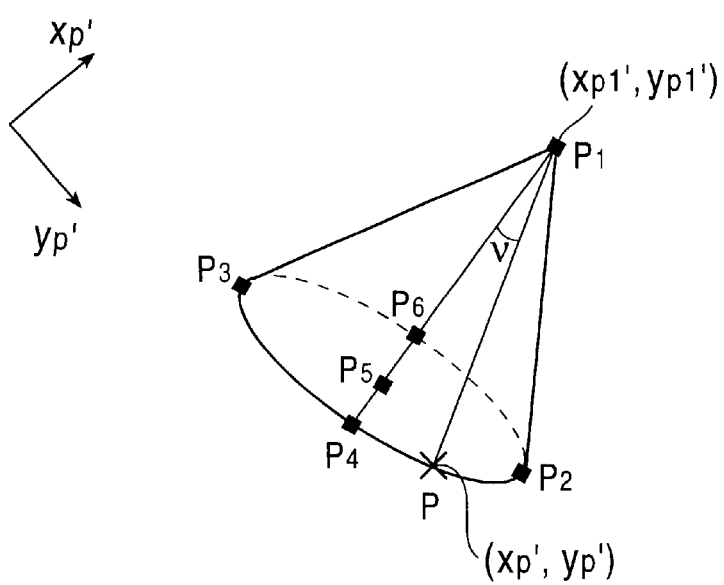
FIG. 33 is a drawing illustrating angle v.

That is, regarding the cone, the coordinates of $x_p'$ and $y_p'$ of point P on the projected image, corresponding to the point O on the circle of the base of the cone, are given by the expression (20). When an angle formed by the point P corresponding to the point O, $P_1$, and $P_4$ on the projected image is designated as v, as shown in FIG. 33, and the coordinates of $P_1$ is represented as $(x_{p1}', y_{p1}')$, the angle v is represented as the following expression.

$$v = \tan^{-1}(|y_p' - y_{p1}'|/|x_p' - x_{p1}'|) \quad (36)$$

The angle v of the expression (36) is a function of the angle $\phi$ (=$\angle O_4O_5O$) (in FIG. 31A) formed by the point O, $O_5$ and $O_4$, and is extreme when $|\phi|=\theta/2$ is satisfied.

Hence, instead of the expression (21), $\theta$ of the cone in FIG. 31A is given by using the expression (36), similarly to the case of the cylinder.

When the vertex $P_1$ is inside the projected image in FIG. 31B or FIG. 33, $\theta$ is $2\pi$ (360 degrees) since the entire side is to be seen.

The foregoing description is about the method for computing $\psi$ and M regarding some primitive shapes as three-dimensional objects, and computation of $\psi$ and M of three-dimensional objects having different shapes from the above-described shapes can be performed if the shapes are represented by functions.

The characteristic points are not limited to the points described above. For example, in FIG. 20, the vertices of the quadrangle, or the projected image of the rectangle, are designated as the characteristic points, while each midpoint of the sides of the quadrangle is instead designated as the characteristic points of the quadrangle. Regarding the sphere, points from $P_1$ through $P_7$ corresponding to the points $O_1$ to $O_7$, respectively, shown in FIG. 25A, are designated as the characteristic points. However, for example, the projected points on the two-dimensional image corresponding to the points $O_1$ to $O_6$, and a point $O_8$ may be designated as the characteristic points of the sphere, when the point $O_8$ is the other end of the intersection than the point $O_7$, of the straight line of points $O_5$ and $O_7$, and the sphere shown in FIG. 25A.

Figure 34A:
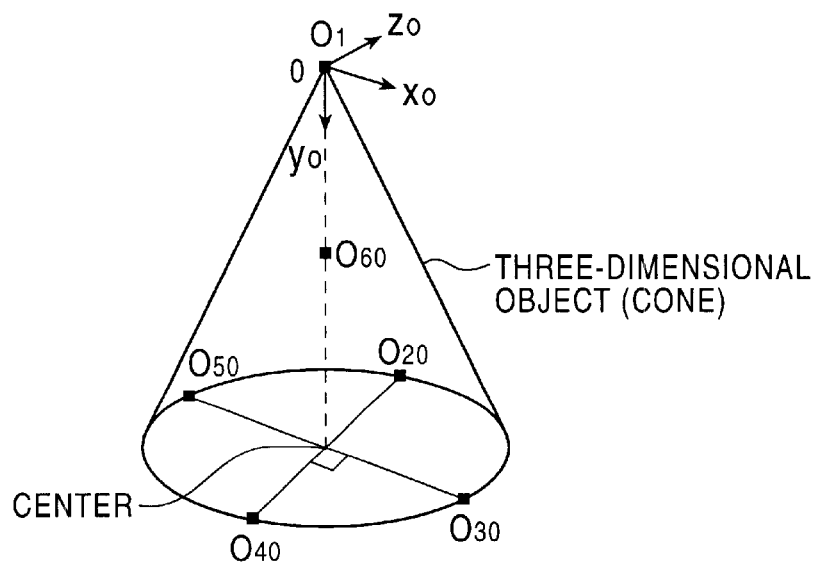
FIGS. 34A and 34B are drawings showing examples of characteristic points designated for a cone.
Figure 34B:
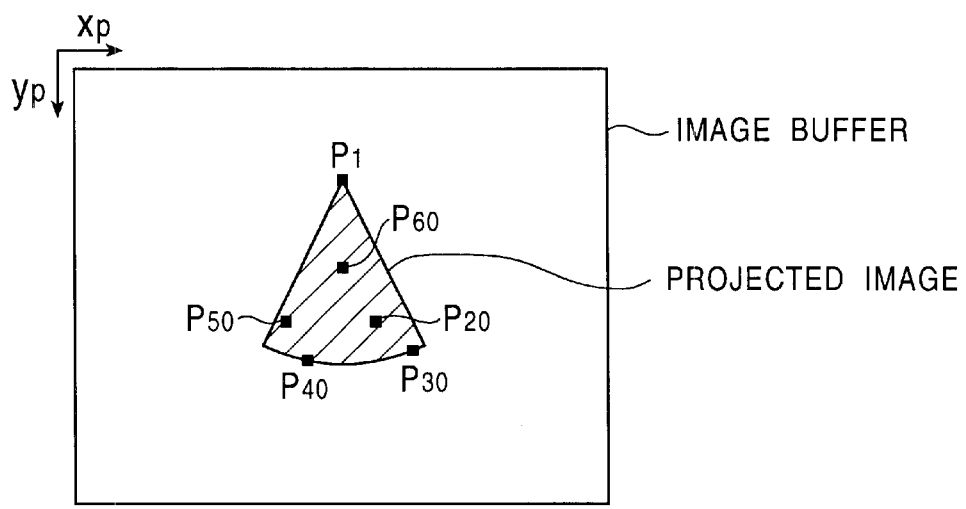

Regarding the cone, for example, points as shown in FIG. 34 may be designated as the characteristic points. That is, as shown in FIG. 34A, the midpoint of the line segment between the vertex $O_1$ of the cone and the center of the base is represented as $O_{60}$. The points of intersection of the circle of the base and the $x_0y_0$ plane are represented as $O_{30}$ and $O_{50}$, and the points of intersection of the circle of the base and the $y_0z_0$ plane are represented as $O_{20}$ and $O_{40}$. Here, the coordinates of the points $O_{20}$, $O_{30}$, $O_{40}$, $O_{50}$ and $O_{60}$ correspond to $(r, L_H, 0)$, $(0, L_H, -r)$, $(-r, L_H, 0)$, $(0, L_H, r)$ and $(0, L_H/2, 0)$, respectively. When points on the projected image corresponding to the points $O_1$, $O_{20}$, $O_{30}$, $O_{40}$, $O_{50}$ and $O_{60}$, are represented as points $P_1$, $P_{20}$, $P_{30}$, $P_{40}$, $P_{50}$ and $P_{60}$, respectively, as shown in FIG. 34B, these points may be designated as the characteristic points.

It is apparent from the foregoing description that a displayed point (a visible point) and a non-displayed point (an invisible point) on the projected image both can be designated as the characteristic points.

The correspondence of the designated point as the characteristic point of the projected image to the position of the expanded image stored in the paste buffer is predetermined.

In the pasting, basically as described above, the image stored in the paste buffer is pasted on the surface of the three-dimensional object, which is specified by the characteristic points designated by the user, on the two-dimensional image stored in the buffer of interest. That is, the pixel levels of the image stored in the paste buffer are used to overwrite the two-dimensional image in the buffer of interest. However, for example, in the case when a new three-dimensional object is added to the two-dimensional image stored in the buffer of interest by using the pasting, simply overwriting with the pixel levels of the image stored in the paste buffer on the buffer of interest enables the new three-dimensional object to be added in front of the three-dimensional object already displayed in the two-dimensional image stored in the buffer of interest, but not at the back thereof.

Hence, in this embodiment, by using a matte, the new three-dimensional object can be added at the back of the three-dimensional object already displayed in the two-dimensional image stored in the buffer of interest.

The matte is a so-called "gray scale image" representing a shape of an object displayed in the two-dimensional image, and is also called an "α-image" since the gray scale value represents a contribution rate (hereinafter referred to as "α") to the object at each pixel composing the two-dimensional image. Here, the matte of the two-dimensional image stored in the buffer of interest is adapted to be generated by the matte processing in step 15 in FIG. 7. As described above, the matte of two-dimensional image is stored in the image buffer storing the two-dimensional image.

Each pixel level is between, for example, zero and one. The level of each pixel composing a foreground is one. The level of each pixel composing a background is zero. The level of each pixel composing a boundary region between the foreground and the background is proportional to the ratio of the foreground to the background included in each pixel (As the ratio of the foreground is greater, the pixel level is closer to one, and as the ratio of the background is greater, the pixel level is closer to zero).

Figure 35A:
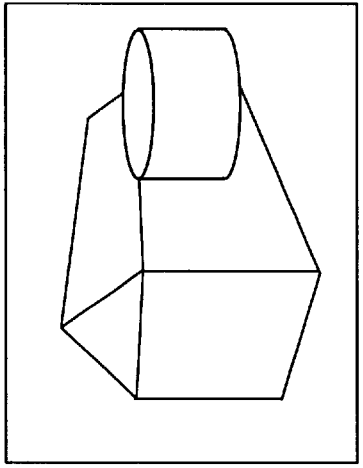
FIGS. 35A, 35B, 35C, and 35D are drawings illustrating matte processing.
Figure 35C:
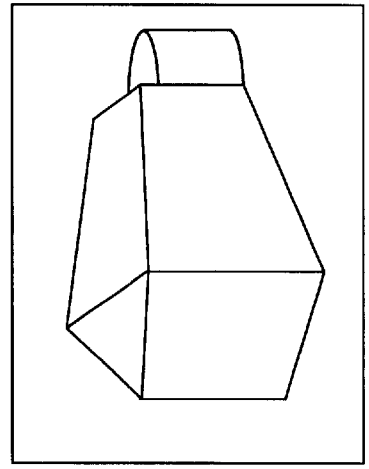
Figure 35B:
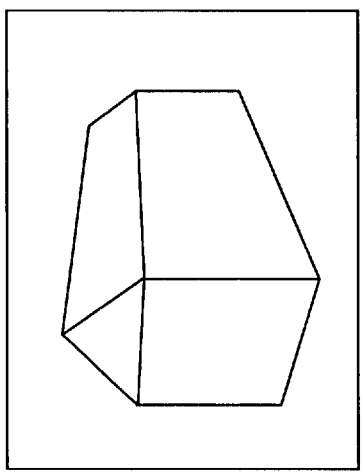

Accordingly, for example, in the case when a two-dimensional image displaying a house-shaped three-dimensional object, as shown in FIG. 35A, is stored in the buffer of interest, when performing the matte operation using the house as a foreground and the other part as a background, a matte is generated in the matte processor 16, as shown in FIG. 35B, and stored in the buffer of interest. In FIG. 35B, each pixel level of the shaded portion is one, and each pixel level of the blank portion is zero.

The following disclosed methods can be applied to the matte generation. They are, for example, "Intelligent Scissors for Image Composition", Proceedings of SIGGRAPH 95, pp. 191–198, by Eric N. Mortensen and William A. Barrett, and the inventions in Japanese Unexamined Patent Publication Nos. 8-331455 and 10-143654 (both disclosed by Sony Corporation in Japan).

When the matte, together with the two-dimensional image, is stored in the buffer of interest, operation of the input unit 6 enables the matte operation to be valid or not.

For example, when the two-dimensional image or the matte are stored in the buffer of interest, as shown in FIG. 35A or FIG. 35B, and when the pasting of, for example, a cylinder on the two-dimensional image of the buffer of interest is instructed, the projected image of the cylinder simply overwrites the two-dimensional image, so that a two-dimensional image having a cylinder in front of the house is generated, as shown in FIG. 35C.

When the matte is invalid, the two-dimensional image C by the pasting is generated based on the expression $C=\alpha A + (1+\alpha)B$, where the level of pixels composing the two-dimensional image stored in the buffer of interest is A, the level of pixels composing the projected image of the cylinder is B, and the level of pixels composing the matte is $\alpha$.

Figure 35D:
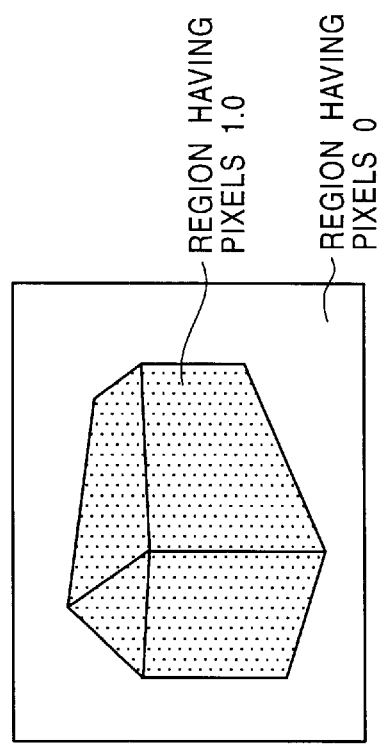

Accordingly, in this case, a two-dimensional image having the cylinder behind the house is generated, as shown in FIG. 35D.

The pasting using the matte enables a so-called "occlusion" to occur, which causes the hidden part of the three-dimensional object displayed in the two-dimensional image to be invisible. Hence, in this case the matte is functioning as a flag which determines whether overwriting using the projected image is allowed.

It is possible for the matte to be generated by the user.

Figure 36:
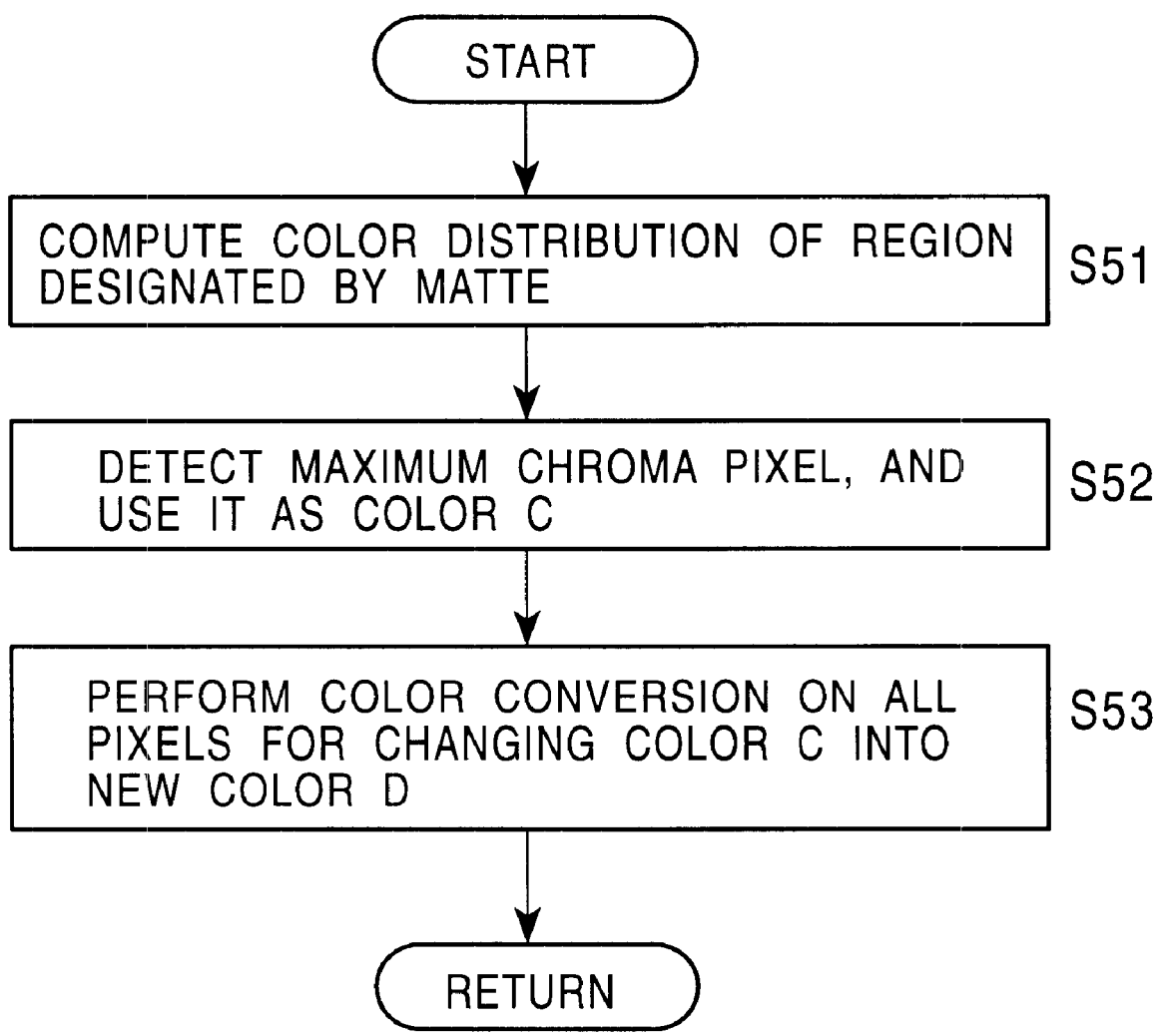
FIG. 36 is a flowchart illustrating the object property/illumination change process in step S16 shown in FIG. 7.

Referring to the flowchart in FIG. 36, the object property/illumination change process in step 16 in FIG. 7 is described. In this case, it is assumed that the matte of the two-dimensional image has already been generated and stored in the buffer of interest.

In the object property/illumination change, in step S51, the color distribution of the region of the object displayed in the two-dimensional image stored in the buffer of interest is computed, which distribution is represented by the matte also stored in the buffer of interest. In step S51, the region of the object displayed in the two-dimensional image stored in the buffer of interest is recognized based on the matte stored in the buffer of interest, and the distribution (color distribution) (in the RGB space) of the RGB value of pixels composing the region is computed.

In step S52, following the computation of the color distribution, among pixels composing the region of the object, a pixel (hereinafter referred to as "maximum chromatic pixel") having a maximum chroma is detected based on the color distribution computed in step S51.

Figure 37:
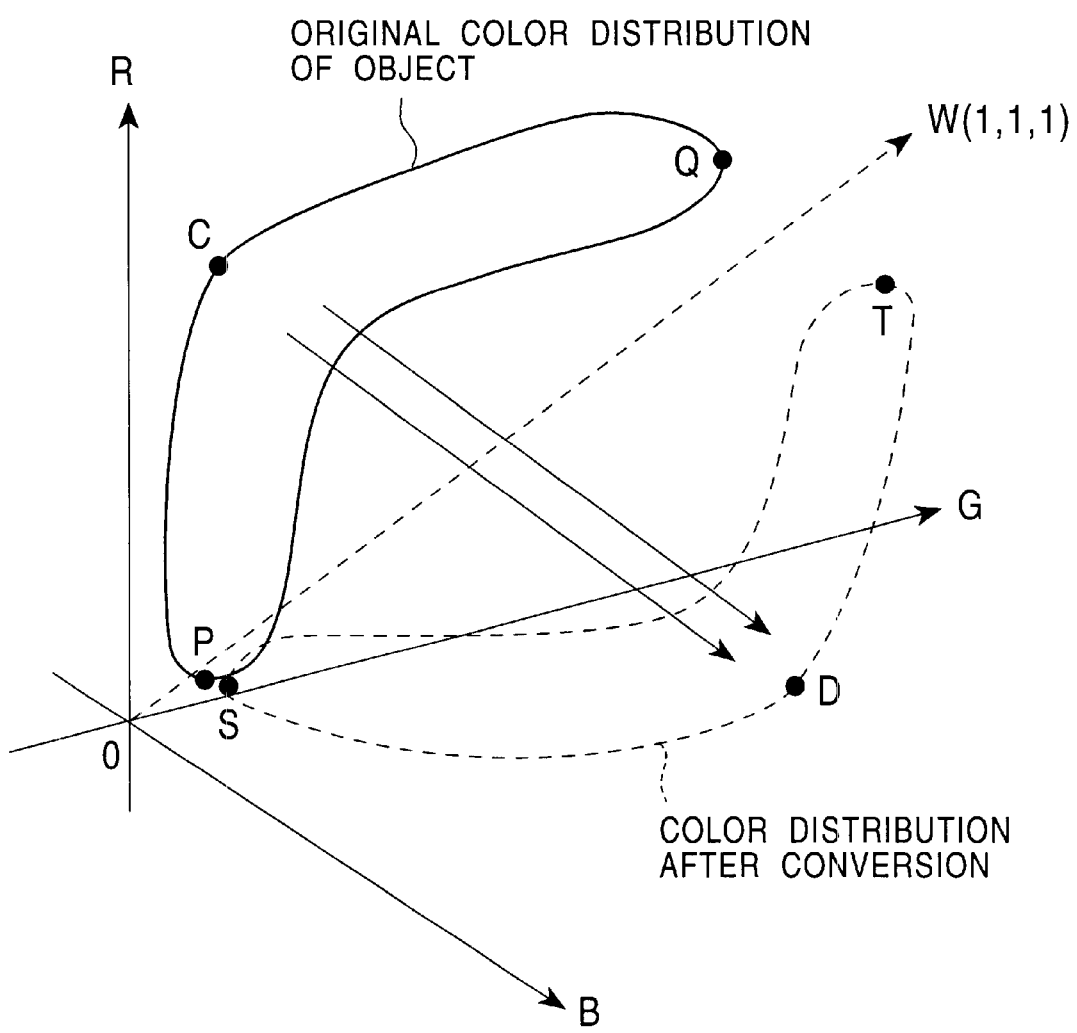
FIG. 37 is a drawing illustrating step S53 shown in FIG. 36.

FIG. 37 shows an example of the color distribution of the object in RGB space (the portion circumscribed with the solid line). FIG. 37 shows the color distribution in which each of the maximum R, G, and B values is normalized to one. Therefore, in the RGB space, a point in which (R, G, B)=(0, 0, 0) represents black, and a point in which (R, G, B)=(1, 1, 1) represents white.

In the RGB space, the chroma is larger farther from the straight line of the points of black and white, in other words, the straight line of the points (0, 0, 0) and (1, 1, 1) in FIG. 37. Accordingly, in step S52, a pixel (in the color distribution obtained in step S51) having the color located at the point being farthest from the straight line of the point (0, 0, 0) and (1, 1, 1) is detected. In the color distribution in FIG. 37, the pixel of color indicated by C in the same Figure is computed as the maximum chromatic pixel.

Here, the color C of the maximum chromatic pixel (RGB level) is considered as the original color of the object displayed in the two-dimensional image stored in the buffer of interest.

The process proceeds to step S53, and the color distribution computed in step S51 is transformed, then the pixel levels (RGB levels) in accordance with the transformed color distribution are written in the corresponding pixels composing the two-dimensional image stored in the buffer of interest, and the process returns. In step S53, the color C of the maximum chromatic pixel is converted into predetermined color D, then the other colors of pixels composing the region of the object are converted in accordance with a predetermined rule.

Specifically, when the object property process for changing material attributes of the object, such as color or tone, is commanded, in step S53, the color C of the maximum chromatic pixel is converted into the predetermined color D, and in a similar manner, the other colors of pixels composing the region of the object are linearly converted.

That is, as shown in FIG. 37, when the color C of the maximum chromatic pixel is converted, the colors (in the color distribution) between the color C and the color at the point (1, 1, 1) representing white are converted into the color between the color D and the color at the point (1, 1, 1) representing white. Moreover, the colors (in the color distribution) between the color C and the color at the point (0, 0, 0) representing black are linearly converted into the color between the color D and the color of the point (0, 0, 0) representing black. In consequence, the color distribution of the object indicated by the solid line in FIG. 37 is changed to that indicated by the dotted line. In this case, as the colors are linearly converted, the brightest color Q in the original color distribution is converted into the brightest color T in the transformed color distribution. Similarly, the darkest color P in the original color distribution is converted into the darkest color S in the transformed color distribution.

The colors between the color C and the color at the point (1, 1, 1) representing white are specular reflective elements from the object by specular reflection of rays from an illuminant, and the colors between the color C and the color at the point (0, 0, 0) representing black are diffused reflective elements from the object by diffused reflection of rays from the illuminant. Hence, as described above, the colors of the projected image of the object displayed in the two-dimensional image stored in the buffer of interest can be converted while maintaining the original shade by lineally transforming specular reflective elements and diffused reflective elements of the color distribution of the object separately. That is, in the case described above, the color of the object displayed in the two-dimensional image is changeable from the color C to the color D.

The color change is based on the theory of the dichromatic reflection model.

In the above-described case, respective specular reflective elements or diffused reflective elements of the color distribution of the object are linearly transformed, meanwhile specular reflective elements or diffused reflective elements can non-linearly be transformed in step S53.

Figure 38A:
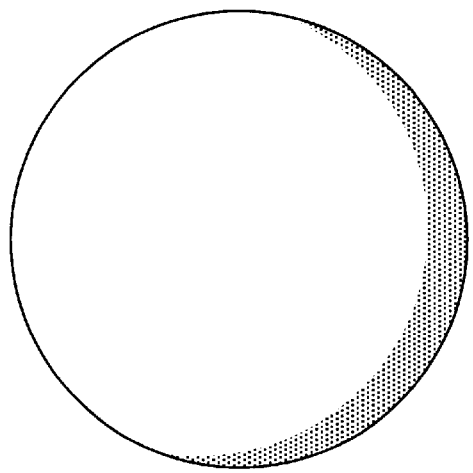
FIGS. 38A and 38B are drawings illustrating the results of the color distribution of an object.
Figure 38B:
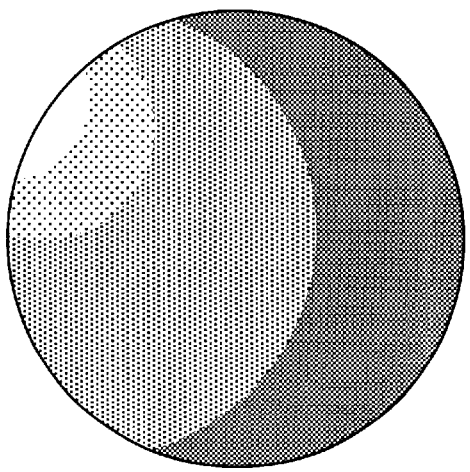

For example, in FIG. 37, by transforming almost all colors between the color C and Q of specular reflective elements to the region around the color D, and transforming the color Q and colors around the color Q to the region around the color T, the object can be provided with strong specular reflection on a limited part of the object. In this case, the entirely bright object having rich diffused reflection (as shown in FIG. 38A) can be changed to the object with strong specular reflection at a part thereof as shown in FIG. 38B.

As described above, non-linear transformation of diffused reflective elements or specular reflective elements enables the region of specular reflection on the object to be narrowed or broadened, or enables the intensity of specular reflection to be changed, hence the material tone of the object can be changed.

The generation of the strong reflection at a part of an object, as illustrated above, is generally due to a small surface roughness of the object. Accordingly, the surface of the object can be changed to a smoother surface by changing the color distribution.

When the illumination change process is commanded, in step S53 in FIG. 36, the colors between the color C and Q of specular reflective elements in FIG. 37 are converted so as to be distributed along from the color C to the color of a new illuminant.

Since the brightest color in the color distribution of the object is considered as a color of the illuminant, an apparent effect in which the illuminant looks to be changed to a new one can be obtained by transforming the colors distributed from the color C to the brightest color Q, to the colors distributed from the color C to the color of the new illuminant.

Referring to step S17 in FIG. 7, the erasing is described. As described above, since the erasing is to eliminate a part of the two-dimensional image stored in the image buffer, the erasing can basically be performed by the following steps. The first is the copying of the image buffer as the buffer of interest, which stores the two-dimensional image to be erased, to store the expanded image in the paste buffer, the second is the erasing for eliminating a part of the expanded image stored in the paste buffer, and the last is the pasting to paste the projected image, corresponding to the expanded image, on the original position in the buffer of interest.

However, in the case of erasing the cylinder buried in a grid pattern wall in the two-dimensional image as shown in FIG. 39A, sequential processing from the copying to store the wall of the expanded image in the paste buffer as shown in FIG. 39B to the erasing of simply eliminating the part of the cylinder followed by the pasting, results in an unnatural two-dimensional image without any design at the part where the cylinder originally existed.

Therefore, the erasing can eliminate a part of the expanded image, and can reproduce the eliminated part of background.

That is, for example, in the case of eliminating the cylinder buried in the grid pattern wall in the two-dimensional image, shown in FIG. 39A, when the expanded image of the wall is stored in the paste buffer, as shown in FIG. 39B, by performing the copying, the erasing can eliminate the cylinder part, and can render the background corresponding to the eliminated part. Hence, the grid pattern is entirely drawn on the expanded image of the paste buffer, as shown in FIG. 39C.

Accordingly, the cylinder is eliminated as shown in FIG. 39D by the pasting with the expanded image as described above, and further the natural two-dimensional image with grid pattern is reproduced at a part where the cylinder originally existed.

As described above, the methods of eliminating a part of the image, and reproducing a background having the eliminated part, which are disclosed in, for example, Japanese Unexamined Patent Publication No. 9-128529 (corresponding to European Unexamined Patent Publication No. 772,157) and 10-105700 (corresponding to U.S. Pat. No. 5,892,853) both by Sony Corporation in Japan, may be employed.

In the copying described above, an expanded image of only one surface of a three-dimensional object displayed in the two-dimensional image stored in the buffer of interest is generated and stored in the paste buffer. However, it is possible that among surfaces composing the three-dimensional object in the two-dimensional image stored in the buffer of interest, at least two adjacent surfaces are generated and stored in the paste buffer.

Figure 40A:
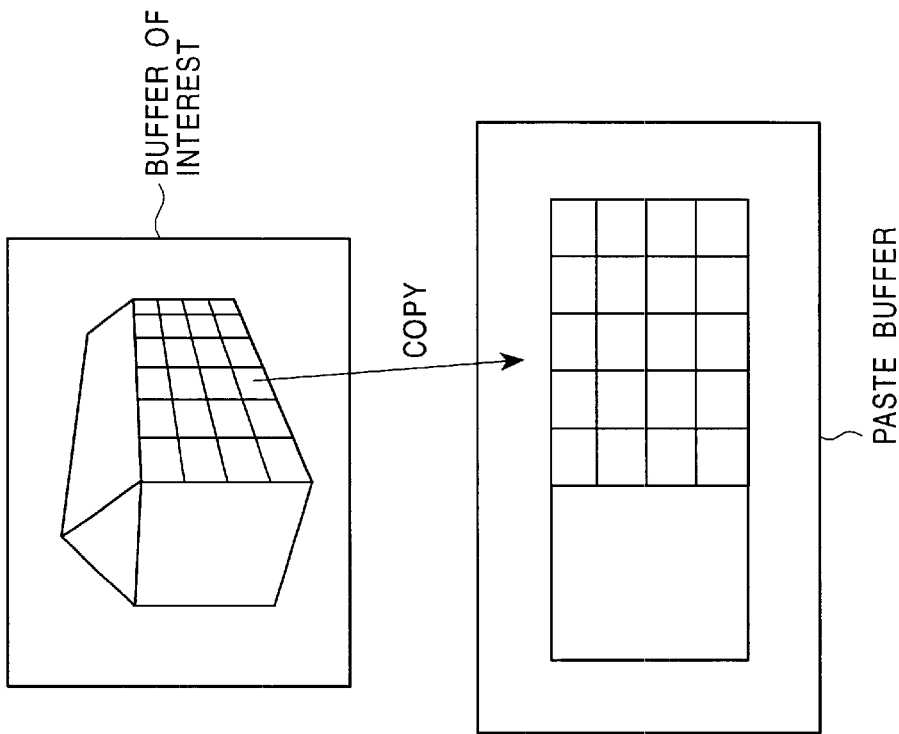
FIGS. 40A and 40B consist of drawings (A), (B), (C), and (D) illustrating copying for a plurality of surfaces.

For example, as shown in FIG. 40(A), in the case where the house-shaped three-dimensional object displayed in the two-dimensional image is stored in the buffer of interest, in order that continuous characters or figures may added to a grid pattern wall and the adjacent plain wall, the copying on the grid pattern wall is performed to store an expanded image of the wall in the paste buffer and the pasting is performed after drawing the characters or figures, whereby the character- or figure-drawn grid-pattern wall is pasted. In addition, the copying on the plain wall is performed to store and expanded image of the plain wall in the paste buffer and the pasting is performed after drawing the character or figures, whereby the character- or figure-drawn grid-pattern wall is pasted. These steps are complicated, which makes it difficult to perform the rendering of continuous characters for figures.

Figure 40B:
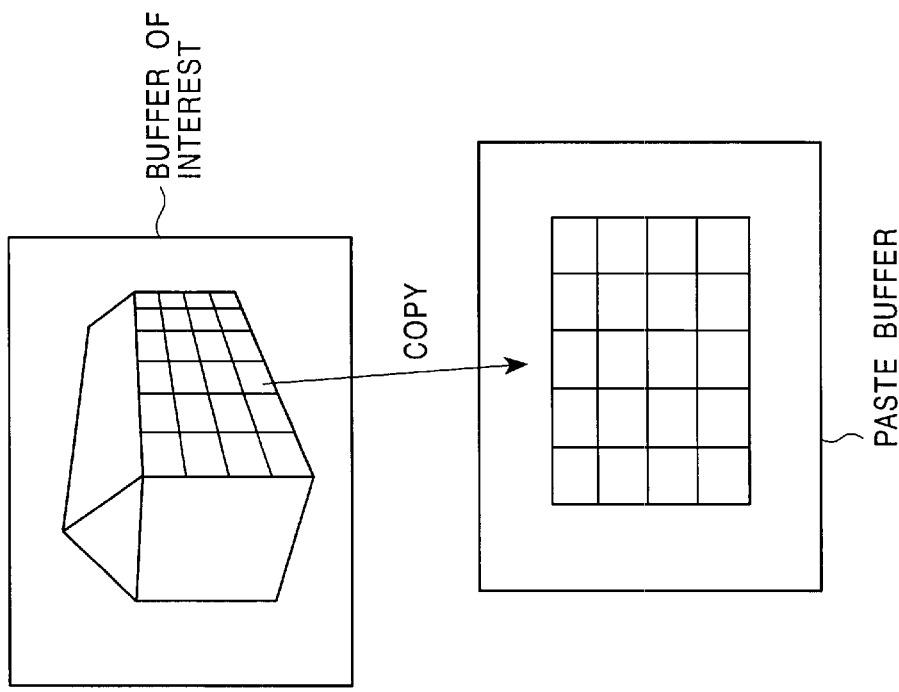

Hence, the copying can generate the expanded images of the grid pattern wall and the adjacent plain wall as shown in FIG. 40(B), and can store these two expanded images in the paste buffer in the form where they are connected. In this case, the continuous characters or figures can readily be rendered on the grid pattern wall and the adjacent plain wall.

Figure 41:
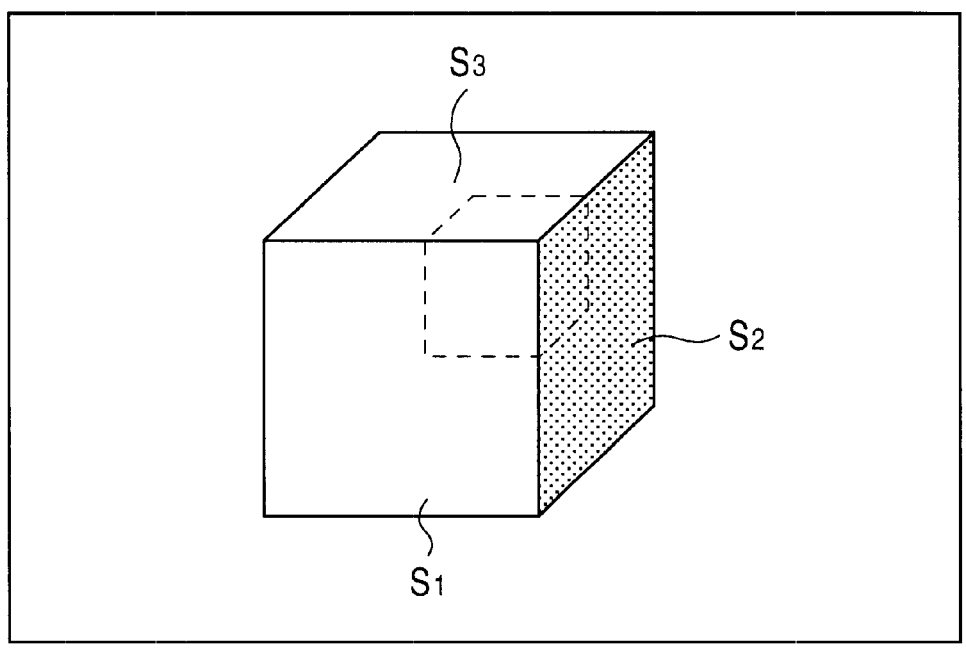
FIG. 41 is a drawing of a two-dimensional image displaying a three-dimensional object in which a line is drawn on three planes.

As shown in FIG. 41, when a two-dimensional image displaying a rectangular object is stored in the buffer of interest and a continuous dotted line is rendered on three visible planes $S_1$, $S_2$, and $S_3$, the line is easily rendered over the planes $S_1$, $S_2$, and $S_3$ by forming respective expanded images of the planes $S_1$, $S_2$, and $S_3$ connected with each other with lines rendered along these expanded images in accordance with the connection relationship of the planes $S_1$, $S_2$, and $S_3$, rather than by forming an expanded image, rendering lines, and pasting the expanded image connected to each plane $S_1$, $S_2$, and $S_3$.

Therefore, the copying on a plurality of planes is desirable for processing of placing successive characters, figures, etc., on two or more adjacent planes of a three-dimensional object displayed on a two-dimensional image stored in the buffer of interest.

Figure 42:
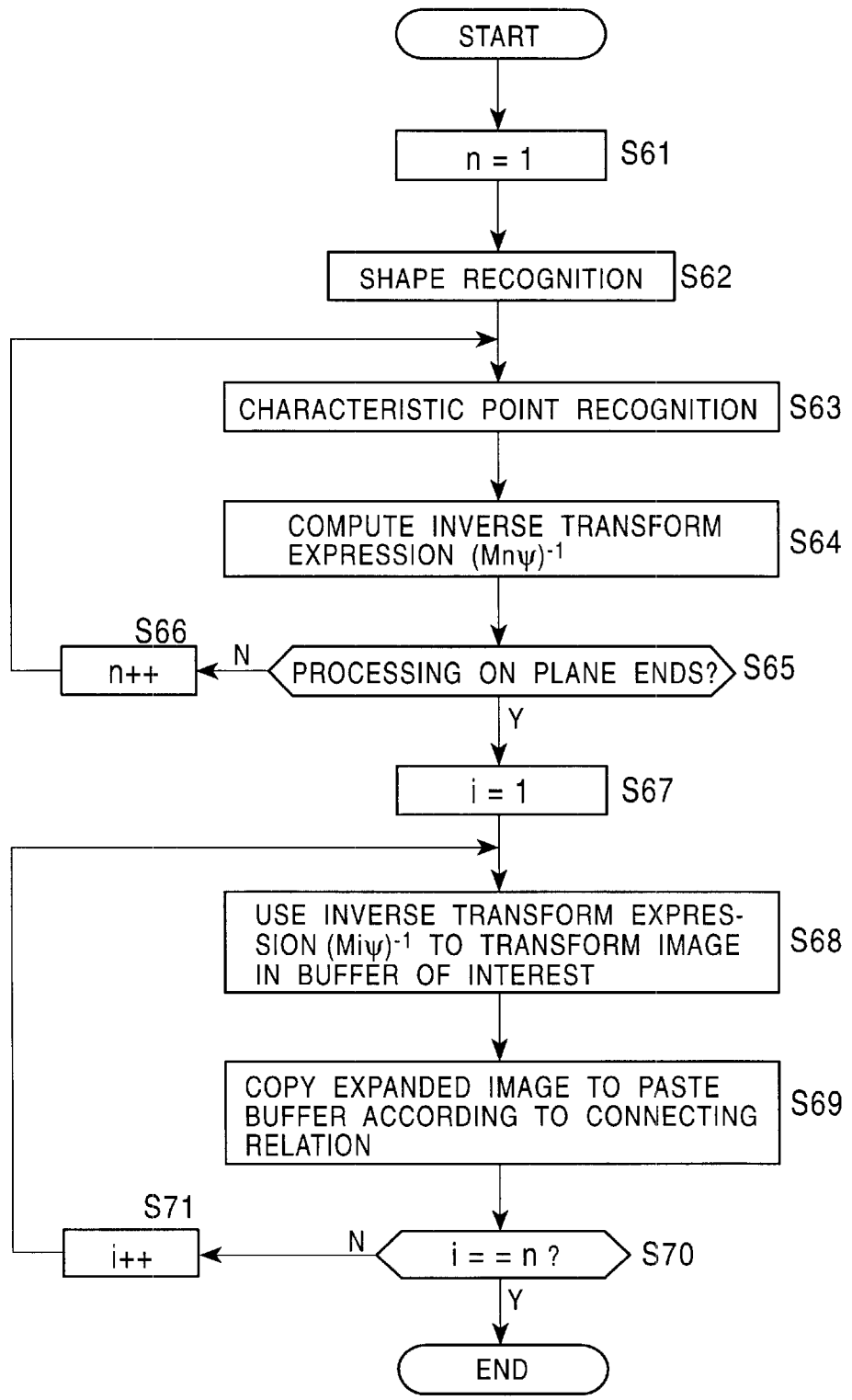
FIG. 42 is a flowchart illustrating copying for a plurality of surfaces.

The following description is about the copying on a plurality of planes of a three-dimensional object displayed in a two-dimensional image stored in a buffer of interest, in accordance with a flowchart of FIG. 42.

In step S61 in FIG. 42, in the copying on a plurality of planes, the copy processor 12 sets the initial value of a variable n to 1. The process proceeds to step S62 when the user operates one of the shape buttons 32 (in FIG. 8), and the copy processor 12 recognizes the shape (shape information) of the three-dimensional object used for the copying in accordance with the operation of the shape button 32.

After the designation of characteristic points of the three-dimensional object for processing on the two-dimensional image stored in the buffer of interest in accordance with the operation of the input unit 6, the process proceeds to step S63. In step S63, the copy processor 12 recognizes the coordinates of the characteristic points on the two-dimensional image. The copy processor 12 transfers, as needed, the characteristic points as the coordinates being recognized to the designated transform processor 19 to perform the automatic correction.

After the characteristic points of the planes of the three-dimensional object for processing on the two-dimensional image are recognized, in step S64, the copy processor 12 computes the inverse transform expression $(M_n\psi)^{-1}$ for transforming the planes composing the three-dimensional object on the two-dimensional image stored in the buffer of interest into an expanded image, in accordance with the shape information recognized in step S62 and the characteristic points recognized in the above step S63. The matrix $M_n$ forming the above-mentioned inverse transform expression $(M_n\psi)^{-1}$ means the matrix M described above (the matrix M for the screen projection of the planes composing a three-dimensional object in a three-dimensional space as described in FIG. 19) relating to a plane of a plurality of the planes used for the copying as being specified by the characteristic points recognized in the n-th processing of step S63 (hereinafter referred to as the "n-th plane").

In step S65, the input event processor 11 determines whether the input of the characteristic points of all the planes used for the copying is completed. When the input event processor 11 determines the input of the characteristic points is not completed for all the planes used for the copying, for example, the input unit 6 has been so operated in step S65, then the process proceeds to S66 in which the copy processor 12 increases the variable n by 1. The process returns to step S63 when the characteristic points of the planes used for the processing are input from the input unit 6 by the user, and the subsequent steps are repeated.

If the process has determined in step S65 that the input of the characteristic points of all the planes used for the copying is completed, for example, when the input unit 6 has been operated as described above, the process proceeds to S67 in which the copy processor 12 sets the initial value to 1 of the variable i, and provides the inverse transform expression $(M_n\psi)^{-1}$ to the image transform processor 20. The image transform processor 20 transforms, in step S68, the projected image of the i-th plane (specified with the characteristic points) composing the three-dimensional object on the two-dimensional image stored in the buffer of interest to an expanded image in accordance with the inverse transform expression $(M_n\psi)^{-1}$ provided by the copy processor 12.

In step S69, the image transform processor 20 writes an expanded image of the i-th plane in the paste buffer.

In step 69, the image transform processor 20 writes the expanded image of the i-th plane in the paste buffer in accordance with the connection relationship of the i-th plane to a plane (hereinafter referred to as a connected plane) of a plurality of the planes used for the copying. In other words, for example, when the i'-th plane (i' means 1 or an integer between i and 1) is already written in the paste buffer and is contacting with the i-th plane in the three-dimension object, the image transform processor 20 basically writes the expanded image of the i-th plane so as to contact with the expanded image of the i'-th plane written in the paste buffer. In this case, therefore, expanded images of the i'-th plane and the i-th plane of the three-dimension object are stored in the paste buffer as being concurrently expanded on a two-dimension plane.

When i=1, i.e., when the first plane is written in the paste buffer, the expanded image of the first plane is written in a random field of the paste buffer, for example, approximately in the center of the paste buffer, because no expanded image of the plurality of the planes used for the copying is yet stored in the paste buffer.

In step S70, after the expanded image of the i-th plane is written in the paste buffer, the copy processor 12 determines whether the variable i equals the variable n. When the variable i is determined not to be equal to n in step S70, that is, when all the expanded images of the plurality of the planes used for the copying have not been written in the paste buffer, the process proceeds to S71 where the variable i is increased by 1, then the process returns to S68. The processes are repeated from step S68 through step S71 unless the variable i is determined to be equal to n.

The process is terminated in the when the variable i is determined to be equal to n in step S70.

As is described above, by the processes being repeated in steps S68 through S71, the expanded image of the first plane is first written and then the expanded image of the second plane is written in the connection relationship to the first plane in the paste buffer. Thereafter, the expanded image of the third plane is written in the connection relationship to the first or second plane, and this process is repeated until the expanded image of the n-th plane is written. As a result, a plurality of the expanded images of the planes used for the copying are finally stored in the paste buffer as being mutually connected in the connection relationship of each plane to the first plane as a base (hereinafter referred to as a connected image).

Accordingly, after the connected image is once stored in the paste buffer, characters, figures, etc., can be written in relationship to the connected image in the same manner as an expanded image of a plane is stored in the paste buffer.

The connected image stored in the paste buffer can be defined as an image in which the first plane is the plane of interest, since the connected image is generated by the copying on a plurality of the planes, as described in FIG. 42, with each expanded image of the planes being connected in the connection relationship of each of a plurality of the planes to the first plane. However, when characters and figures are rendered on a plurality of the planes of a three-dimensional object as a projected image on a two-dimensional image, the characters and figures may be more easily rendered on a connected image composed of a plurality of the expanded images of the planes with a plane other than the first plane being a base image (hereinafter referred to as a plane of interest). Furthermore, when the characters and figures are rendered on the connected image generated by the copying of a plurality of the planes as described in FIG. 42, the processing may be more easily performed with the connected image being inclined (being rotated by a predetermined angle around a predetermined point).

Accordingly, in this embodiment, the plane of interest can be changed to a plane other than the first plane for reforming a connected image generated by connecting a plurality of expanded images based on the new plane of interest, or plane-of-interest change/rotation processing for rotating a connected image can be performed after the connected image is generated.

Figure 43:
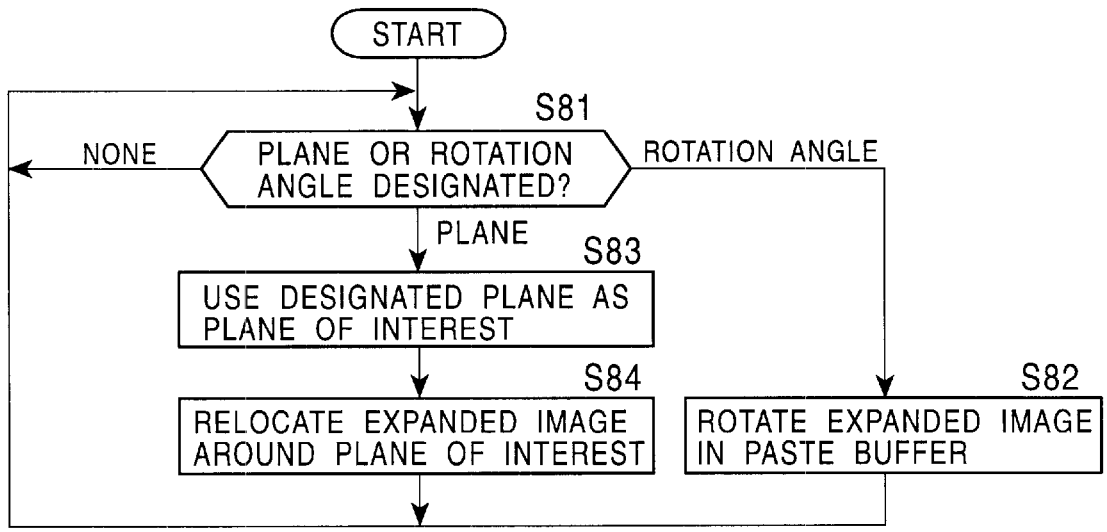
FIG. 43 is a flowchart illustrating plane-of-interest change/rotation processing.

FIG. 43 is a flowchart showing the plane-of-interest change/rotation processing.

In the plane-of-interest change/rotation processing, in step S81, the input event processor 11 determines whether a plane of interest or a rotation angle has been designated by, for example, the operation of the input unit 6 by the user. The process returns to step S81 if the input event processor 11 has determined that no designation has been done.

If the input event processor 11 has determined in step S81 that a rotation angle has been designated, that is, when the rotation angle has been input by the user operating the input unit 6, the process proceeds to S82 in which the input event processor 11 provides the copy processor 12 with the rotation angle (hereinafter referred to as a designated rotation angle) for the copy processor 12 to control the image transform processor 20 so as to re-compute the expanded images of a plurality of the planes in accordance with the inverse transform expression $(M_n \psi)^{-1}$, and the designated rotation angle, then the process returns to step S81. Thereby, the image transform processor 20 converts the connected image stored in the paste buffer into a connected image inclined by the designated rotation angle.

If the input event processor 11 has determined that a plane of interest has been designated, that is, when the user has designated, through the input unit 6, one of a plurality of the expanded images composing a connected image stored in the paste buffer, the process proceeds to step S83 in which the input event processor 11 provides the copy processor 12 with the designation for the copy processor 12 to replace the existing plane of interest with a new plane of interest as being designated. Then, the process proceeds to step S84 in which the copy processor 12 controls the image transform processor 20 so as to generate a connected image connecting a plurality of the expanded planes with respect to the new plane of interest, and the process returns to step S81. With this process, the image transform processor 20 converts the connected image stored in the paste buffer into a connected image connecting each expanded image of a plurality of the planes used for the copying in accordance with the connection relationship of among the planes.

In the above-described case, the connected image is rotated around the centroid of a plane of interest, however, the center of rotation can be changed to other points of the plane. The center of rotation of the connected image can be determined in other ways, for example, by the user's designation.

The following description is about processing on a connected image, for example, of a rectangular object.

Figure 44:
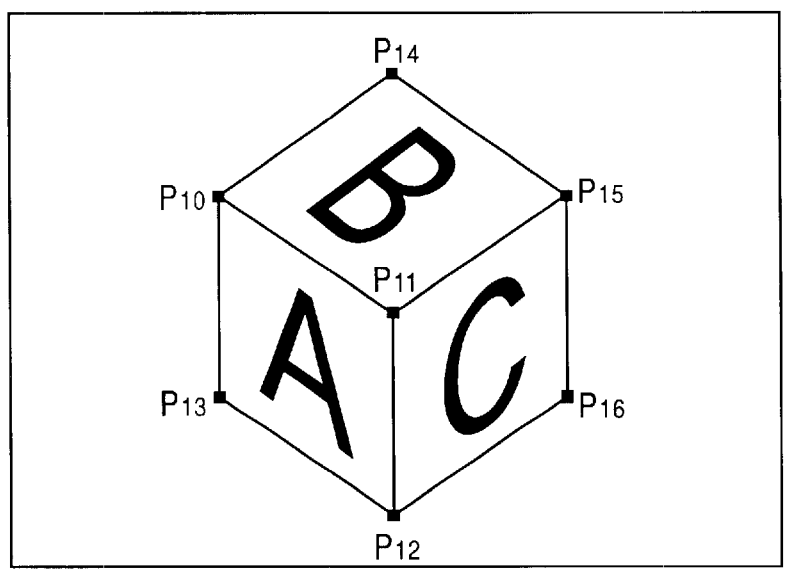
FIG. 44 is a drawing of a two-dimensional image displaying a parallelepiped.

For example, a two-dimensional image displaying a projected image of a rectangular object, as shown in FIG. 44, is stored in the buffer of interest. In this case, three letters are written on three visible planes: a letter A on the left plane, a letter B on the top plane, and a letter C on the right plane. The planes are appropriately and hereinafter referred to as "plane A", "plane B", and "plane C", respectively.

In FIG. 44, the user designates as characteristic points the vertexes of the planes A through C, each projected on a two-dimensional image, when copying is performed on the planes A through C. That is, the user designates the points $P_{10}$, $P_{11}$, $P_{12}$, and $P_{13}$ of the plane A, the points $P_{14}$, $P_{15}$, $P_{11}$, and $P_{10}$ of the plane B, and the points $P_{11}$, $P_{15}$, $P_{16}$, and $P_{12}$ of the plane C as characteristic points of each plane. In this case, the copy processor 12 computes the inverse transform expression $(M\psi)^{-1}$ concerning each of planes A to C.

When the matrix M forming the inverse transform expression $(M\psi)^{-1}$ concerning the plane A is denoted by $M_{30}$, the matrix $M_{30}$ is found by the above-described expression (14) because the projected image of the plane A is rectangular. In other words, the matrix $M_{30}$ is a 3×3 matrix as shown in the expression (13), which is found by the following expression.

$$\begin{pmatrix} w_{10}x_{10} & w_{11}x_{11} & w_{12}x_{12} & w_{13}x_{13} \\ w_{10}y_{10} & w_{11}y_{11} & w_{12}y_{12} & w_{13}y_{13} \\ w_{10} & w_{11} & w_{12} & w_{13} \end{pmatrix} = M_{30}\begin{pmatrix} 0 & L_{w30} & L_{w30} & 0 \\ 0 & 0 & L_{H30} & L_{H30} \\ 1 & 1 & 1 & 1 \end{pmatrix} \quad (37)$$

In the expression (37), $(x_{10}, y_{10})$, $(x_{11}, y_{11})$, $(x_{12}, y_{12})$, and $(x_{13}, y_{13})$ denote the coordinates (x, y) representing the points $P_{10}$, $P_{11}$, $P_{12}$, and $P_{13}$, respectively, in the screen coordinate system. And, $w_{10}$, $w_{11}$, $w_{12}$, and $w_{13}$ denote selected values in the homogeneous coordinates. Furthermore, $L_{W30}$ and $L_{H30}$ respectively denote a horizontal length and a vertical length of the expanded image of the plane A. In this case, the horizontal length or the vertical length is the horizontal or vertical length of the expanded image of the plane A disposed normally so as the letter A is not deformed, i.e., the length is that between the point corresponding to $P_{10}$ and the point corresponding to $P_{11}$ or the length between the point corresponding to $P_{10}$ and the point corresponding to $P_{13}$ (also applied to the plane B and the plane C).

The matrix M forming the inverse transform expression $(M\psi)^{-1}$ concerning the plane B and the plane C is also found by the same expression as the expression (37). That is, when the coordinates (x, y) representing the points $P_{14}$, $P_{15}$, and $P_{16}$ in the screen coordinate system are denoted by $(x_{14}, y_{14})$, $(x_{15}, y_{15})$, and $(x_{16}, y_{16})$, respectively, and when the horizontal length and the vertical length of the expanded image of the plane B are denoted by $L_{W31}$ and $L_{H31}$, respectively, and the horizontal length and the vertical length of the expanded image of the plane C are denoted by $L_{W32}$ and $L_{H32}$, respectively, the matrix M forming the inverse transform expression $(M\psi)^{-1}$ is found by the expression (37) with $(x_{10}, y_{10})$, $(x_{11}, y_{11})$, $(x_{12}, y_{12})$, $(x_{13}, y_{13})$, $L_{W30}$, and $L_{H30}$ being replaced by $(x_{14}, y_{14})$, $(x_{15}, y_{15})$, $(x_{11}, y_{11})$, $(x_{10}, y_{10})$, $L_{W31}$, and $L_{H31}$, respectively, for the plane B, and with $(X_{10}, y_{10})$, $(x_{11}, y_{11})$, $(x_{12}, y_{12})$, $(x_{13}, y_{13})$, $L_{W30}$, and $L_{H30}$ being replaced by $(x_{11}, y_{11})$, $(x_{15}, y_{15})$, $(x_{16}, y_{16})$, $(x_{12}, y_{12})$, $L_{W32}$, and $L_{H32}$, respectively, for the plane C (hereinafter the matrixes M for the plane B and the plane C being appropriately denoted as the matrix $M_{31}$ and the matrix $M_{32}$, respectively).

As described above, $L_{W30}$, $L_{H30}$, $L_{W31}$, $L_{H31}$, $L_{W32}$, and $L_{H32}$ can be inputted by a user to the processor or can be set in advance. In case of the rectangular object shown in FIG. 44, the horizontal length of the expanded image of the plane A, $L_{W30}$, equals the horizontal length of the expanded image of the plane B, $L_{W31}$, the vertical length of the expanded image of the plane A, $L_{H30}$, equals the vertical length of the expanded image of the plane C, $L_{H32}$, and the vertical length of the expanded image of the plane B, $L_{H31}$, equals the vertical length of the expanded image of the plane C, $L_{W32}$.

The expanded images of the plane A, the plane B, and the plane C are generated with the projected image of each plane being converted in accordance with the inverse transform expressions $(M_{30}\psi)^{-1}$, $(M_{31}\psi)^{-1}$, and $(M_{32}\psi)^{-1}$, respectively. The $\psi$ here is given by the above-mentioned expression (12), as the planes A through C are square. The expanded images of the plane A, the plane B and the plane C are stored in a paste buffer in accordance with the connection relationship of the planes A through C, thereby a connected image being generated. As described in FIG. 42, when the characteristic points of the planes are designated in order of, for example, the plane A, the plane B, and the plane C, the connected image is generated with the expanded image of the plane A (the first plane) as the plane of interest of which characteristic points are first designated, and with the expanded images of the planes B and C being in turn stored in the paste buffer on the expanded image of the plane A as a base.

Figure 45C:
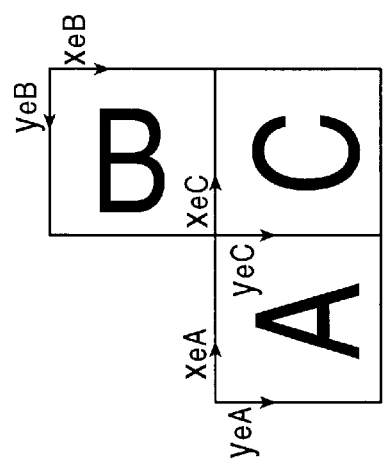
FIGS. 45A, 45B, and 45C are drawings showing the results of copying for the parallelepiped shown in FIG. 44.
Figure 45B:
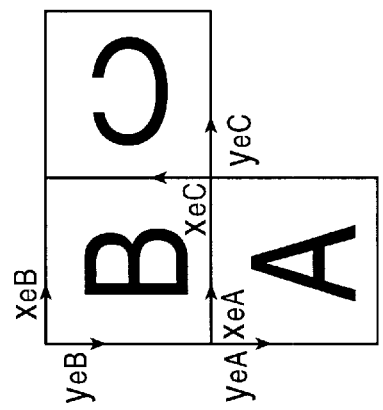
Figure 45A:
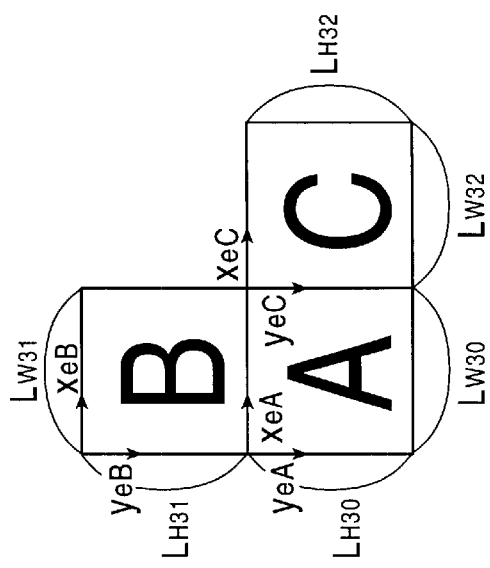

In this case, therefore, a connected image is stored in the paste buffer, being composed of the expanded images of the planes A through C as shown, for example, in FIG. 45A.

Namely, the expanded image of the plane A is first written in the paste buffer as the plane of interest as described in FIGS. 20A and 20 B. Particularly, as shown in FIG. 45A, for example, the expanded image of the plane A is rendered by considering a coordinate system of the paste buffer (hereinafter referred to as a paste buffer coordinate system of the plane A) having an x-axis in a horizontal direction (the direction corresponding to that from point $P_{10}$ to point $P_{11}$) and a y-axis in a vertical direction (the direction corresponding to that from point $P_{10}$ to point $P_{13}$) with the extreme upper left point of the expanded image of the plane A (the point corresponding to point $P_{10}$) as an origin. In this case, the coordinate x and the coordinate y in the paste buffer coordinate system of the plane A are hereinafter appropriately denoted as $x_{eA}$ and $y_{eA}$, respectively.

Then, the expanded image of the plane B is written in the paste buffer, and connected to the expanded image of the plane A, with a common member $P_{10}$, $P_{11}$, as shown in FIG. 44, as the plane B is situated over the plane A when looking at the rectangular object having planes A through C from the direction of plane A, which is the plane of interest. Namely, as shown in FIG. 45A, for example, the expanded image of the plane B is rendered by considering a coordinate system of the paste buffer (hereinafter referred to as a paste buffer coordinate system of the plane B) having an x-axis in a horizontal direction (the direction corresponding to that from point $P_{14}$ to point $P_{15}$) and a y-axis in a vertical direction (the direction corresponding to that from point $P_{14}$ to point $P_{10}$) with the extreme upper left point of the expanded image of the plane B (the point corresponding to point $P_{14}$) as an origin. In this case, the coordinate x and the coordinate y in the paste buffer coordinate system of the plane B are hereinafter appropriately denoted as $x_{eB}$ and $y_{eB}$, respectively.

In the case where the plane A is the plane of interest, the paste buffer coordinate system of the plane B is considered, as shown in FIG. 45A, with the axes $x_{eB}$ and $y_{eB}$ being parallel to the axes $x_{eA}$ and $y_{eA}$, respectively, and with the point $(0, -L_{H31})$ in the paste buffer coordinate system of the plane A being the origin. The origin in the paste buffer of the plane A, therefore, coincides with the point $(0, LH_{31})$ in the paste buffer coordinate system of the plane B in this case.

Further, the expanded image of the plane C is written in the paste buffer, and connected to the expanded image of the plane A, with a common member $P_{11}P_{12}$, as shown in FIG. 44, as the plane C is situated at the right of the plane A when looking at the rectangular object having planes A through C from the direction of plane A, which is a plane of interest. In other words, as shown in FIG. 45A, for example, the expanded image of the plane C is rendered by considering a coordinate system of the paste buffer (hereinafter referred to as a paste buffer coordinate system of the plane C) having an x-axis in a horizontal direction (the direction corresponding to that from point $P_{11}$ to point $P_{15}$) and a y-axis in a vertical direction (the direction corresponding to that from point $P_{11}$ to point $P_{12}$) with the extreme upper left point of the expanded image of the plane C (the point corresponding to point $P_{11}$) as an origin. In this case, the coordinate x and the coordinate y in the paste buffer coordinate system of the plane C is hereinafter appropriately denoted as $x_{eC}$ and $y_{eC}$, respectively.

In the case when the plane A is a plane of interest, the paste buffer coordinate system of the plane C is considered, as shown in FIG. 45A, with the axes $x_{eC}$ and $y_{eC}$ being parallel to the axes $x_{eA}$ and $y_{eA}$, respectively, and with the point $(L_{W30}, 0)$ in the paste buffer coordinate system of the plane A being the origin. The origin in the paste buffer of the plane A, therefore, coincides with the point $(-L_{W30}, 0)$ in the paste buffer coordinate system of the plane C in this case.

Accordingly, after a connected image, composed of the expanded images of the planes A through C, as shown in FIG. 45A, is written in the paste buffer, the user can easily render successive characters and figures on the planes A and B or the planes A and C, for example, by painting.

In the connected image shown in FIG. 45A, the plane B and the plane C are not connected with each other, therefore, it is difficult to render characters and figures in sequence over these two planes.

In this situation, the plane of interest is changed from the plane A to the plane B or the plane C. When the plane of interest is changed, the plane-of-interest change/rotation processing as described in FIG. 43 is performed, thus, a connected image, which is stored in the paste buffer, is generated composed of the expanded images of the planes A through C with the plane B or the plane C as a new plane of interest.

Namely, the plane B is newly assigned as a plane of interest in place of the plane A which was previously the plane of interest, for example, when the plane B is set to the plane of interest by operating the input unit 6 or by a command to transfer the plane of interest to the upper plane in the case where the plane A is the plane of interest, as shown in FIG. 45A. The paste buffer coordinate system of the plane B as the new plane of interest is transferred to the position of the paste buffer coordinate system of the plane A which was previously the plane of interest, thereby the expanded image of the plane B is re-rendered using the transferred paste buffer coordinate system of the plane B.

The expanded image of the plane A is re-written in the paste buffer at the position connected under the expanded image of the plane B with a common member $P_{10}P_{11}$, as shown in FIG. 44, as the plane A is situated under the plane B when looking at the rectangular object having the planes A through C from the direction of plane B, which is the new plane of interest. Namely, the expanded image of the plane A is re-rendered by considering a new paste buffer coordinate system with the axes $x_{eA}$ and $y_{eA}$ being parallel to the axes $x_{eB}$ and $y_{eB}$, respectively, as shown in FIG. 45B and with the point $(0, L_{H31})$ in the paste buffer coordinate system of the plane B being the origin.

The expanded image of the plane C is re-written in the paste buffer at the position connected at the right to the expanded image of the plane B with a common member $P_{15}P_{11}$, as shown in FIG. 44, as the plane C is situated at the right to the plane B when looking at the rectangular object having the planes A through C from the direction of plane B, which is the new plane of interest. Namely, the expanded image of the plane C is re-rendered by considering a new paste buffer coordinate system with the axes $x_{eC}$ and $y_{eC}$ being parallel to the axes $x_{eB}$ and $y_{eB}$, respectively, when the axes $x_{eB}$ and $y_{eB}$ are rotated counterclockwise by 90 degrees, as shown in FIG. 45B, and with the point $(L_{W31}, L_{H31})$ in the paste buffer coordinate system of the plane C being the origin.

On the other hand, the plane C is newly assigned as a plane of interest in place of the plane A which was previously the plane of interest, for example, when the plane C is set to a plane of interest by operating the input unit 6 or by a command to transfer the plane of interest to the right in the case where the plane A is the plane of interest, as shown in FIG. 45A. The paste buffer coordinate system of the plane C as the new plane of interest is transferred to the position of the paste buffer coordinate system of the plane A which was previously the plane of interest, thereby the expanded image of the plane C is re-rendered using the transferred paste buffer coordinate system of the plane C.

The expanded image of the plane A is re-written in the paste buffer at the position connected to the left of the expanded image of the plane C with a common member $P_{11}P_{12}$, as shown in FIG. 44, as the plane A is situated to the left of the plane C when looking at the rectangular object having the planes A through C from the direction of plane C, which is the new plane of interest. Namely, the expanded image of the plane A is re-rendered by considering a new paste buffer coordinate system with the axes $x_{eA}$ and $y_{eA}$ being parallel to the axes $x_{eC}$ and $y_{eC}$ respectively, as shown in FIG. 45C, and with the point $(-L_{W30}, 0)$ in the paste buffer coordinate system of the plane C being the origin.

The expanded image of the plane B is re-written in the paste buffer at the position connected above the expanded image of the plane C with a common member $P_{11}P_{15}$, as shown in FIG. 44, as the plane B is situated above the plane C when looking at the rectangular object having the planes A through C from the direction of plane C, which is the new plane of interest. Namely, the expanded image of the plane B is re-rendered by considering a new paste buffer coordinate system with the axes $x_{eB}$ and $y_{eB}$ being parallel to the axes $x_{eC}$ and $y_{eC}$, respectively, when the axes $x_{eC}$ and $y_{eC}$ are rotated clockwise by 90 degrees, as shown in FIG. 45C, and with the point $(L_{H31}, -L_{W31})$ in the paste buffer coordinate system of the plane C being the origin.

Accordingly, after a connected image composed of the expanded images of the planes A through C, as shown in FIGS. 45B or 45C, is written in the paste buffer, a user can easily render characters and figures in sequence over the planes B and C, of which processing is difficult on the plane layout in FIG. 45A.

Figure 46:
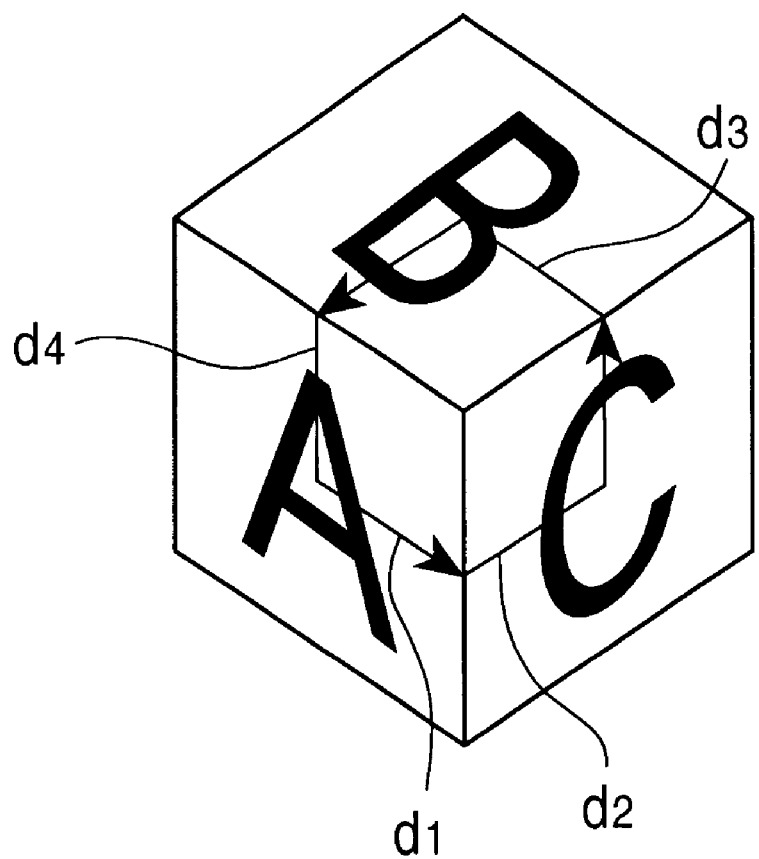
FIG. 46 is a drawing of a two-dimensional image displaying a parallelepiped in which a line is drawn on three planes.
Figure 47A:
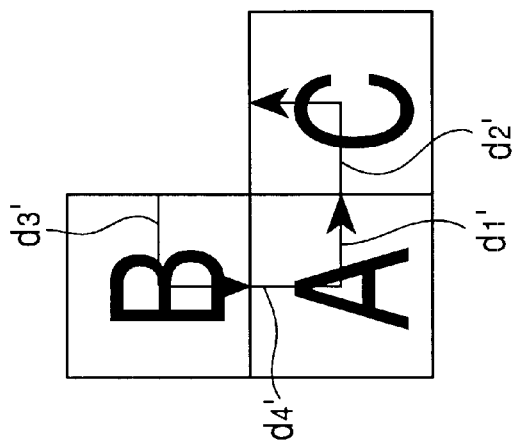
FIGS. 47A, 47B, 47C are drawings of expanded images of the parallelepiped displayed in the two-dimensional image shown in FIG. 46.

To be more concrete, for example, when arrows $d_1$, $d_2$, $d_3$, and $d_4$ are rendered in sequence over the planes A through C, as shown in FIG. 46, on a projected rectangular image shown in FIG. 44, arrow $d_1'$ and arrow $d_2'$ corresponding to the arrow $d_1$ and arrow $d_2$, respectively, are first rendered on the connected image composed of the planes A through C with the plane A being a plane of interest, as shown in FIG. 47A. The arrow $d_1$ and the arrow $d_2$ can easily be written continuously on the projected image, where the arrow $d_2$ starts from the end of the arrow $d_1$, at the bounds of the planes A and C in this case, with the arrows $d_1'$ and $d_2'$ being rendered continuously on the connected image in which the expanded images of the plane A and the plane C are connected with each other, as shown in FIG. 47A.

Figure 47B:
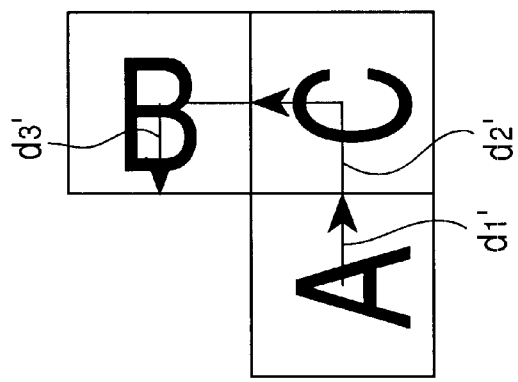

Next, an arrow $d_3'$ corresponding the arrow $d_3$ is rendered on a connected image composed of the planes A through C with the plane C being the plane of interest, as shown in FIG. 47B. The arrow $d_2$ and the arrow $d_3$ can easily be written continuously on the projected image, where the arrow $d_3$ starts from the end of the arrow $d_2$, at the bounds of the planes C and B in this case, with the arrow $d_3'$ being rendered continuously from the end of the arrow $d_2'$ on the connected image in which the expanded images of the plane C and the plane B are connected with each other, as shown in FIG. 47B.

Figure 47C:
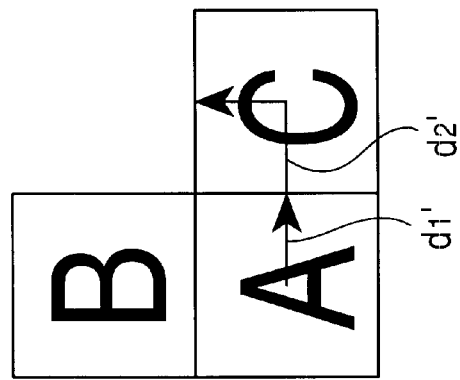

An arrow $d_4'$ corresponding the arrow $d_4$ is rendered on a connected image composed of the planes A through C with the plane A again being a plane of interest as shown in FIG. 47C. The arrow $d_3$ and the arrow $d_4$ can easily be written continuously on the projected image, where the arrow $d_4$ starts from the end of the arrow $d_3$, at the bounds of the planes A and B in this case, with the arrow $d_4'$ being rendered continuously from the end of the arrow $d_3'$ on the connected image in which the expanded images of the plane A and the plane B are connected with each other, as shown in FIG. 47C.

Accordingly, the arrows $d_1$, $d_2$, $d_3$, and $d_4$ can be successively rendered without difficulty on a plurality of planes, for example, on the planes A through C, of a connected image generated with the plane of interest being changed as necessary.

Figure 48:
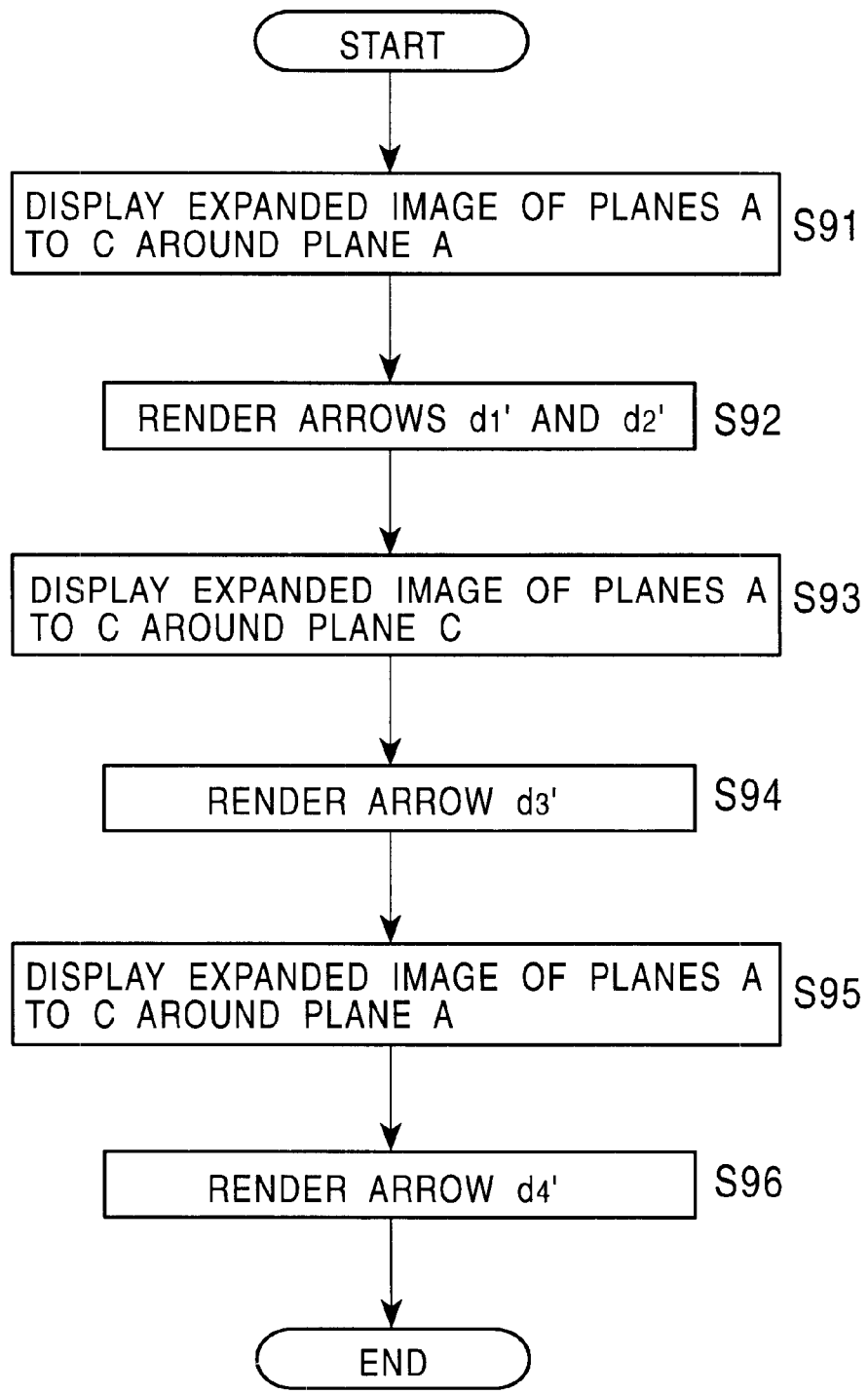
FIG. 48 is a flowchart illustrating a process of operation for obtaining the two-dimensional image shown in FIGS. 47A, 47B, 47C.

The flowchart in FIG. 48 shows an operating process of the above-described rendering by the user. The user first displays an expanded image composed of the planes A through C around the plane A as the plane of interest (step S91), and renders (step S92) an arrow $d_1'$ and an arrow $d_2'$ corresponding to the arrow $d_1$ and the arrow $d_2$, respectively, as shown in FIG. 47A. Next, the user displays a connected image composed of the planes A through C around the plane C as the plane of interest (step S93), and renders an arrow $d_3'$ corresponding to the arrow $d_3$ (step S94), as shown in FIG. 47B, then, displays a connected image composed of the planes A through C around the plane A again as the plane of interest (step S95), and renders an arrow $d_4'$ corresponding to the arrow $d_4$ (step S96), as shown in FIG. 47C.

The plane-of-interest change/rotation processing shown in FIG. 43 can be performed on any of the connected images shown in FIGS. 45A, 45B, and 45C.

Figure 49:
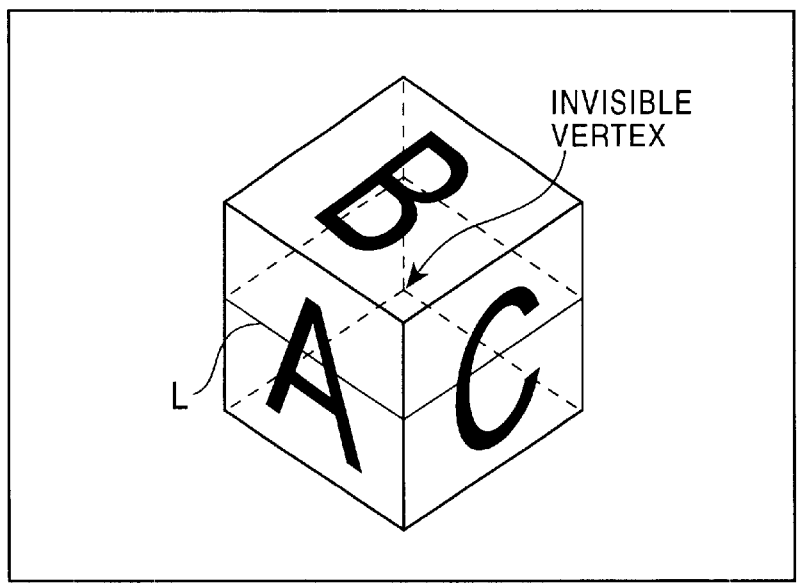
FIG. 49 is a drawing of a two-dimensional image displaying a parallelepiped in which a line is drawn on three planes.

Next, when a line L is rendered around a projected rectangular object (shown in FIG. 44) transversely dividing letters A and C on the planes A and C, as indicated in FIG. 49, the line L must be rendered so as to transversely divide an invisible plane opposed to the plane A on the two-dimensional image (hereinafter referred to as plane A'), to transversely divide another invisible plane opposed to the plane C on the two-dimensional image (hereinafter referred to as plane C'), and to return to the starting point of the line L after being rendered.

It may be difficult to render a line like the above-described line L on a connected image composed only of planes such as the planes A to C displayed in the two-dimensional image shown in FIG. 47.

In this case, a connected image can be generated including expanded images of the planes of a rectangular object, which is not displayed (invisible) in a two-dimensional image (hereinafter referred to as an invisible plane). In other words, as shown in FIG. 49, for example, a connected image can be generated, which includes the plane A' opposed to the plane A, an invisible plane in the two-dimensional image opposed to the plane B (hereinafter referred to as plane B'), and the plane C' opposed to the plane C.

Specifically, in addition to points in the two-dimensional image which correspond to the vertices of planes A to C, also points in the two-dimensional image which correspond to planes A' to C' are designated by the user. Each of planes A to C and planes A' to C' has four vertices. Accordingly, it is simply found that 24 (=4 vertices×6 planes) vertices must be designated as characteristic points. However, only eight points should be substantially designated because these planes constitute the parallelepiped and have common vertices. Practically, the eight vertices of the parallelepiped may be designated as characteristic points. In the projected image of the parallelepiped shown in FIG. 49, among the eight vertices of the parallelepiped, seven vertices are visible, and only one vertex (point as a common vertex of three planes A' to C') is positioned to be invisible. Concerning the invisible vertex, for example, its position must be predicted (assumed) and input.

When the points in the two-dimensional image which correspond to the vertices of planes A to C and A' to C' are designated as characteristic points, the copy processor, 12 computes inverse transform expressions for planes A to C and A' to C', as described with reference to FIG. 42. The image transform processor 20 converts, based on the corresponding inverse transform expressions, the projected images of planes A to C and A' to C' into expanded images. The expanded images are arranged in accordance with their connection relationship, whereby a connected image is generated.

Figure 50:
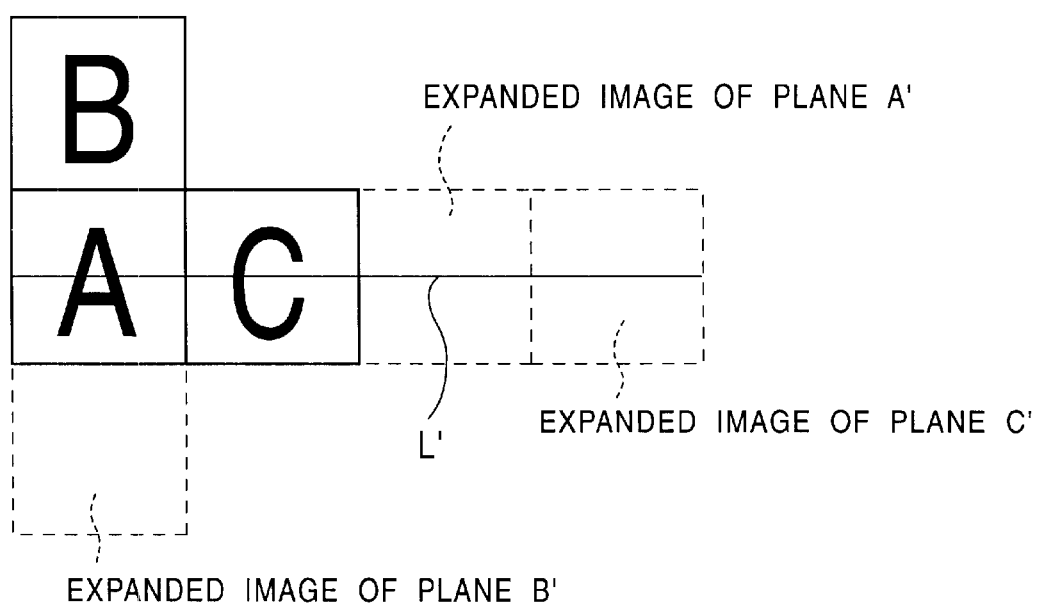
FIG. 50 is a drawing showing an expanded image of the parallelepiped displayed in the two-dimensional image shown in FIG. 49.

When plane A is used a plane of interest, expanded images of planes B and C are disposed around an expanded image of plane A, as described with reference to FIG. 45A. Also expanded images of planes A' and C' are disposed, and for example, a connected image is created as shown in FIG. 50. At this time, because projected images of planes A' to C' are not displayed on the two-dimensional image, their textures are not reflected (cannot be reflected) by the expanded image.

In FIG. 50, the expanded image of plane A' is disposed to be connected on the right of the expanded image of plane C. The expanded image of plane C' is disposed to be connected on the right of the expanded image of plane A'. The expanded image of plane B' is disposed to be connected under the expanded image of plane A. However, the disposition of the expanded images of planes A' to C' is not limited thereto. For example, the expanded image of plane C' may be disposed not on the right of the expanded image of plane A' but on the left of the expanded image of plane A.

After the connected image composed of the expanded images of planes A to C and A' to C' (shown in FIG. 50) is created and stored in the paste buffer, as described above, the user divides each of the characters A and C on planes A and C (as shown in FIG. 49) into upper and lower parts, and divides the plane A' into upper and lower parts, whereby line L' (shown in FIG. 50) corresponding to line L returning through plane C' to the start point so as to divide plane C' into upper and lower parts can be easily drawn.

Figure 51:
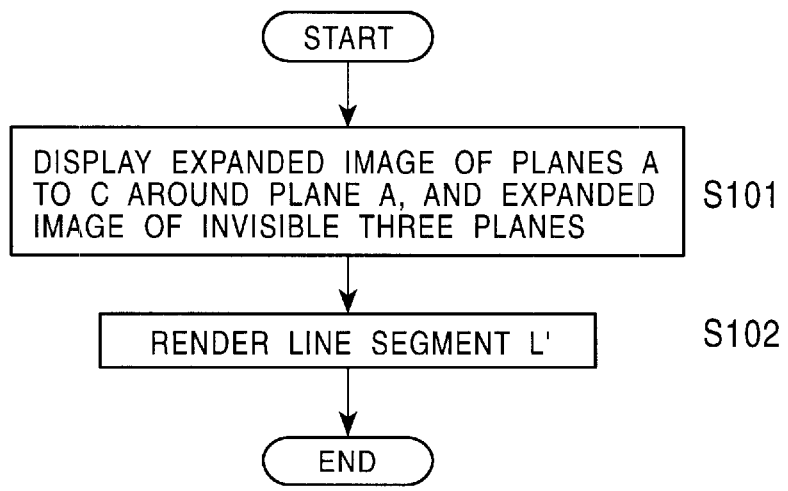
FIG. 51 is a flowchart illustrating a process of operation for obtaining the two-dimensional image shown in FIG. 49.

A user operation process in the above-described rendering is shown by the flowchart in FIG. 51. In step S101, plane A is used as a plane of interest, a connected image composed of expanded images of planes A to C and A' to C' is displayed. In step S102, the rendering of line L' corresponding to line L surrounding the periphery of the parallelepiped is performed.

Processing related on a connected image is described below, using a cylinder as an example.

Figure 52:
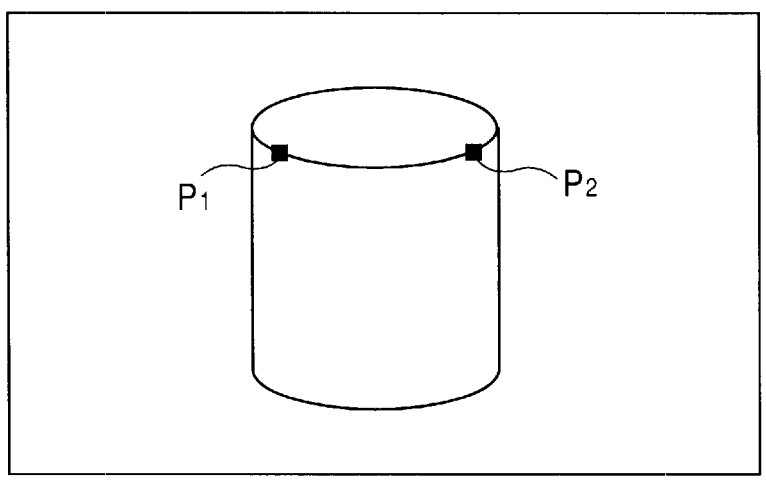
FIG. 52 is a drawing of a two-dimensional image in which a cylinder is displayed.

It is assumed that a two-dimensional image on which a projected image of a cylinder as shown in FIG. 52 is displayed is stored in the buffer of interest. In FIGS. 21A to 21C, only an expanded image of the side plane of the cylinder is created, but in FIG. 32, not only an expanded image of a side surface, but also an expanded image of a base is created, and a connected image in which the expanded images of the side and the base are connected is created. The types of cylindrical base include an upper base and a lower base. Here, an expanded image of only either base displayed on the two-dimensional image is created. However, expanded images of the upper base and the lower base, and an expanded image of either base which is not displayed on the two-dimensional image, may be created.

For creating a connected image composed of expanded images of the cylindrical side surface and base, the user designates, as characteristic points, not only characteristic points to be designated for creating the expanded image of the side surface, but also a point in the two-dimensional image which corresponds to a circumferential point of a circle as the base. When a point in the two-dimensional image which corresponds to a circumferential point of the base to be designated by the user is referred to as a "connection point", the connected image composed of the side surface and base of the cylinder is created so that the expanded image of the side surface and the expanded image of the base are in contact (connected) at the connection point.

Figure 53A:
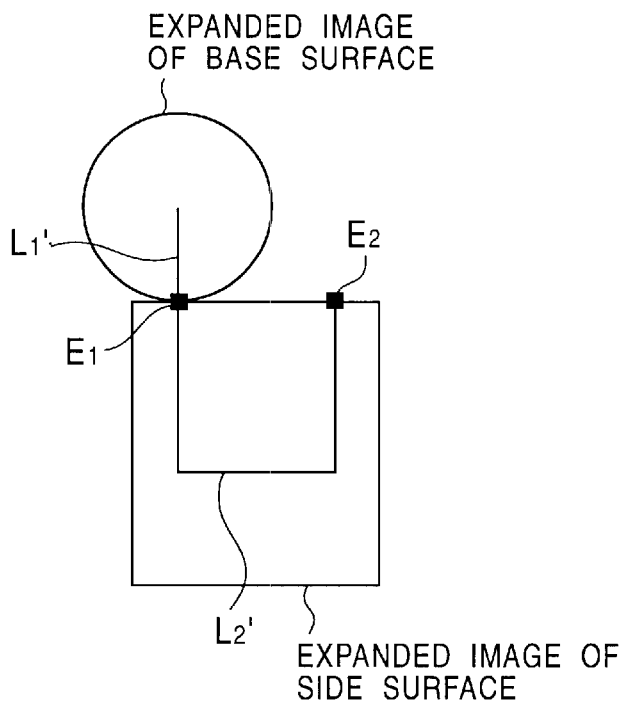
FIGS. 53A and 53B are drawings showing expanded images of the cylinder shown in FIG. 52.
Figure 53B:
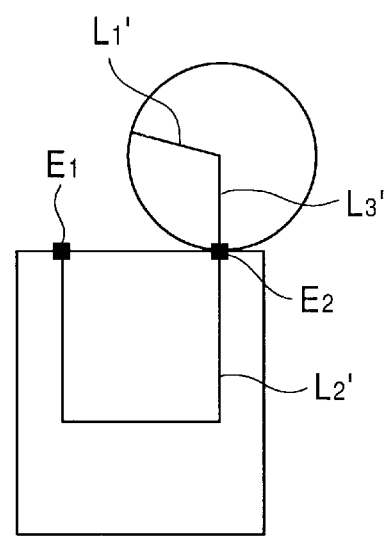

For example, when in the two-dimensional image shown in FIG. 52, circumferential point $P_1$ of the base (upper base) is designated as a connection point, a connected image in which an expanded image of the side surface and an expanded image of the base are in contact at connection point $E_1$ corresponding to connection point $P_1$ is created as shown in FIG. 53A. When in the two-dimensional image shown in FIG. 52, circumferential point $P_2$ of the base (upper base) is designated as a connection point, a connected image in which an expanded image of the side surface and an expanded image of the base are in contact at connection point $E_2$ corresponding to connection point $P_2$ is created as shown in FIG. 53B.

Figure 54:
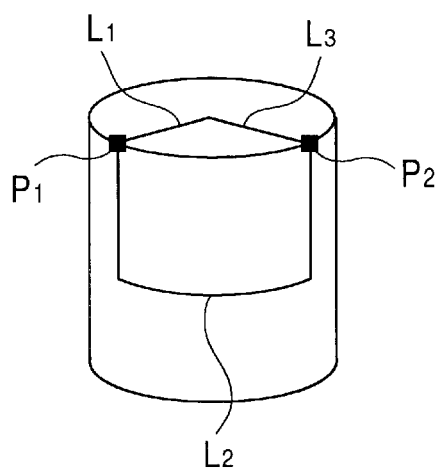
FIG. 54 is a drawing showing the results of rendering by copying and pasting for the cylinder shown in FIG. 52.

Accordingly, in order that in the two-dimensional image (shown in FIG. 52) on which the projected image of the cylinder is displayed, continuous lines $L_1$, $L_2$, and $L_3$ on the side surface and base of the cylinder may be drawn as shown in FIG. 54, the following steps are performed. A connected image as shown in FIG. 53A is created using point $P_1$ as a connection point. Line $L_1'$ corresponding to line $L_1$ is drawn between the center of the base (upper base) and point $E_1$ corresponding to connection point $P_1$. U-shaped Line $L_2'$ corresponding to line $L_2$, which connects point $E_1$ corresponding to connection point $P_1$ and point $E_2$ corresponding to connection point $P_2$, is drawn. A connected image as shown in FIG. 53B is created using point $P_2$ as a connection point, and line $L_3'$ corresponding to line $L_3$ is drawn between the center of the base and point $E_2$ corresponding to connection point $P_2$.

As described above, by drawing lines in a connected image, three-dimensional lines as shown in FIG. 54 can be easily added to an expanded image of a cylinder.

Figure 55:
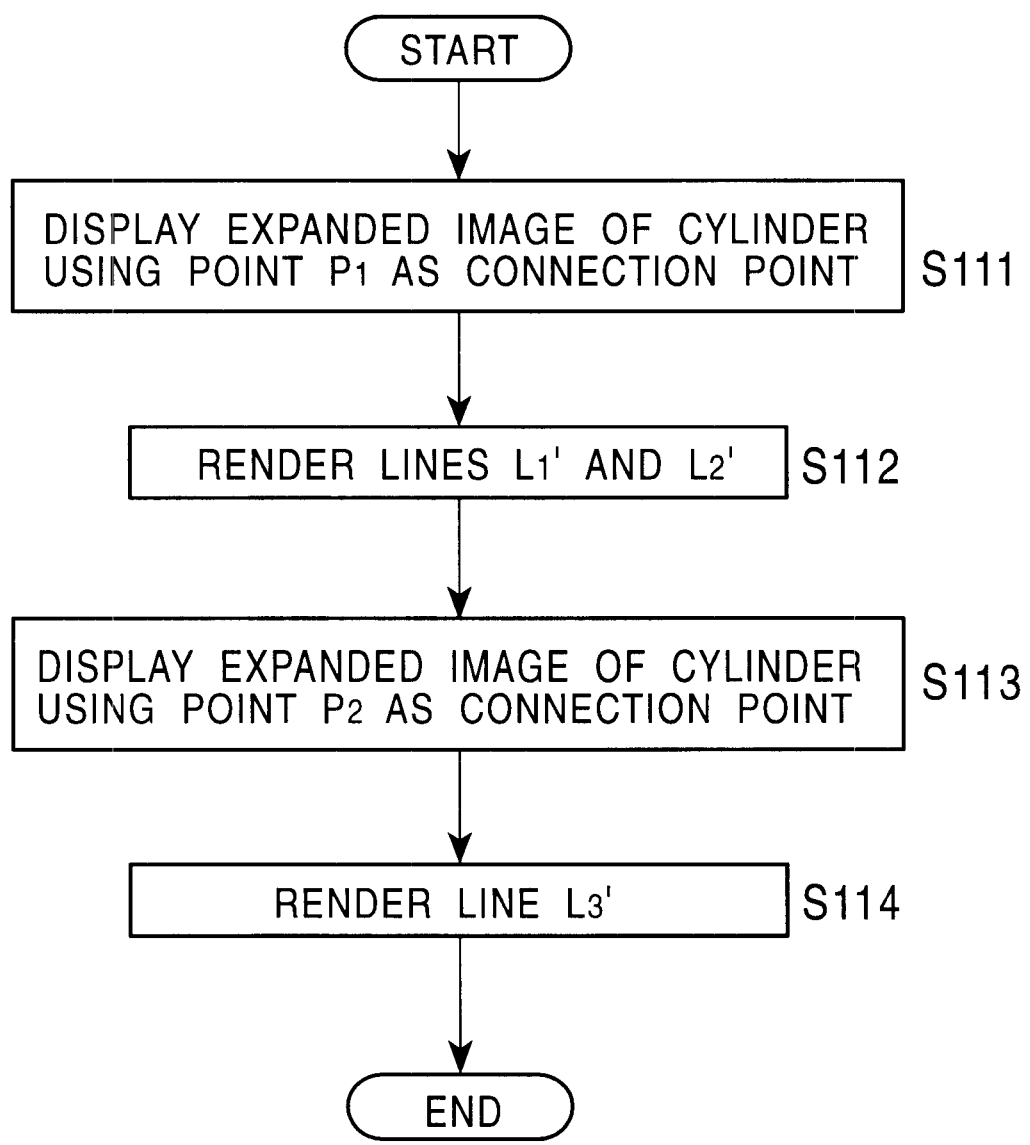
FIG. 55 is a flowchart illustrating a process of operation for obtaining the rendering results shown in FIG. 54.

In the case where rendering (described with reference to FIG. 54) on the projected image of the cylinder (shown in FIG. 52 is performed, a user operation process is shown by the flowchart in FIG. 55.

In step S111, point $P_1$ is designated as a connection point, and a connected image composed of expanded images of the base and the side surface which are in contact at point $E_1$ corresponding to connection point $P_1$ is displayed. In step S112, line $L_1'$ or $L_2'$ corresponding to line $L_1$ or $L_2$ is rendered. In step S113, point $P_2$ is designated as a connection point, and a connected image composed of expanded images of the base and the side surface which are in contact at point $E_2$ corresponding to connection point $P_2$ is displayed. In step 114, line $L_3'$ corresponding to line $L_3$ is rendered.

A method for creating a connected image composed of expanded images of the base and the side surface of a cylinder, that is, a method for transforming the projected image of the cylinder into each connected image shown in FIGS. 53A and 53B is described below.

Figure 56:
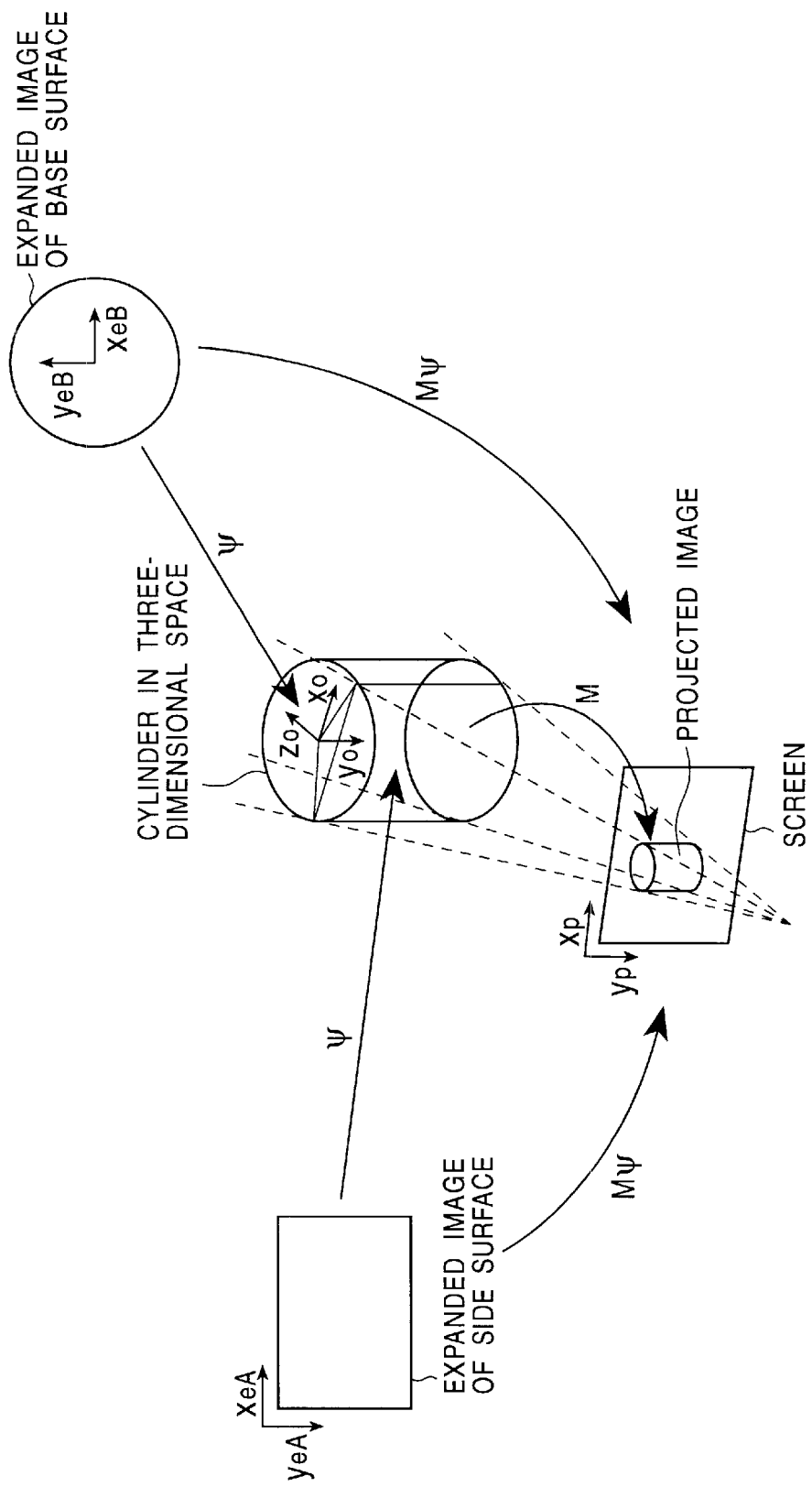
FIG. 56 is a drawing illustrating the generation of expanded images of the side and base surfaces of a cylinder.

Concerning a three-dimensional coordinate system related to the cylinder to be used for creating an expanded image of the cylinder, a two-dimensional coordinate system (paste buffer coordinate system) related to the expanded image, and a two-dimensional coordinate system (screen coordinate system) related to a projected image of the cylinder, the relationship among these is shown in FIG. 56.

In FIG. 56, in the paste buffer coordinate system related to an expanded image of the side surface of the cylinder, x- and y-coordinates are represented as "$x_{eA}$ and $y_{eA}$." In the paste buffer coordinate system related to an expanded image of the base of the cylinder, x- and y-coordinates are represented as "$x_{eB}$ and $y_{eB}$".

In FIG. 56, the $x_o$ axis, the $y_o$ axis, and the $z_o$ axis that represent the three-dimensional coordinate system related to the cylinder as a three-dimensional object are identical to those in the case shown in FIG. 21A. The $x_{eA}$ axis and the $y_{eA}$ axis that represent the paste buffer coordinate system related to an expanded image of the side surface of the cylinder are identical to the $x_e$ axis and the $y_e$ axis in FIG. 21B. The $x_{eB}$ axis and the $y_{eB}$ axis, which represent the paste buffer coordinate system related to an expanded image of the base of the cylinder, correspond to the direction from the center of a circle as the base to the right or upward, that is, the $x_o$ axis and the $y_o$ axis.

The mapping $\psi$ for pasting the expanded image of the side surface on the cylinder as the three-dimensional object, in other words, the relationship between point ($x_{eA}$, $y_{eA}$) of the expanded image in the paste buffer image coordinate system related to the side surface and point ($x_o$, $y_o$, $z_o$) of the cylinder in the three-dimensional coordinate system can be expressed by the following expression, based on the description with reference to FIGS. 21A to 21C.

$$\begin{pmatrix} x_o \\ y_o \\ z_o \end{pmatrix} = \psi(x_{eA}, y_{eA}) = \begin{pmatrix} \psi_1(x_{eA}, y_{eA}) \\ \psi_2(x_{eA}, y_{eA}) \\ \psi_3(x_{eA}, y_{eA}) \end{pmatrix} = \begin{pmatrix} \frac{L_w}{\theta} \sin\left(\frac{\theta}{L_w}\left(x_{eA} - \frac{L_w}{2}\right)\right) \\ \\ -\frac{L_w}{\theta} \cos\left(\frac{\theta}{L_w}\left(x_{eA} - \frac{L_w}{2}\right)\right) \end{pmatrix} \quad (38)$$

where the expression (38) is equivalent to the expression (17). In other words, the expression (38) is equivalent to an expression in which r or $\phi$ is substituted by the expression (15) or (16), and $x_e$ and $x_y$ are replaced by $x_{eA}$ and $y_{eA}$. $L_W$ or $\theta$ in the expression (38) represents an angle formed by the horizontal distance of the expanded image of the cylinder or the visible part of the side surface with respect to the center of the base surface.

Based on the description with reference to FIG. 19, the relationship between the cylinder as the three-dimensional object and the projected image of the cylinder on the screen, that is, the relationship between Point ($x_0$, $y_0$, $z_0$) of the cylinder in the three-dimensional coordinate system and Point ($x_p$, $y_p$) of the projected image of the cylinder in the screen coordinate system can be expressed by the following expression, using the matrix M for transforming the cylinder as the three-dimensional object into a projected image of the cylinder on the screen.

$$\begin{pmatrix} wx_p \\ wy_p \\ w \end{pmatrix} = M \begin{pmatrix} x_0 \\ y_0 \\ z_0 \\ 1 \end{pmatrix} = \begin{pmatrix} m_{11} & m_{12} & m_{13} & m_{14} \\ m_{21} & m_{22} & m_{23} & m_{24} \\ m_{31} & m_{32} & m_{33} & 1 \end{pmatrix} \begin{pmatrix} x_0 \\ y_0 \\ z_0 \\ 1 \end{pmatrix} \quad (39)$$

where the expression (39) is equivalent to the expression (10). In other words, the expression (39) is identical to an expression in which $\psi(x_e, y_e)$ or M in the expression (10) is substituted by the expression (7) or (11).

From the expressions (38) and (39), the following expression representing the relationship between Point $(x_p, y_p)$ of the projected image of the cylinder in the screen coordinate system and Point $(x_{eA}, y_{eA})$ of the expanded image in the paste buffer image coordinate system can be derived.

$$\begin{pmatrix} wx_p \\ wy_p \\ w \end{pmatrix} = M \begin{pmatrix} \frac{L_w}{\theta} \sin\left(\frac{\theta}{L_w}\left(x_{eA} - \frac{L_w}{2}\right)\right) \\ y_{eA} \\ -\frac{L_w}{\theta} \cos\left(\frac{\theta}{L_w}\left(x_{eA} - \frac{L_w}{2}\right)\right) \\ 1 \end{pmatrix} \quad (40)$$

Eleven elements, $m_{11}$ to $m_{14}$, $m_{21}$ to $m_{24}$, and $m_{31}$ to $m_{33}$ (the expression (39)), in the matrix M in the expression (40), can be found based on characteristic points and corresponding points in the paste buffer coordinate system by designating, as the characteristic points, a total of six points composed of five points where the degree of freedom in the projected image of the cylinder is 2, and a point where the degree of freedom in the projected image of the cylinder is 1. When the matrix M in the expression (40) has been found, the projected image of the side surface can be transformed based on the expression (40) into an expanded image of the side surface.

The mapping $\psi$ for pasting the expanded image of the base surface on the cylinder as the three-dimensional object, that is, the relationship between Point $(x_{eB}, y_{eB})$ of the expanded image of the base surface in the paste buffer coordinate system and Point $(x_o, y_o, z_o)$ of the cylinder in the three-dimensional coordinate system, can be expressed by the following expressions, based on the relationship between the expanded image of the base surface (shown in FIG. 56) and the cylinder in the three-dimensional coordinate system.

$$\begin{pmatrix} x_0 \\ y_0 \\ z_0 \end{pmatrix} = \begin{pmatrix} x_{eB} \\ 0 \\ y_{eB} \end{pmatrix} \quad (41)$$

$$\begin{pmatrix} x_0 \\ y_0 \\ z_0 \end{pmatrix} = \begin{pmatrix} x_{eB} \\ L_H \\ y_{eB} \end{pmatrix} \quad (42)$$

The expressions (41) and (42) represent $\psi$ on the upper base surface of the cylinder and $\psi$ on the lower base surface of the cylinder, respectively. $L_H$ in the expression (42) represents the vertical length of the expanded image of the cylinder.

Based on the expression (41) or (42) and the expression (39), the following expressions that represent the relationship between Point $(x_p, y_p)$ of the expanded image of the cylinder in the screen coordinate system and Point $(x_{eB}, y_{eB})$ of the expanded image of the base surface in the paste buffer coordinate system can be deduced.

$$\begin{pmatrix} wx_p \\ wy_p \\ w \end{pmatrix} = M \begin{pmatrix} x_{eB} \\ 0 \\ y_{eB} \\ 1 \end{pmatrix} \quad (43)$$

$$\begin{pmatrix} wx_p \\ wy_p \\ w \end{pmatrix} = M \begin{pmatrix} x_{eB} \\ L_H \\ y_{eB} \\ 1 \end{pmatrix} \quad (44)$$

The expressions (43) and (44) are related to the upper base surface and lower base surface of the cylinder, respectively.

The matrix M in the expression (43) or (44) is identical to the matrix in the expression (40). Thus, when the matrix M in the expression (40) has been found, the projected image of the (upper or lower) base surface can be transformed into the expanded image thereof in accordance with the expression (43) or (44).

Figure 57:
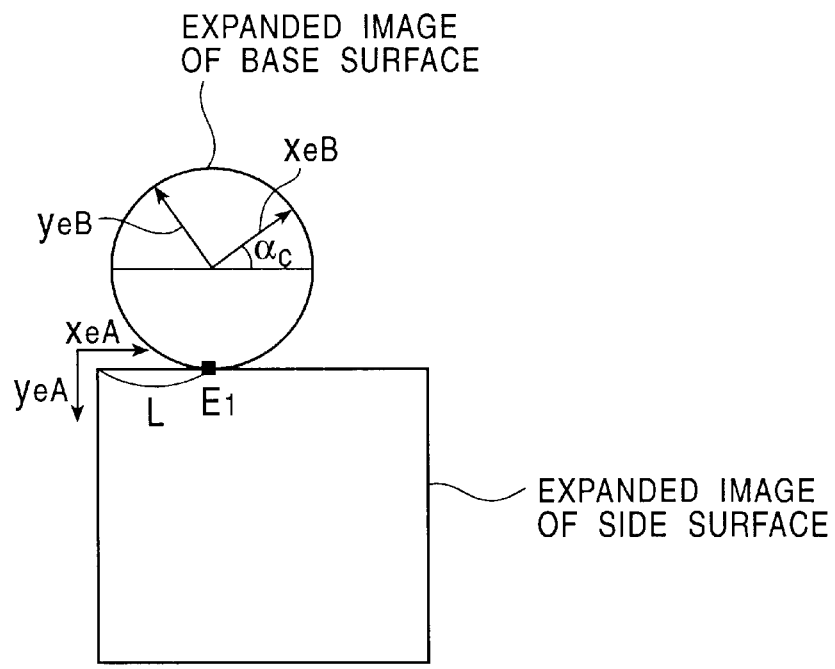
FIG. 57 is a drawing illustrating the generation of expanded images of the side and base surfaces of a cylinder.

Although the projected image of the side surface or base surface of the cylinder can be transformed into the expanded image thereof as described above, the formation of the connected images shown in FIGS. 53A and 53B is performed as shown in FIG. 57.

FIG. 57 shows a connected image formed by connecting the expanded image of the side surface of the cylinder and the expanded image of the base surface of the cylinder. In FIG. 57, point $E_1$ indicates a point corresponding to a point designated as a connection point by the user in the projected image of the cylinder. Point $E_1$ corresponding to the connection point can be found by substituting Point $(x_p, y_p)$ in the expression (40) by the position of the connection point designated by the user on the screen so that $(x_{eA}, y_{eA})$ is computed.

As shown in FIG. 57, the distance between the origin (equal to the upper left vertex of the rectangular expanded image as described in this embodiment) in the paste buffer coordinate system related to the side surface and point $E_1$ is represented by L. An angle that the $x_{eB}$ axis representing the paste buffer coordinate system forms with respect to the $x_{eA}$ axis representing the paste buffer coordinate system related to the side surface is represented by $\alpha_c$.

L can be found from point $E_1$ because it is equal to the $x_{eA}$ axis in the paste buffer coordinate system related to the side surface. $\alpha_c$ can be found based on L by the following expression.

$$\alpha_c = L_W/\theta(L_W/2 - L) \quad (45)$$

Therefore, after rendering the expanded image of the side surface in the paste buffer image related to the side surface, by setting the paste buffer coordinate system related to the base surface so that the point $(x_{eA}, y_{eA}) = (L, -L_W/\theta)$ is used as the origin and the $x_{eB}$ axis is inclined anticlockwise at angle $\alpha_c$ with respect to the $x_{eA}$ axis, and rendering the expanded image of the base surface in the paste buffer coordinate system related to the base surface, a connected image composed of the expanded image of the side surface and the expanded image of the base surface which are in contact at point $E_1$ as shown in FIG. 57.

When the user performs rendering in the range between the point $(0, 0)$ and the point $(L_W, L_H)$ in the paste buffer coordinate system related to the side surface in the expanded image of the side surface, the rendering results are reflected in the projected image of the side surface in accordance with the expression (40). When the user performs rendering in the range of the circle having radium $L_W/\theta$ around point $(0, 0)$ in the paste buffer coordinate system related to the base surface, the rendering results are reflected in the projected image of the base surface.

Although the connected image in which the expanded image of the upper base surface is connected to the expanded image of the side surface is shown in FIG. 57, also a connected image in which the expanded image of the lower base surface is connected to the expanded image of the lower base surface can be similarly formed.

Figure 58A:
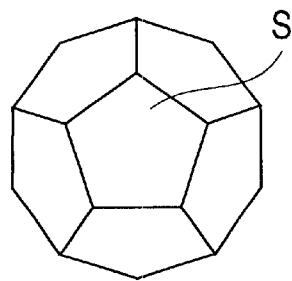
FIGS. 58A and 58B are drawings showing a projected image and an expanded image of a dodecahedron, respectively.
Figure 58B:
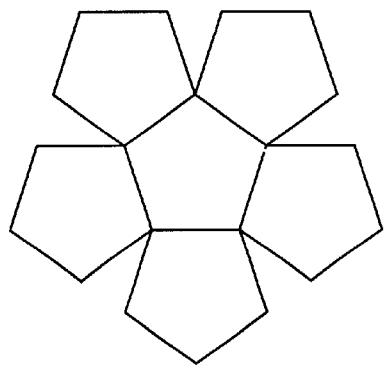

In addition, a connected image can be formed concerning a projected image of a three-dimensional object excluding a parallelepiped or a cylinder. In other words, concerning a projected image of a regular dodecahedron as shown in FIG. 58A, a connected image as shown in FIG. 58B can be formed. FIG. 58B shows a connected image in which plane S as a plane of interest and expanded images of peripheral five planes are connected.

As described above, after performing copying for a plurality of planes, storing a connected image in the paste buffer, and processing the connected image so that a character or figure is added, etc., the processed connected image can be pasted on the original projected image of a three-dimensional object by using pasting. In this case, for each of a plurality of expanded images (expanded images of a plurality of planes used for copying) constituting the connected image, pasting is performed.

The connected image (shown in FIG. 45A) composed of expanded images of planes A to C in which plane A is used as a plane of interest is formed by the steps of writing the expanded image of plane A in the paste buffer coordinate system related to plane A, writing the expanded image of plane B in the paste buffer coordinate system related to plane B, and writing the expanded image of plane C in the paste buffer coordinate system related to plane C.

Referring to FIG. 45A, as described above, in the paste buffer coordinate system, the $x_{eB}$ and $y_{eB}$ axes are in parallel with the $x_{eA}$ and $y_{eA}$ axes, respectively, and point $(0, -L_{H31})$ in the paste buffer coordinate system related to plane A is used as the origin. In the paste buffer coordinate system related to plane C, the $x_{ec}$ and $y_{ec}$ axes are in parallel with the $x_{eA}$ and $y_{eA}$ axes, respectively, and point $(L_{W30}, 0)$ in the paste buffer coordinate system is used as the origin.

In the case where after a connected image is written in the paste buffer, a character or figure is written on the connected image, the writing of pixels (pixel levels) constituting the character or figure is performed by using the paste buffer coordinate system related to plane A as a plane of interest to process the coordinates of the pixels. In other words, when the writing of the character or figure is performed, it is difficult to use the paste buffer coordinate system related to plane A, the paste buffer coordinate system related to plane B, or the paste buffer coordinate system related to plane C to process the coordinates of the pixels constituting the character or figure, depending on in which of the ranges of the expanded images of planes A to C the position of writing is located. Accordingly, for writing the character of figure, the paste buffer coordinate system is used to process the coordinates of the character or figure at a writing position, irrespective of the writing position.

However, in this embodiment, pasting in which a projected image formed by transforming an expanded image of a parallelepiped plane is pasted is performed by using the upper left vertex of the expanded image as the origin as described, and using the coordinates of pixels constituting the expanded image in the paste buffer coordinate system having the vertical $x_e$ axis and the horizontal $y_e$ axis.

Therefore, when the pixels of the paste buffer coordinate system related to plane A, which constitute the connected image shown in FIG. 45A, are transformed into pixels constituting a projected image by pasting, pixels of the connected image to be processed must be transformed depending on in which of the ranges of expanded images of planes A to C, the pixels are positioned. In other words, concerning the pixels constituting the expanded images of planes A to C, the coordinates of the pixels must be transformed and processed by pasting.

Specifically, in this embodiment, pixel coordinates stored in the paste buffer are treated on the assumption that the pixel coordinates are in the paste buffer coordinate system related to plane A. Thus, concerning pixels constituting the expanded image of plane A, the coordinates of the pixels are simply used to perform pasting. In other words, the coordinates of the pixels constituting plane A do not need to be changed. Concerning pixels constituting the expanded image of plane B, coordinates treated in the paste buffer coordinate system related to plane A as a plane of interest must be transformed into coordinates in the paste buffer coordinate system related to plane B. In other words, in the case shown in FIG. 45A, the coordinates of each constituting the expanded image of plane B, which are treated in the paste buffer coordinate system related to plane A as a plane of interest, must be transformed into a value obtained by subtracting $(0, -L_{H31})$ from the coordinates. Concerning also pixels constituting the expanded image of plane C, the coordinates of each pixel, treated in the paste buffer coordinate system related to plane C, must be transformed into coordinates in the paste buffer coordinate system related to plane C. In other words, in the case shown in FIG. 45A, the coordinates of each pixel constituting the expanded image of plane C, which are treated in the paste buffer coordinate system related to plane A as a plane of interest, must be transformed into a value obtained by subtracting $(L_{W30}, 0)$ from the pixel.

Figure 59:
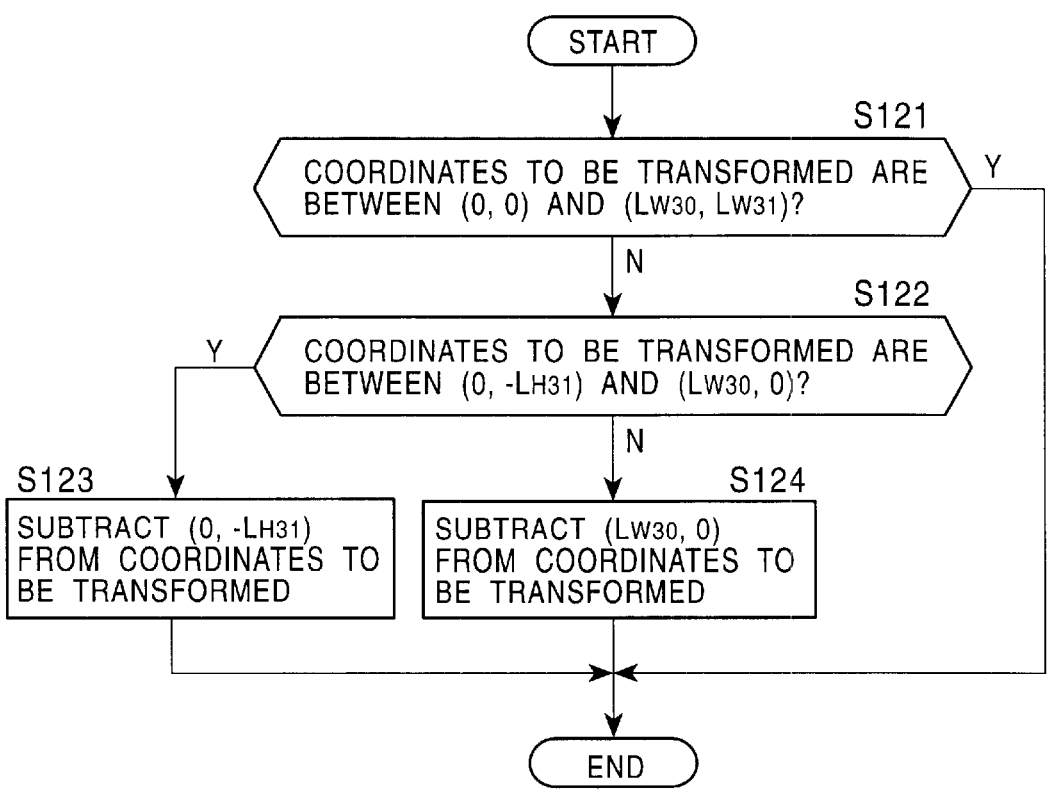
FIG. 59 is a flowchart illustrating coordinate transformation.

Accordingly, a flowchart illustrating a coordinate transformation process for performing the above-described coordinate transformation is shown in FIG. 59. This coordinate transformation process is performed in, for example, the paste processor 13.

In step S121, the process determines whether the pixels (hereinafter referred to as the "pixels for transformation") of the expanded image to be transformed into a projected image are in the range between $(0, 0)$ and $(L_{W30}, L_{H31})$ in the paste buffer coordinate system related to plane A as a plane of interest. If the process has determined that the pixels for transformation are in the range (in the case where the pixels to be transformed constitute the expanded image of plane A), the process ends. In other words, the coordinate of the pixels for transformation are not transformed.

In step S121, if the process has determined that the pixels for transformation are not in the range between $(0, 0)$ and $(L_{W30}, L_{H31})$ in the paste buffer coordinate system related to plane A as a plane of interest, the process proceeds to step S 122. In step S 122, the process determines whether the pixels for transformation are in the range between $(0, -L_{W31})$ and $(L_{W30}, 0)$ in the paste buffer coordinate system related to plane A. If the process has determined in step S122 that the pixels for transformation are in the range between $(0, -L_{W31})$ and $(L_{W30}, 0)$ in the paste buffer coordinate system related to plane A (in the case where the pixels for transformation constitute the expanded image of plane B), the process proceeds to step S123. In step S123, the coordinates of each pixel for transformation are transformed into a value obtained by subtracting the point $(0, -L_{H31})$ from the coordinates, and the process ends.

If the process has determined in step S122 that the pixels for transformation are not in the range between the points (0, $-L_{W31}$) and ($L_{W30}$, 0) in the paste buffer coordinate system related to plane A, that is, in the case where the pixels for transformation constitute the expanded image of plane C positioned in the range between the points ($L_{W30}$, 0) and ($L_{W30}+L_{W30}$, $L_{H32}$), the process proceeds to step S124. In step S124, the coordinates of each pixel for transformation are transformed into a value obtained by subtracting ($L_{W30}$, 0) from the coordinates, and the process ends.

FIG. 59 shows the coordinate transformation process in the case where the connected image shown in FIG. 45A is processed by pasting. In pasting, how the coordinates of pixels constituting a connected image are transformed differs depending on the type of the connected image.

In the case where after a plane of a three-dimensional object displayed in a two-dimensional image stored in the buffer of interest is stored in a paste buffer by performing copying, and the storage contents in the paste buffer are processed, the processed contents are pasted on the original plane of the three-dimensional object by performing pasting, the pasting simply uses shape information and characteristic points used in the copying. This is because in such a case, the shape information and the characteristic points used in the copying and pasting must be the same, and in pasting, it is redundant for the user to re-input shape information and characteristic points identical to those input in copying. In addition, in the case where the user inputs characteristic points for both copying and pasting, characteristic points for copying and characteristic points for pasting may not coincide accurately, even if automatic correction is performed. In such a case, a region of a two-dimensional image on which an expanded image is generated by copying and a region of a two-dimensional image on which an expanded image is generated by pasting do not coincide, which may cause a two-dimensional image processed by pasting to be unnatural.

As described with reference to FIG. 50, in the case where a connected image including an expanded image of an invisible plane (a plane that is not displayed on the two-dimensional image) is generated by performing copying and the connected image is processed by performing pasting, the expanded image of the invisible plane is ignored.

In FIGS. 21A to 21C, 22 to 24, and 52 to 57, the generation of the expanded image of the side surface of the cylinder is performed by using only part of the side surface displayed on the two-dimensional image. The expanded image of the side surface of the cylinder can be generated including part that is not displayed on the two-dimensional image.

In this embodiment, when copying and pasting are performed, shape information on the shape of a three-dimensional object displayed in a two-dimensional image for the copying and the pasting, and predetermined characteristic points are designated by the user. However, in the case where the two-dimensional image is not processed but an image composed of three-dimensional data including at least the position of a three-dimensional object in a three-dimensional space and an image capture position (viewpoint) used when the image of the three-dimensional object was captured, a projected image displayed on the image can be transformed into an expanded image, based on the three-dimensional data, and the expanded image can be transformed into the projected image. In other words, in this case, it is not necessary for the user to designate shape information and characteristic points.

Figure 60A:
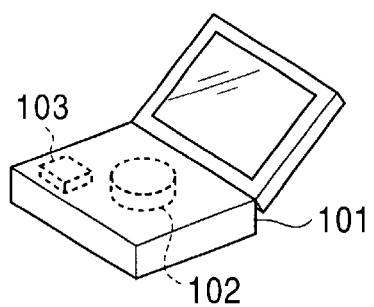
FIGS. 60A, 60B, and 60C are drawings illustrating media to which the present invention is applied.
Figure 60B:
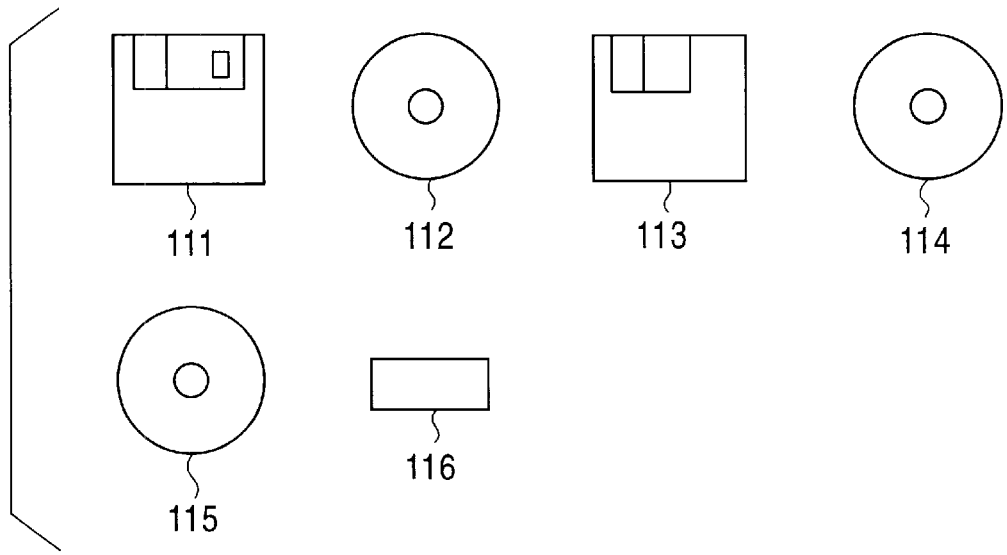
Figure 60C:
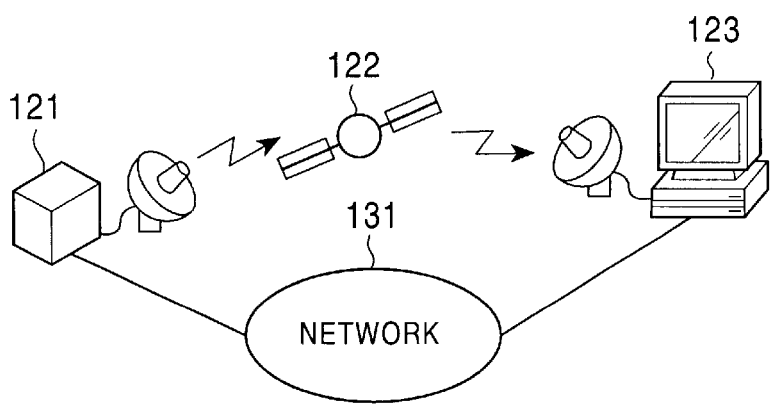

With reference to FIGS. 60A, 60B and 60C, media used for installing, in a computer, a program that executes the above-described processes so that the computer can execute the program is described below.

As shown in FIG. 60A, the program is pre-installed in a hard disk 102 (corresponding to e.g., the external storage unit 7 shown in FIG. 3) as a recording medium built into a computer 101 so as to be provided to the user.

As shown in FIG. 60B, by temporarily or abidingly storing the program in a recording medium such as a floppy disk 111, a compact-disk read-only memory 112, a magnetooptical disk 113, a digital versatile disk 114, a magnetic disk 115, or a semiconductor memory 116, the program can be provided as package software to the user.

In addition, as shown in FIG. 60C, by using radio transmission to transmit the program from a download site 121 to a computer 123 via an artificial satellite 122 for digital satellite broadcasting, or transmitting the program to the compute 123 via a network 113 such as the Internet, the program can be stored in a hard disk or the like built into the computer 123.

The medium in this specification means a broad concept including all the above-described types of medium.

In this specification, steps that describe the program provided by the medium do not always need to be time-sequentially processed in accordance with the order described as the flowcharts. The steps include processes (e.g., parallel processes or processes by objects) that are executed in parallel or separately.

According to this embodiment, the image processing apparatus shown in FIG. 4 is realized by causing the arithmetic circuit 1 shown in FIG. 3 to execute the application program stored in the external storage unit 7. However, the image processing apparatus shown in FIG. 4 is also realized by using hardware corresponding to the functional blocks shown in FIG. 4.

What is claimed is:

1. An image processing apparatus for generating, from a two-dimensional image, expanded images obtained by expanding, on a two-dimensional plane, a plurality of surfaces constituting a three-dimensional object displayed in said two-dimensional image, said image processing apparatus comprising:

operating means for designating shape information on the shape of a surface among the surfaces constituting said three-dimensional object, and characteristic points in said two-dimensional image which are included in the surface;

computing means for computing, based on the shape information and the characteristic points, a transform expression for transforming each surfaces constituting said three-dimensional object into each expanded image;

transforming means for transforming, based on the transform expression, each of the surfaces constituting said three-dimensional object displayed in said two-dimensional image into one of the expanded images; and connecting means for generating a connected image by connecting the expanded images of the surfaces in accordance with connecting relationship among the surfaces.

2. An image processing apparatus according to claim 1, wherein said computing means computes, as the computed transform expression, an inverse transform expression of a function $M\psi$ where $\psi$ represents a function for mapping each expanded image onto each surface constituting said three-dimensional object in a three-dimensional space, and M represents a function for generating said two-dimensional image obtained by projecting said three-dimensional object on a screen.

3. An image processing apparatus according to claim 1, wherein said computing means computes also a transform expression for transforming, into one of the expanded images, an invisible surface not displayed in said two-dimensional image among the surfaces constituting said three-dimensional object;

said transforming means also transforms the invisible surface into one of the expanded images; and said connecting means generates the connected image by using also the expanded image of the invisible surface.

4. An image processing apparatus according to claim 1, further comprising input means for inputting a rotation angle, wherein the connected image is rotated by the input rotation angle.

5. An image processing apparatus according to claim 1, further comprising designating means for designating a surface of interest from among the surfaces, wherein the connected image is generated based on the surface of interest.

6. An image processing apparatus according to claim 1, wherein said three-dimensional object is a rectangular parallelepiped, a cylinder, or a regular dodecahedron.

7. An image processing method for generating, from a two-dimensional image, expanded images obtained by expanding, on a two-dimensional plane, a plurality of surfaces constituting a three-dimensional object displayed in said two-dimensional image, said image processing method comprising:

a computing step for computing, based on shape information on the shape of a surface among the surfaces constituting said three-dimensional object and on characteristic points in said two-dimensional image which are included in the surface, a transform expression for transforming each of the surfaces constituting said three-dimensional object into each of the expanded images at the time of designation of the shape information and the characteristic points;

a transforming step for transforming, based on the transform expression, each of the surfaces constituting said three-dimensional object displayed in said two-dimensional image into each of the expanded images; and a connecting step for generating a connected image by connecting the expanded images of the surfaces in accordance with connecting relationship among the surfaces.

8. An image processing apparatus according to claim 7, wherein said computing step computes, as the computed transform expression, an inverse transform expression of a function $M\psi$ where $\psi$ represents a function for mapping each expanded image onto each surface constituting said three-dimensional object in a three-dimensional space, and M represents a function for generating said two-dimensional image obtained by projecting said three-dimensional object on a screen.

9. An image processing method according to claim 7, wherein said computing step computes also a transform expression for transforming, into one of the expanded images, an invisible surface not displayed in said two-dimensional image among the surfaces constituting said three-dimensional object;

said transforming step also transforms the invisible surface into one of the expanded images; and said connecting step generates the connected image by using also the expanded image of the invisible surface.

10. An image processing method according to claim 7, wherein when a rotation angle is input, the connected image is rotated by the input rotation angle.

11. An image processing method according to claim 7, wherein when a surface of interest is designated from among the surfaces, the connected image is generated based on the surface of interest.

12. An image processing method according to claim 7, wherein said three-dimensional object is a rectangular parallelepiped, a cylinder, or a regular dodecahedron.

13. A computer-readable medium for causing a computer to execute an image-processing computer program for generating, from a two-dimensional image, expanded images obtained by expanding, on a two-dimensional plane, a plurality of surfaces constituting a three-dimensional object displayed in said two-dimensional image, the program comprising:

a computing step for computing, based on shape information of the shape of a surface among the surfaces constituting said three-dimensional object and on characteristic points in said two-dimensional image which are included in the surface, a transform expression for transforming each of the surfaces constituting said three-dimensional object into one of the expanded images at the time of designation of the shape information and the characteristic points;

a transforming step for transforming, based on the transform expression, each of the surfaces constituting said three-dimensional object displayed in said two-dimensional image into one of the expanded images; and a connecting step for generating a connected image by connecting the expanded images of the surfaces in accordance with connecting relationship among the surfaces.

14. A computer-readable medium according to claim 13, wherein said computing step computes, as the computed transform expression, an inverse transform expression of a function $M\psi$ where $\psi$ represents a function for mapping each expanded image onto each surface constituting said three-dimensional object in a three-dimensional space, and M represents a function for generating said two-dimensional image obtained by projecting said three-dimensional object on a screen.

15. A computer-readable medium according to claim 13, wherein said computing step computes also a transform expression for transforming, into one of the expanded images, an invisible surface not displayed in said two-dimensional image among the surfaces constituting said three-dimensional object;

said transforming step also transforms the invisible surface into one of the expanded images; and said connecting step generates the connected image by using also the expanded image of the invisible surface.

16. A computer-readable medium according to claim 13, wherein the program further comprises an input step for rotating the connected image by a rotation angle when the rotation angle is input.

17. A computer-readable medium according to claim 13, wherein when a surface of interest is designated from among the surfaces, said connecting step generates the connected image based on the surface of interest.

18. A computer-readable medium according to claim 13, wherein said three-dimensional object is a rectangular parallelepiped, a cylinder, or a regular dodecahedron.

19. An image processing apparatus for processing an image displaying a three-dimensional object, said image processing apparatus comprising:

first transforming means for transforming each of projected images which is displayed in the image to be processed, said projected images obtained by projecting a plurality of surfaces constituting said three-dimensional object, into each of expanded images obtained by expanding the surfaces on a two-dimensional plane;

connecting means for generating a connected image obtained by connecting the surfaces in accordance with connecting relationship among the surfaces;

processing means for processing the connected image;

second transforming means for transforming the expanded image of each surface constituting the processed connected image into the projected image of each surface; and pasting means for pasting one of said projected images on the image to be processed.

20. An image processing apparatus according to claim 19, further comprising:

operating means for designating shape information on the shape of a surface among the surfaces constituting said three-dimensional object displayed in the image to be processed, and characteristic points in said two-dimensional image which are included in the surface;

first computing means for computing a first transform expression for transforming, based on the shape information and the characteristic points, the projected image of each surface constituting said three-dimensional object into each expanded image;

second computing means for computing a second transform expression for transforming, based on the shape information and the characteristic points, each expanded image into each projected image;

wherein said first transforming means transforms, based on the first transform expression, each projected image into each expanded image;

said second transforming means transforms, based on the second transform expression, each expanded image into each projected image; and said pasting means pastes one of the projected images on a region specified by the characteristic points in the image to be processed.

21. An image processing apparatus according to claim 19, wherein based on a position of said three-dimensional object in a three-dimensional space displayed in the image to be processed and on three-dimensional data including at least a viewpoint from which the image to be processed is obtained, said first transforming means transforms each projected image into each expanded image, and said second transforming means transforms each expanded image into each projected image.

22. An image processing apparatus according to claim 20, wherein said first computing means computes, as the first transform expression, an inverse function of a function $M\psi$ where $\psi$ represents a function for mapping each expanded image onto one of the surfaces constituting said three-dimensional object in a three-dimensional space, and M represents a function for generating each projected image by projecting said three-dimensional object onto a screen.

23. An image processing apparatus according to claim 20, wherein said second computing means computes, as the second transform expression, a function $M\psi$ where $\psi$ represents a function for mapping each expanded image onto one of the surfaces constituting said three-dimensional object in a three-dimensional space, and M represents a function for generating each projected image by projecting said three-dimensional object onto a screen.

24. An image processing apparatus according to claim 19, further comprising designating means for designating a surface of interest from among the surfaces, wherein the connected image is generated based on the surface of interest.

25. An image processing method of an image processing apparatus for processing an image displaying a three-dimensional object, said image processing method comprising:

a first transforming step for transforming each of projected images which is displayed in the image to be processed, said projected images obtained by projecting a plurality of surfaces constituting said three-dimensional object, into each of expanded images obtained by expanding the surfaces on a two-dimensional plane;

a connecting step for generating a connected image obtained by connecting the surfaces in accordance with connecting relationship among the surfaces;

a processing step for processing the connected image;

a second transforming step for transforming the expanded image of each surface constituting the processed connected image into the projected image of each surface; and a pasting step for pasting one of said projected images on the image to be processed.

26. An image processing method according to claim 25, further comprising:

a first computing step for computing a first transform expression for transforming the projected image of each surface constituting said three-dimensional object in the image to be processed into each expanded image, based on shape information of the shape of a surface among the surfaces constituting said three-dimensional object displayed on the image to be processed and on characteristic points in the image to be processed which are included in the surface when the shape information and the characteristic points are designated;

a second computing step for computing a second transform expression for transforming, based on the shape information and the characteristic points, each expanded image into each projected image;

wherein said first transforming step transforms, based on the first transform expression, each projected image into each expanded image;

said second transforming step transforms, based on the second transform expression, each expanded image into each projected image; and said pasting step pastes one of the projected images on a region specified by the characteristic points in the image to be processed.

27. An image processing method according to claim 25, wherein based on a position of said three-dimensional object in a three-dimensional space displayed in the image to be processed and on three-dimensional data including at least a viewpoint from which the image to be processed is obtained, said first transforming step transforms each projected image into each expanded image, and said second transforming step transforms each expanded image into each projected image.

28. An image processing method according to claim 26, wherein said first computing step computes, as the first transform expression, an inverse function of a function $M\psi$ where $\psi$ represents a function for mapping each expanded image onto one of the surfaces constituting said three-dimensional object in a three-dimensional space, and M represents a function for generating each projected image by projecting said three-dimensional object onto a screen.

29. An image processing method according to claim 26, wherein said second computing step computes, as the second transform expression, a function $M\psi$ where $\psi$ represents a function for mapping each expanded image onto one of the surfaces constituting said three-dimensional object in a three-dimensional space, and M represents a function for generating each projected image by projecting said three-dimensional object onto a screen.

30. An image processing method according to claim 25, further comprising a designating step for designating a surface of interest from among the surfaces, wherein the connected image is generated based on the surface of interest.

31. A computer-readable medium for causing a computer to execute an image-processing computer program for processing an image displaying a three-dimensional object, the program comprising:

a first transforming step for transforming each of projected images which is displayed in the image to be processed, said projected images obtained by projecting a plurality of surfaces constituting said three-dimensional object, into each of expanded images obtained by expanding the surfaces on a two-dimensional plane;

a connecting step for generating a connected image obtained by connecting the surfaces in accordance with connecting relationship among the surfaces;

a processing step for processing the connected image;

a second transforming step for transforming the expanded image of each surface constituting the processed connected image into the projected image of each surface; and a pasting step for pasting one of said projected images on the image to be processed.

32. A computer-readable medium according to claim 31, wherein the program further comprises:

a first computing step for computing the first transform expression for transforming the projected image of each surface constituting said three-dimensional object in the image to be processed into each expanded image, based on shape information of the shape of a surface among the surfaces constituting said three-dimensional object displayed on the image to be processed and on characteristic points in the image to be processed which are included in the surface when the shape information and the characteristic points are designated;

a second computing step for computing a second transform expression for transforming, based on the shape information and the characteristic points, each expanded image into each projected image;

wherein said first transforming step transforms, based on the first transform expression, each projected image into each expanded image;

said second transforming step transforms, based on the second transform expression, each expanded image into each projected image; and said pasting step pastes one of the projected images on a region specified by the characteristic points in the image to be processed.

33. A computer-readable medium according to claim 31, wherein based on a position of said three-dimensional object in a three-dimensional space displayed in the image to be processed and on three-dimensional data including at least a viewpoint from which the image to be processed is obtained, said first transforming step transforms each projected image into each expanded image, and said second transforming step transforms each expanded image into each projected image.

34. A computer-readable medium according to claim 32, wherein said first computing step computes, as the first transform expression, an inverse function of a function $M\psi$ where $\psi$ represents a function for mapping each expanded image onto one of the surfaces constituting said three-dimensional object in a three-dimensional space, and M represents a function for generating each projected image by projecting said three-dimensional object onto a screen.

35. A computer-readable medium according to claim 32, wherein said second computing step computes, as the second transform expression, a function $M\psi$ where $\psi$ represents a function for mapping each expanded image onto one of the surfaces constituting said three-dimensional object in a three-dimensional space, and M represents a function for generating each projected image by projecting said three-dimensional object onto a screen.

36. A computer-readable medium according to claim 31, further comprising a designating step for designating a surface of interest from among the surfaces, wherein the connected image is generated based on the surface of interest.

* * * * *